(12) United States Patent
Connor

(10) Patent No.: US 12,013,538 B2
(45) Date of Patent: Jun. 18, 2024

(54) AUGMENTED REALITY (AR) EYEWEAR WITH A SECTION OF A FRESNEL REFLECTOR COMPRISING INDIVIDUALLY-ADJUSTABLE TRANSMISSIVE-REFLECTIVE OPTICAL ELEMENTS

(71) Applicant: Robert A. Connor, St. Paul, MN (US)

(72) Inventor: Robert A. Connor, St. Paul, MN (US)

(73) Assignee: Holovisions LLC, Ham Lake, MN (US)

( * ) Notice: Subject to any disclaimer, the term of this patent is extended or adjusted under 35 U.S.C. 154(b) by 30 days.

(21) Appl. No.: 18/088,548

(22) Filed: Dec. 24, 2022

(65) Prior Publication Data

US 2023/0125258 A1    Apr. 27, 2023

Related U.S. Application Data

(63) Continuation-in-part of application No. 17/722,354, filed on Apr. 17, 2022, now Pat. No. 11,754,843, which is a continuation-in-part of application No. 17/501,495, filed on Oct. 14, 2021, now Pat. No. 11,307,420, which is a continuation-in-part of application No. 16/686,170, filed on Nov. 17, 2019, now Pat. No. 11,163,163, which is a continuation-in-part of application No. 16/175,924, filed on Oct. 31, 2018, now Pat. No. 10,859,834, which is a continuation-in-part of application No. 15/942,498, filed on Mar. 31, 2018, now Pat. No. 10,338,400.

(60) Provisional application No. 63/212,054, filed on Jun. 17, 2021, provisional application No. 63/192,664, filed on May 25, 2021, provisional application No. 62/791,359, filed on Jan. 11, 2019, provisional (Continued)

(51) Int. Cl.
| | | |
|---|---|---|
| G02B 27/01 | (2006.01) | |
| G02B 5/09 | (2006.01) | |
| G02B 17/00 | (2006.01) | |
| G02F 1/19 | (2019.01) | |

(52) U.S. Cl.
CPC .......... G02B 27/0172 (2013.01); G02B 5/09 (2013.01); G02B 17/002 (2013.01); G02F 1/19 (2013.01); G02B 2027/0118 (2013.01); G02B 2027/0178 (2013.01); G02F 2203/48 (2013.01)

(58) Field of Classification Search
CPC .... G02B 27/0172; G02B 5/09; G02B 17/002; G02B 2027/0118; G02B 2027/0178; G02B 26/0816; G02F 1/19; G02F 2203/48
See application file for complete search history.

(56) References Cited

U.S. PATENT DOCUMENTS

| | | | |
|---|---|---|---|
| 8,659,840 B2 * | 2/2014 | Masuda | ............. G02B 27/0101 359/743 |
| 10,215,698 B2 | 2/2019 | Han et al. | |

(Continued)

Primary Examiner — Collin X Beatty

(57) ABSTRACT

Disclosed herein is augmented reality (AR) eyewear with at least one array of individually-adjustable optical elements whose levels of light transmission and/or reflectivity are selectively and individually adjusted by application of electrical current, or by exposure to an electromagnetic field, via transparent (or translucent) electroconductive pathways. Optical elements in this array collectively comprise a section of a Fresnel Reflector which has been selected (e.g. extracted or "cut out") from the right side or the left side of a Fresnel Reflector.

8 Claims, 11 Drawing Sheets

Related U.S. Application Data application No. 62/751,076, filed on Oct. 26, 2018, provisional application No. 62/749,775, filed on Oct. 24, 2018, provisional application No. 62/746,487, filed on Oct. 16, 2018, provisional application No. 62/720,171, filed on Aug. 21, 2018, provisional application No. 62/716,507, filed on Aug. 9, 2018, provisional application No. 62/714,684, filed on Aug. 4, 2018, provisional application No. 62/703,025, filed on Jul. 25, 2018, provisional application No. 62/699,800, filed on Jul. 18, 2018, provisional application No. 62/695,124, filed on Jul. 8, 2018, provisional application No. 62/646,856, filed on Mar. 22, 2018, provisional application No. 62/638,087, filed on Mar. 3, 2018, provisional application No. 62/624,699, filed on Jan. 31, 2018, provisional application No. 62/572,328, filed on Oct. 13, 2017, provisional application No. 62/563,798, filed on Sep. 27, 2017, provisional application No. 62/561,834, filed on Sep. 22, 2017, provisional application No. 62/528,331, filed on Jul. 3, 2017.

(56) References Cited

U.S. PATENT DOCUMENTS

| | | |
|---|---|---|
| 10,690,986 B2 | 6/2020 | Firka et al. |
| 10,768,451 B1 | 9/2020 | Carlson |
| 10,962,783 B2 | 3/2021 | Wilson et al. |
| 11,086,143 B1 | 8/2021 | Gill et al. |
| 11,215,829 B2 | 1/2022 | Topliss et al. |
| 11,467,407 B2 | 10/2022 | DeLapp et al. |
| 2013/0021658 A1 | 1/2013 | Miao et al. |
| 2013/0077175 A1 | 3/2013 | Hotta et al. |
| 2013/0314759 A1 | 11/2013 | Miao et al. |
| 2014/0003762 A1 | 1/2014 | Macnamara |
| 2014/0036361 A1 | 2/2014 | Woodgate et al. |
| 2015/0036223 A1 | 2/2015 | Dobschal et al. |
| 2016/0161740 A1 | 6/2016 | Bar-Zeev et al. |
| 2016/0178910 A1 | 6/2016 | Giudicelli et al. |
| 2016/0189432 A1 | 6/2016 | Bar-Zeev et al. |
| 2016/0282616 A1* | 9/2016 | Matsushita ........ G02B 27/0101 |
| 2016/0335806 A1 | 11/2016 | Chan et al. |
| 2017/0139110 A1 | 5/2017 | Woodgate et al. |
| 2017/0285347 A1 | 10/2017 | Cai et al. |
| 2017/0299869 A1 | 10/2017 | Urey et al. |
| 2017/0299870 A1 | 10/2017 | Urey et al. |
| 2017/0345217 A1 | 11/2017 | Chan et al. |
| 2018/0003962 A1 | 1/2018 | Urey et al. |
| 2018/0003981 A1 | 1/2018 | Urey |
| 2018/0074248 A1 | 3/2018 | Shani et al. |
| 2018/0074318 A1 | 3/2018 | Wheelwright et al. |
| 2018/0074319 A1 | 3/2018 | Wheelwright et al. |
| 2018/0074320 A1 | 3/2018 | Wheelwright et al. |
| 2018/0074323 A1 | 3/2018 | Wheelwright et al. |
| 2018/0074324 A1 | 3/2018 | Wheelwright et al. |
| 2018/0074325 A1 | 3/2018 | Wheelwright et al. |
| 2018/0100959 A1 | 4/2018 | Vasylyev |
| 2018/0143427 A1 | 5/2018 | Griffin et al. |
| 2018/0164882 A1 | 6/2018 | Johnson et al. |
| 2018/0172995 A1 | 6/2018 | Lee et al. |
| 2018/0172999 A1 | 6/2018 | Sulai et al. |
| 2018/0182150 A1 | 6/2018 | Benishti et al. |
| 2018/0231784 A1 | 8/2018 | Koudsi et al. |
| 2018/0252917 A1 | 9/2018 | Takahashi et al. |
| 2018/0252918 A1 | 9/2018 | Takahashi et al. |
| 2018/0284441 A1 | 10/2018 | Cobb |
| 2018/0348524 A1 | 12/2018 | Blum et al. |
| 2019/0025602 A1 | 1/2019 | Qin et al. |
| 2019/0041232 A1 | 2/2019 | Maruyama et al. |
| 2019/0043238 A1 | 2/2019 | Benishti et al. |
| 2019/0090766 A1 | 3/2019 | Block et al. |
| 2019/0094537 A1 | 3/2019 | Choi et al. |
| 2019/0094550 A1 | 3/2019 | Takagi et al. |
| 2019/0101764 A1 | 4/2019 | Cakmakci |
| 2019/0101767 A1 | 4/2019 | Geng et al. |
| 2019/0107719 A1 | 4/2019 | Edwin et al. |
| 2019/0107723 A1 | 4/2019 | Lee et al. |
| 2019/0129213 A1 | 5/2019 | Cho et al. |
| 2019/0158810 A1 | 5/2019 | Cho et al. |
| 2019/0162950 A1 | 5/2019 | Lapstun |
| 2019/0165052 A1 | 5/2019 | Son et al. |
| 2019/0187472 A1 | 6/2019 | Choi et al. |
| 2019/0227305 A1 | 7/2019 | Fortin-Desch nes et al. |
| 2019/0227315 A1 | 7/2019 | Sun et al. |
| 2019/0228586 A1 | 7/2019 | Bar-Zeev et al. |
| 2019/0235252 A1 | 8/2019 | Freedman et al. |
| 2019/0235281 A1 | 8/2019 | Etzkorn et al. |
| 2019/0265476 A1 | 8/2019 | Blum et al. |
| 2019/0265515 A1 | 8/2019 | Lee et al. |
| 2019/0273916 A1 | 9/2019 | Benishti et al. |
| 2019/0278092 A1 | 9/2019 | Kuo et al. |
| 2019/0282399 A1 | 9/2019 | Goetz |
| 2019/0285960 A1 | 9/2019 | Sasa et al. |
| 2019/0289284 A1 | 9/2019 | Smith et al. |
| 2019/0293938 A1 | 9/2019 | Le Saux et al. |
| 2019/0294019 A1 | 9/2019 | Park et al. |
| 2019/0294109 A1 | 9/2019 | Lee et al. |
| 2019/0331918 A1 | 10/2019 | Hong |
| 2019/0331923 A1 | 10/2019 | Cai et al. |
| 2019/0331924 A1 | 10/2019 | Cai et al. |
| 2019/0339528 A1 | 11/2019 | Freeman et al. |
| 2019/0348460 A1 | 11/2019 | Chen et al. |
| 2019/0352808 A1 | 11/2019 | Yoon et al. |
| 2019/0353906 A1 | 11/2019 | Gollier et al. |
| 2019/0361245 A1 | 11/2019 | Lanman et al. |
| 2019/0371065 A1 | 12/2019 | Anders et al. |
| 2019/0377182 A1 | 12/2019 | Sharp |
| 2019/0377183 A1 | 12/2019 | Sharp |
| 2019/0377184 A1 | 12/2019 | Sharp et al. |
| 2019/0377186 A1 | 12/2019 | Collins |
| 2019/0378338 A1 | 12/2019 | Bar-Zeev et al. |
| 2019/0378872 A1 | 12/2019 | Chen et al. |
| 2019/0385342 A1 | 12/2019 | Freeman et al. |
| 2019/0391396 A1 | 12/2019 | Saarikko |
| 2020/0012110 A1 | 1/2020 | Blum et al. |
| 2020/0026076 A1 | 1/2020 | Beckman |
| 2020/0033693 A1 | 1/2020 | Lu et al. |
| 2020/0041798 A1 | 2/2020 | Kress et al. |
| 2020/0064627 A1 | 2/2020 | Ouderkirk et al. |
| 2020/0081252 A1 | 3/2020 | Jamali et al. |
| 2020/0110268 A1 | 4/2020 | Robbins et al. |
| 2020/0117005 A1 | 4/2020 | Chi et al. |
| 2020/0124858 A1 | 4/2020 | Cakmakci |
| 2020/0132919 A1 | 4/2020 | Cakmakci |
| 2020/0142109 A1 | 5/2020 | Olkkonen et al. |
| 2020/0142202 A1 | 5/2020 | Lee et al. |
| 2020/0159026 A1 | 5/2020 | Waldern et al. |
| 2020/0166691 A1 | 5/2020 | Vartiainen et al. |
| 2020/0166756 A1 | 5/2020 | DeLapp et al. |
| 2020/0174255 A1 | 6/2020 | Hollands et al. |
| 2020/0192095 A1 | 6/2020 | Puetz et al. |
| 2020/0192152 A1 | 6/2020 | Jamali et al. |
| 2020/0209626 A1 | 7/2020 | Huang et al. |
| 2020/0225479 A1 | 7/2020 | Chi et al. |
| 2020/0249480 A1 | 8/2020 | Martinez et al. |
| 2020/0257065 A1 | 8/2020 | Chi et al. |
| 2020/0259307 A1 | 8/2020 | Sharma et al. |
| 2020/0271936 A1 | 8/2020 | Leibovici et al. |
| 2020/0271938 A1 | 8/2020 | Taylor et al. |
| 2020/0281457 A1 | 9/2020 | Zimanyi |
| 2020/0281458 A1 | 9/2020 | Zimanyi |
| 2020/0301151 A1 | 9/2020 | Freedman et al. |
| 2020/0301153 A1 | 9/2020 | Toleno et al. |
| 2020/0301239 A1 | 9/2020 | Akkaya et al. |
| 2020/0303151 A1 | 9/2020 | Du et al. |
| 2020/0333596 A1 | 10/2020 | Yoon et al. |
| 2020/0334907 A1 | 10/2020 | Bender et al. |
| 2020/0336731 A1 | 10/2020 | Welch et al. |
| 2020/0345293 A1 | 11/2020 | Ras et al. |
| 2020/0348514 A1 | 11/2020 | Chi et al. |
| 2020/0348518 A1 | 11/2020 | Georgiou et al. |
| 2020/0348522 A1 | 11/2020 | Xiao et al. |

(56) References Cited

U.S. PATENT DOCUMENTS

| | | |
|---|---|---|
| 2020/0355929 A1 | 11/2020 | Zhang et al. |
| 2020/0371280 A1 | 11/2020 | Geng et al. |
| 2020/0371362 A1 | 11/2020 | Xiao et al. |
| 2020/0371371 A1 | 11/2020 | Liang et al. |
| 2020/0371387 A1 | 11/2020 | Gollier et al. |
| 2020/0371388 A1 | 11/2020 | Geng et al. |
| 2020/0393736 A1 | 12/2020 | Hu |
| 2020/0393910 A1 | 12/2020 | Gribetz et al. |
| 2020/0396431 A1 | 12/2020 | Stafford |
| 2020/0400955 A1 | 12/2020 | Messer et al. |
| 2020/0408981 A1 | 12/2020 | Curtis et al. |
| 2021/0003848 A1 | 1/2021 | Choi et al. |
| 2021/0011290 A1 | 1/2021 | Maimone et al. |
| 2021/0018657 A1 | 1/2021 | Tsai et al. |
| 2021/0026138 A1 | 1/2021 | Alasaarela et al. |
| 2021/0033790 A1 | 2/2021 | Ward et al. |
| 2021/0041704 A1 | 2/2021 | Bhargava et al. |
| 2021/0051315 A1 | 2/2021 | Shamir et al. |
| 2021/0055466 A1 | 2/2021 | Eisenfeld |
| 2021/0055546 A1 | 2/2021 | Shin et al. |
| 2021/0055548 A1 | 2/2021 | Rao et al. |
| 2021/0055551 A1 | 2/2021 | Chi et al. |
| 2021/0055552 A1 | 2/2021 | Chi et al. |
| 2021/0055560 A1 | 2/2021 | Ben Tez et al. |
| 2021/0055561 A1 | 2/2021 | Danziger et al. |
| 2021/0055563 A1 | 2/2021 | Bouchier et al. |
| 2021/0055580 A1 | 2/2021 | Wells et al. |
| 2021/0063606 A1 | 3/2021 | Glik et al. |
| 2021/0063733 A1 | 3/2021 | Ronen |
| 2021/0063774 A1 | 3/2021 | Wang et al. |
| 2021/0065427 A1 | 3/2021 | Wade |
| 2021/0066402 A1 | 3/2021 | Pu et al. |
| 2021/0066574 A1 | 3/2021 | Diest et al. |
| 2021/0072437 A1 | 3/2021 | Singh et al. |
| 2021/0072453 A1 | 3/2021 | Peng et al. |
| 2021/0072541 A1 | 3/2021 | Kim et al. |
| 2021/0072559 A1 | 3/2021 | Wang et al. |
| 2021/0072585 A1 | 3/2021 | Shipton et al. |
| 2021/0072821 A1 | 3/2021 | Von Liechtenstein |
| 2021/0074067 A1 | 3/2021 | Kwon et al. |
| 2021/0080635 A1 | 3/2021 | Menezes et al. |
| 2021/0080721 A1 | 3/2021 | Geng et al. |
| 2021/0080722 A1 | 3/2021 | Geng et al. |
| 2021/0080724 A1 | 3/2021 | Sulai et al. |
| 2021/0080725 A1 | 3/2021 | Sulai et al. |
| 2021/0080726 A1 | 3/2021 | Geng et al. |
| 2021/0080730 A1 | 3/2021 | Morrison et al. |
| 2021/0080739 A1 | 3/2021 | Geng et al. |
| 2021/0080763 A1 | 3/2021 | Sulai et al. |
| 2021/0080906 A1 | 3/2021 | Jolly et al. |
| 2021/0088700 A1 | 3/2021 | Wang et al. |
| 2021/0088794 A1 | 3/2021 | Melville |
| 2021/0088795 A1 | 3/2021 | Cheng et al. |
| 2021/0089129 A1 | 3/2021 | Osterhout et al. |
| 2021/0096380 A1 | 4/2021 | Osmanis et al. |
| 2021/0096391 A1 | 4/2021 | Ma et al. |
| 2021/0096453 A1 | 4/2021 | Wheelwright et al. |
| 2021/0103145 A1 | 4/2021 | You et al. |
| 2021/0103180 A1 | 4/2021 | Sears et al. |
| 2021/0103182 A1 | 4/2021 | Tan et al. |
| 2021/0109278 A1 | 4/2021 | Peroz et al. |
| 2021/0109352 A1 | 4/2021 | Lee et al. |
| 2021/0109433 A1 | 4/2021 | Trisnadi et al. |
| 2021/0112647 A1 | 4/2021 | Coleman |
| 2021/0191125 A1 | 6/2021 | Li et al. |
| 2021/0215938 A1 | 7/2021 | Maimone et al. |
| 2021/0240036 A1 | 8/2021 | Jamali et al. |
| 2021/0255490 A1 | 8/2021 | Parsons et al. |
| 2022/0006987 A1 | 1/2022 | Seiler et al. |
| 2022/0043323 A1 | 2/2022 | Skirlo et al. |

\* cited by examiner

AUGMENTED REALITY (AR) EYEWEAR WITH A SECTION OF A FRESNEL REFLECTOR COMPRISING INDIVIDUALLY-ADJUSTABLE TRANSMISSIVE-REFLECTIVE OPTICAL ELEMENTS

CROSS-REFERENCE TO RELATED APPLICATIONS

This application is a continuation-in-part of U.S. patent application Ser. No. 17/722,354 filed on 2022 Apr. 17. U.S. patent application Ser. No. 17/722,354 was a continuation-in-part of U.S. patent application Ser. No. 17/501,495 filed on 2021 Oct. 14. U.S. patent application Ser. No. 17/501,495 was a continuation-in-part of U.S. patent application Ser. No. 16/686,170 filed on 2019 Nov. 17. U.S. patent application Ser. No. 17/501,495 claimed the priority benefit of U.S. provisional patent application 63/192,664 filed on 2021 May 25. U.S. patent application Ser. No. 17/501,495 claimed the priority benefit of U.S. provisional patent application 63/212,054 filed on 2021 Jun. 17. U.S. patent application Ser. No. 16/686,170 claimed the priority benefit of U.S. provisional patent application 62/791,359 filed on 2019 Jan. 11. U.S. patent application Ser. No. 16/686,170 was a continuation-in-part of U.S. patent application Ser. No. 16/175,924 filed on 2018 Oct. 31 which issued as U.S. patent Ser. No. 10/859,834 on 2020 Dec. 8. U.S. patent application Ser. No. 16/175,924 claimed the priority benefit of U.S. provisional patent application 62/751,076 filed on 2018 Oct. 26. U.S. patent application Ser. No. 16/175,924 claimed the priority benefit of U.S. provisional patent application 62/749,775 filed on 2018 Oct. 24. U.S. patent application Ser. No. 16/175,924 claimed the priority benefit of U.S. provisional patent application 62/746,487 filed on 2018 Oct. 16. U.S. patent application Ser. No. 16/175,924 claimed the priority benefit of U.S. provisional patent application 62/720,171 filed on 2018 Aug. 21. U.S. patent application Ser. No. 16/175,924 claimed the priority benefit of U.S. provisional patent application 62/716,507 filed on 2018 Aug. 9. U.S. patent application Ser. No. 16/175,924 claimed the priority benefit of U.S. provisional patent application 62/714,684 filed on 2018 Aug. 4. U.S. patent application Ser. No. 16/175,924 claimed the priority benefit of U.S. provisional patent application 62/703,025 filed on 2018 Jul. 25. U.S. patent application Ser. No. 16/175,924 claimed the priority benefit of U.S. provisional patent application 62/699,800 filed on 2018 Jul. 18. U.S. patent application Ser. No. 16/175,924 claimed the priority benefit of U.S. provisional patent application 62/695,124 filed on 2018 Jul. 8. U.S. patent application Ser. No. 16/175,924 was a continuation-in-part of U.S. patent application Ser. No. 15/942,498 filed on 2018 Mar. 31 which issued as U.S. patent Ser. No. 1085983410338400 on 2019 Jul. 2. U.S. patent application Ser. No. 16/175,924 claimed the priority benefit of U.S. provisional patent application 62/646,856 filed on 2018 Mar. 22. U.S. patent application Ser. No. 16/175,924 claimed the priority benefit of U.S. provisional patent application 62/638,087 filed on 2018 Mar. 3. U.S. patent application Ser. No. 16/175,924 claimed the priority benefit of U.S. provisional patent application 62/624,699 filed on 2018 Jan. 31.

U.S. patent application Ser. No. 15/942,498 claimed the priority benefit of U.S. provisional patent application 62/646,856 filed on 2018 Mar. 22. U.S. patent application Ser. No. 15/942,498 claimed the priority benefit of U.S. provisional patent application 62/638,087 filed on 2018 Mar. 3. U.S. patent application Ser. No. 15/942,498 claimed the priority benefit of U.S. provisional patent application 62/624,699 filed on 2018 Jan. 31. U.S. patent application Ser. No. 15/942,498 claimed the priority benefit of U.S. provisional patent application 62/572,328 filed on 2017 Oct. 13. U.S. patent application Ser. No. 15/942,498 claimed the priority benefit of U.S. provisional patent application 62/563,798 filed on 2017 Sep. 27. U.S. patent application Ser. No. 15/942,498 claimed the priority benefit of U.S. provisional patent application 62/561,834 filed on 2017 Sep. 22. U.S. patent application Ser. No. 15/942,498 claimed the priority benefit of U.S. provisional patent application 62/528,331 filed on 2017 Jul. 3.

The entire contents of these related applications are incorporated herein by reference.

FEDERALLY SPONSORED RESEARCH

Not Applicable

SEQUENCE LISTING OR PROGRAM

Not Applicable

BACKGROUND

Field of Invention

This invention relates to optical structures for augmented reality eyewear.

Introduction

Augmented Reality (AR) eyewear allows a person to simultaneously see their environment and virtual objects displayed in their field of vision. Augmented Reality (also called "Mixed Reality") can include simulated interactions between virtual objects and real objects in a person's environment. Augmented reality has numerous potential applications in the fields of commerce and shopping, defense, diet and nutritional improvement, education, engineering, entertainment, exploration, gaming, interior design, maintenance, manufacturing, medicine, movies, navigation and transportation, public safety, socializing, and sports.

There has been considerable progress toward the creation of Augmented Reality (AR) eyewear which allows a person to see their environment and virtual objects displayed in their field of vision, but challenges remain. For example, see-through augmented reality eyewear in the prior art does not appear to selectively block environmental light in the area of a displayed virtual object. As a result, environmental light shines through projected virtual objects, making the virtual objects look transparent and "ghost like." This is particularly troublesome in bright environments. Also, augmented reality eyewear in the prior art tends to be bulky. There is a need for compact augmented reality (AR) eyewear designs which project relatively-opaque high-resolution virtual objects in a person's field of view.

REVIEW OF THE RELEVANT ART

U.S. patent application 20200301239 (Akkaya et al., Sep. 24, 2020, "Varifocal Display with Fixed-Focus Lens") discloses a display with a projector, an optical waveguide, a fixed-focus lens, and a variable-focus lens. U.S. patent application 20210026138 (Alasaarela et al., Jan. 28, 2021, "Projection Device and Projection Method for Head Mounted Display Based on Rotary MEMS Fast Scanner")

discloses a microelectromechanical system (MEMS) coupled to a microscopic mirror. U.S. patent application 20190371065 (Anders et al., Dec. 5, 2019, "Augmented Reality Masking") discloses masks for the portion of a scene which is not processed for viewing via augmented reality.

U.S. patent application 20160161740 (Bar-Zeev et al., Jun. 9, 2016, "Automatic Variable Virtual Focus for Augmented Reality Displays") discloses an augmented reality display wherein a user's focal region is tracked and a virtual object is displayed in that region. U.S. patent application 20160189432 (Bar-Zeev et al., Jun. 30, 2016, "Automatic Focus Improvement for Augmented Reality Displays") discloses a see-through display with a variable focus lens. U.S. patent applications 20190228586 (Bar-Zeev et al., Jul. 25, 2019, "Opacity Filter for Display Device") and 20190378338 (Bar-Zeev et al., Dec. 12, 2019, "Opacity Filter for Display Device") disclose an optical see-through head-mounted display with a see-through lens and an opacity filter is used to selectively block portions of the real-world scene.

U.S. patent application 20200026076 (Beckman, Jan. 23, 2020, "Augmented Reality Display Systems with Variable, Directional Light Transmission Enhancing Virtual Images at an Observation Point") discloses a matrix of light-augmenting pixels in a variable-transmission semi-transparent screen. U.S. patent application 20210055560 (Ben Tez et al., Feb. 25, 2021, "Compact Optics in Crossed Configuration for Virtual and Mixed Reality") discloses an optical system with channels which generate immersive virtual images. U.S. patent application 20200334907 (Bender et al., Oct. 22, 2020, "Dynamic Partition of Augmented Reality Region") discloses boundary dimension values for different areas relative to a reference geographic location.

U.S. patent applications 20180182150 (Benishti et al., Jun. 28, 2018, "Combining Video-Based and Optic-Based Augmented Reality in a Near Eye Display"), 20190043238 (Benishti et al., Feb. 7, 2019, "Combining Video-Based and Optic-Based Augmented Reality in a Near Eye Display"), and 20190273916 (Benishti et al., Sep. 5, 2019, "Combining Video-Based and Optic-Based Augmented Reality in a Near Eye Display") disclose an array of variably-transparent pixels. U.S. patent application 20210041704 (Bhargava et al., Feb. 11, 2021, "Eyepieces for Augmented Reality Display System") discloses a waveguide, an optically transmissive substrate, an input coupling grating, a multi-directional pupil expander, and an exit pupil expander. U.S. patent application 20190090766 (Block et al., Mar. 28, 2019, "Concentric Architecture for Optical Sensing") discloses an electronic device with optical sensing and a concentric architecture.

U.S. patent application 20180348524 (Blum et al., Dec. 6, 2018, "Releasably Attachable Augmented Reality System for Eyewear") discloses an Augmented Reality apparatus which uses existing eyewear as an attachment platform. U.S. patent application 20190265476 (Blum et al., Aug. 29, 2019, "See-Through Near Eye Optical Module") discloses a semi-transparent near eye optical module with a transparent sparsely populated near eye display comprising a plurality of pixels or pixel patches and a sparsely populated micro-lens array. U.S. patent application 20200012110 (Blum et al., Jan. 9, 2020, "Augmented Reality or Mixed Reality System for Eyewear") discloses a see-through display with a micro-lens array. U.S. patent application 20210055563 (Bouchier et al., Feb. 25, 2021, "Methods and Systems for Augmented Reality") discloses a see-through tunable holographic mirror or tunable LCD array mirror.

U.S. patent applications 20170285347 (Cai et al., Oct. 5, 2017, "Augmented/Virtual Reality Near-Eye Displays with Edge Imaging Lens Comprising A Plurality of Display Devices"), 20190331923 (Cai et al., Oct. 31, 2019, "Augmented/Virtual Reality Near-Eye Displays with Edge Imaging Lens Comprising a Plurality of Display Devices"), and 20190331924 (Cai et al., Oct. 31, 2019, "Augmented/Virtual Reality Near-Eye Displays with Edge Imaging Lens Comprising a Plurality of Display Devices") disclose a lens with a beam-splitting interface which is horizontal along the width of the lens.

U.S. patent application 20190101764 (Cakmakci, Apr. 4, 2019, "Head-Worn Augmented Reality Display") discloses a combiner and a microdisplay device, wherein the combiner has a curved transparent structure and a reflective surface. U.S. patent application 20200132919 (Cakmakci, Apr. 30, 2020, "Curved Optical See-Through Thin Freeform Lightguide with Large Field of View in Eyewear Formfactor") discloses a lightguide, a microdisplay, and a field lens positioned therebetween that directs light from the microdisplay into a top surface of the lightguide. U.S. patent application 20200124858 (Cakmakci, Apr. 23, 2020, "Freeform Head Mounted Display") discloses lenses having a combined optical power to form a curved intermediate image.

U.S. patent Ser. No. 10/768,451 (Carlson, Sep. 8, 2020, "Diffusers in Wearable Devices") discloses a diffuser that diffuses light in a radial anisotropic diffusion pattern or a prism-like diffusion pattern. U.S. patent applications 20160335806 (Chan et al., Nov. 17, 2016, "Reprojection OLED Display for Augmented Reality Experiences") and 20170345217 (Chan et al., Nov. 30, 2017, "Reprojection OLED Display for Augmented Reality Experiences") disclose methods for displaying virtual images in an augmented reality environment at a frame rate that is greater than a rendering frame rate. U.S. patent applications 20190348460 (Chen et al., Nov. 14, 2019, "Multi-Photodiode Pixel Cell") and 20190378872 (Chen et al., Dec. 12, 2019, "Multi-Photodiode Pixel Cell") disclose a semiconductor substrate including first and second photodiodes and a barrier layer between the photodiodes, wherein the photodiodes and the barrier layer form a stack. U.S. patent application 20210088795 (Cheng et al., Mar. 25, 2021, "Wide Angle and High Resolution Tiled Head-Mounted Display Device") discloses a tiled head-mounted display with a plurality of prisms with free-form surfaces.

U.S. patent application 20200348514 (Chi et al., Nov. 5, 2020, "Waveguide Including Volume Bragg Gratings") discloses a waveguide with Volume Bragg Gratings (VBGs). U.S. patent application 20210055551 (Chi et al., Feb. 25, 2021, "Dispersion Compensation in Volume Bragg Grating-Based Waveguide Display") discloses a waveguide with a substrate transparent to visible light, a coupler configured to couple display light into the substrate as a guided wave in the substrate, a first VBG, and a second VBG. U.S. patent application 20210055552 (Chi et al., Feb. 25, 2021, "Multiple Projector Field-Of-View Stitched Waveguide Display") discloses a waveguide display with two light projectors.

U.S. patent application 20200117005 (Chi et al., Apr. 16, 2020, "Waveguide for Conveying Multiple Portions of Field of View") discloses a waveguide for conveying light carrying an image. U.S. patent application 20200225479 (Chi et al., Jul. 16, 2020, "Volume Bragg Gratings for Near-Eye Waveguide Display") discloses a waveguide display with a substrate which is transparent to visible light, a coupler configured to couple display light into the substrate such that the display light propagates within the substrate through total internal reflection, a first multiplexed volume Bragg grating (VBG) on the substrate, and a second multiplexed VBG on the substrate. U.S. patent application 20200257065 (Chi et al., Aug. 13, 2020, "Dispersion Compensation for Light Coupling Through Slanted Facet of Optical Waveguide") discloses a pupil expander with a waveguide having a slanted facet.

U.S. patent application 20190129213 (Cho et al., May 2, 2019, "Display Apparatus") discloses a display apparatus with a liquid crystal panel and a shutter panel. U.S. patent application 20190158810 (Cho et al., May 23, 2019, "Multi-Lens Based Capturing Apparatus and Method") discloses a multi-lens capturing apparatus. U.S. patent application 20190094537 (Choi et al., Mar. 28, 2019, "Display Device") discloses a display device with a plurality of diffractive optical elements which are each configured to emit light guided through a light guide plate to a user. U.S. patent application 20190187472 (Choi et al., Jun. 20, 2019, "Optical System and Wearable Display Apparatus Having the Same") discloses an optical system with a first waveguide, a transmissive reflective layer on the first waveguide, a second waveguide on the transmissive reflective layer, an in-coupler, and an out-coupler. U.S. patent application 20210003848 (Choi et al., Jan. 7, 2021, "Electronic Device and Method for Displaying Augmented Reality") discloses an optical engine; a first polarizer, a polarization converter, a waveguide, a focus tunable lens, and a second polarizer.

U.S. patent application 20180284441 (Cobb, Oct. 4, 2018, "Wide Field Head Mounted Display") discloses an optical apparatus with a concave spherical mirror that has a center of curvature at the viewer's pupil. U.S. patent application 20210112647 (Coleman, Apr. 15, 2021, "Angularly Varying Light Emitting Device with an Imager") discloses an angularly varying light emitting device (AVLED). U.S. patent application 20190377186 (Collins, Dec. 12, 2019, "Systems and Methods for Augmented Reality Display") discloses an augmented reality system with a power source, a sensor array, a lens, and a projector. U.S. patent application 20200408981 (Curtis et al., Dec. 31, 2020, "Display System Having a Plurality of Light Pipes for a Plurality of Light Emitters") discloses a display system with a plurality of light pipes and light sources which send light into the light pipes.

U.S. patent application 20210055561 (Danziger et al., Feb. 25, 2021, "Near-Eye Display Having Overlapping Projector Assemblies") discloses a display with at least two projectors. U.S. patent application 20200166756 (DeLapp et al., May 28, 2020, "Displays with Volume Phase Gratings") and U.S. Pat. No. 11,467,407 (DeLapp et al., Oct. 11, 2022, "Displays with Volume Phase Gratings") discloses input and output couplers made from volume phase holographic gratings. U.S. patent application 20210066574 (Diest et al., Mar. 4, 2021, "Structured Actuators: Shaped Electroactive Polymers") discloses an electroactive polymer layer with a non-axisymmetric shape. U.S. patent application 20150036223 (Dobschal et al., Feb. 5, 2015, "Display Device Comprising Multifunction Glass, Production Method and Optical Element Having a Fresnel Structure") discloses a multifunction optical element with a Fresnel structure for out coupling.

U.S. patent application 20200303151 (Du et al., Sep. 24, 2020, "Method and System for Adjusting Focal Point Position") discloses ways to adjust a focal point position of an X-ray tube. U.S. patent application 20190107719 (Edwin et al., Apr. 11, 2019, "Augmented Reality Display Comprising Eyepiece Having a Transparent Emissive Display") discloses an augmented reality head-mounted display system with a transparent emissive display. U.S. patent application 20210055466 (Eisenfeld, Feb. 25, 2021, "Projector Configuration with Subdivided Optical Aperture for Near-Eye Displays, and Corresponding Optical Systems") discloses a system for displaying a projected image with a light-guide optical element having two major parallel surfaces and a projected image collimated to infinity.

U.S. patent application 20190235281 (Etzkorn et al., Aug. 1, 2019, "Eye-Mountable Device to Provide Automatic Accommodation and Method of Making Same") discloses an eye-mountable device with a lens enclosure, liquid crystal material, first and second electrodes, a substrate, and a controller. U.S. patent Ser. No. 10/690,986 (Firka et al., Jun. 23, 2020, "Electronic Devices Having Electrically Adjustable Optical Shutters") discloses an electrically adjustable shutter. U.S. patent application 20190227305 (Fortin-Desch Nes et al., Jul. 25, 2019, "Optical Arrangements Including Fresnel Lens Elements") discloses an optical lens arrangement with a first Fresnel lens element and a second lens element.

U.S. patent application 20190235252 (Freedman et al., Aug. 1, 2019, "Method and System for Large Field of View Display with Scanning Mirror Having Optical Power") discloses an image display system with light sources which are configured to emit uncollimated light and also an eyepiece waveguide having an input port which receives beams of light at differing angles. U.S. patent application 20190339528 (Freeman et al., Nov. 7, 2019, "Wearable Image Manipulation and Control System with High Resolution Micro-Displays and Dynamic Opacity Augmentation in Augmented Reality Glasses") discloses a mixed reality display with dynamic opacity.

U.S. patent application 20190385342 (Freeman et al., Dec. 19, 2019, "Wearable Image Manipulation and Control System with Micro-Displays and Augmentation of Vision and Sensing in Augmented Reality Glasses") discloses a wearable mixed reality system comprising a camera and an image projection system. U.S. patent application 20200301151 (Freedman et al., Sep. 24, 2020, "Method and System for Large Field of View Display with Scanning Mirror Having Optical Power") discloses a display system with a plurality of light sources and a waveguide having an input port configured to receive beams of light at differing angles.

U.S. patent application 20210080726 (Geng et al., Mar. 18, 2021, "Display Device with Diffusive Display and See-Through Lens Assembly") discloses a display which is configured to output diffused image light from a first surface and to transmit ambient light from a second surface to the first surface. U.S. patent application 20210080739 (Geng et al., Mar. 18, 2021, "Short Distance Illumination of a Spatial Light Modulator Using a Pancake Lens Assembly") discloses a light source, a spatial light modulator (SLM), a first reflective surface, and a second reflective surface that is opposite to the first reflective surface. U.S. patent applications 20210080721 (Geng et al., Mar. 18, 2021, "Thin See-Through Pancake Lens Assembly and Display Device Including the Same") and 20210080722 (Geng et al., Mar. 18, 2021, "Curved See-Through Pancake Lens Assembly and Display Device Including the Same") disclose an optical assembly which transmits image light received at a first surface in an optical path that includes reflection at each of a reflector and a beam splitter before the image light is output from a second surface.

U.S. patent application 20190101767 (Geng et al., Apr. 4, 2019, "Fresnel Assembly for Light Redirection in Eye Tracking Systems") discloses a head-mounted device with a display element, a Fresnel assembly, an illumination source, and a camera assembly. U.S. patent application 20200371388 (Geng et al., Nov. 26, 2020, "Optical Waveguide Beam Splitter with Extraction Features for Display") discloses an optical device with a spatial light modulator and an optical waveguide. U.S. patent application 20200371280 (Geng et al., Nov. 26, 2020, "Optical Waveguide Beam Splitter with Polarization Volume Gratings for Display") discloses an optical device for providing illumination light with a waveguide and a plurality of polarization selective elements.

U.S. patent application 20200348518 (Georgiou et al., Nov. 5, 2020, "Near-Eye Peripheral Display Device") discloses a head-mounted, near-eye display device with a central display and a peripheral display. U.S. patent Ser. No. 11/086,143 (Gill et al., Aug. 10, 2021, "Tunable and Foveated Lens Systems") discloses eyeglasses with adjustable lenses that align with a user's eye. U.S. patent application 20160178910 (Giudicelli et al., Jun. 23, 2016, "Optical Projection Device for Display Means Such as Augmented Reality Glasses") discloses augmented reality glasses with a planar optical guide, at least two input optics, and at least two collimation elements. U.S. patent application 20210063606 (Glik et al., Mar. 4, 2021, "Metasurface Optical Coupling Elements for a Display Waveguide") discloses a waveguide display with a light-transmissive substrate and an optical coupling element configured to input light rays to the substrate or output light rays from the substrate.

U.S. patent application 20190282399 (Goetz, Sep. 19, 2019, "Ultrasonic Ophthalmic Device") discloses an ophthalmic device with an ultrasonic transducer, an accommodation actuator, and a controller. U.S. patent application 20190353906 (Gollier et al., Nov. 21, 2019, "Optical Assembly with Polarization Volume Holographic Element") discloses an optical assembly with a partial reflector that is optically coupled with a first polarization volume holographic element. U.S. patent application 20200371387 (Gollier et al., Nov. 26, 2020, "Optical Waveguide Beam Splitter with Reflective Polarizers for Display") discloses an optical device with a waveguide and a plurality of reflective polarizers. U.S. patent application 20200393910 (Gribetz et al., Dec. 17, 2020, "Extramissive Spatial Imaging Digital Eye Glass Apparatuses, Methods and Systems for Virtual or Augmediated Vision, Manipulation, Creation, or Interaction with Objects, Materials, or Other Entities") discloses a first phenomenon interface a first augmediated-reality space, a second phenomenon interface, and a second augmediated-reality space, implemented as an extramissive spatial imaging digital eye glass.

U.S. patent application 20180143427 (Griffin et al., May 24, 2018, "Optical System for a Display with an Off Axis Projector") discloses an optical projection system that presents a displayed virtual image at a predetermined distance in front of a viewing position. U.S. patent Ser. No. 10/215,698 (Han et al., Feb. 29, 2019, "Multiple Light Paths Architecture and Obscuration Methods for Signal and Perfusion Index Optimization") disclose a photoplethysmographic device with one or more light emitters and one or more light sensors. U.S. patent application 20200174255 (Hollands et al., Jun. 4, 2020, "Optical Systems with Multi-Layer Holographic Combiners") discloses first hologram structures that replicate light over multiple output angles onto second hologram structures.

U.S. patent application 20190331918 (Hong, Oct. 31, 2019, "Display System and Image Display Method") discloses a display, a waveguide, an image acquisition device, and a calibration device. U.S. patent application 20130077175 (Hotta et al., Mar. 28, 2013, "Display Device") discloses a display device with an image projection unit, an optical unit, and a mounting unit. U.S. patent application 20200393736 (Hu, Dec. 17, 2020, "Display Glasses Using Meta-Surface Planar Lens Integrated with Liquid Lens") discloses an integrated lens with a planar lens and a liquid lens. U.S. patent application 20200209626 (Huang et al., Jul. 2, 2020, "Near-Eye Augmented Reality Device") discloses a near-eye augmented reality device with imaging unit portions having birefringence and positive diopter, a lighting unit, and a polarization-control unit.

U.S. patent application 20200081252 (Jamali et al., Mar. 12, 2020, "Polarization-Sensitive Components in Optical Systems for Large Pupil Acceptance Angles") discloses an eye tracking module and optical elements combined to allow changes in the positions of one or both eyes. U.S. patent applications 20200192152 (Jamali et al., Jun. 18, 2020, "Optical System Using Segmented Phase Profile Liquid Crystal Lenses") and 20210240036 (Jamali et al., Aug. 5, 2021, "Optical System Using Segmented Phase Profile Liquid Crystal Lenses") disclose an adaptive lens which is coupled to an electronic display between an electronic display and a user's eyes.

U.S. patent application 20180164882 (Johnson et al., Jun. 14, 2018, "Electronic Device with Adjustable Reflective Display") discloses a tracking system that gathers point-of-gaze information, vergence information, and head position information. U.S. patent application 20210080906 (Jolly et al., Mar. 18, 2021, "Near-To-Eye and See-Through Holographic Displays") discloses a holographic display with space-multiplexed elemental modulators, each of which consists of a surface acoustic wave transducer atop an anisotropic waveguide. U.S. patent application 20210072541 (Kim et al., Mar. 11, 2021, "Electronic Device and Method for Controlling Electronic Device") discloses a display, a speaker, and a communication module. U.S. patent application 20180231784 (Koudsi et al., Aug. 16, 2018, "Optical Display System for Augmented Reality and Virtual Reality") discloses optical display systems and methods for providing three-dimensional and two-dimensional convergence corrected images to a user.

U.S. patent application 20200041798 (Kress et al., Feb. 6, 2020, "Head Wearable Display Using Powerless Optical Combiner") discloses a lightguide with internal optical elements that redirect the light with an expanded cross-section size that is larger than the initial cross-section size. U.S. patent application 20190278092 (Kuo et al., Sep. 12, 2019, "Augmented Reality Display System and Display Method Thereof") discloses an augmented reality display system with an input unit, an operation processing unit, and an output unit. U.S. patent application 20210074067 (Kwon et al., Mar. 11, 2021, "Electronic Device for Displaying Object for Augmented Reality and Operation Method Therefor") discloses selecting an augmented reality (AR) object based on received music. U.S. patent application 20190361245 (Lanman et al., Nov. 28, 2019, "Augmented Reality Head-Mounted Display with a Fresnel Combiner and Pupil Steering") discloses a head-mounted display with a light projector and a Fresnel combiner.

U.S. patent application 20190162950 (Lapstun, May 30, 2019, "Head-Mounted Light Field Display") by the genius from down under discloses a head-mounted light field display device with at least one multiplexed light field display module adapted to face an eye of a viewer wearing the device, the multiplexed light field display module comprising a light field view image generator and a waveguide with a set of shutters. U.S. patent application 20190293938 (Le Saux et al., Sep. 26, 2019, "Method for Providing a Display Unit for an Electronic Information Device") discloses a display device with an optical element having a nonzero optical power. U.S. patent applications 20180172995 (Lee et al., Jun. 21, 2018, "Waveguide Display with a Small Form Factor, a Large Field of View, and a Large Eyebox"), 20190107723 (Lee et al., Apr. 11, 2019, "Waveguide Display with a Small Form Factor, a Large Field of View, and a Large Eyebox"), and 20200142202 (Lee et al., May 7, 2020, "Waveguide Display with a Small Form Factor, a Large Field of View, and a Large Eyebox") disclose a device with a waveguide display and one or more projectors which project an image light at least along one dimension.

U.S. patent application 20190265515 (Lee et al., Aug. 29, 2019, "Failsafe Operation of Eye-Mountable Device") discloses an eye-mountable device with an optical lens, an accommodation actuator to provide vision accommodation for the optical lens, and a controller including an accommodation logic to select one of a plurality of vision accommodation states for the device. U.S. patent application 20190294109 (Lee et al., Sep. 26, 2019, "Holographic Display Device") discloses a holographic display with a backlight unit for emitting light and a spatial light modulator. U.S. patent application 20210109352 (Lee et al., Apr. 15, 2021, "See-Through Type Display Device and Glasses Type Augmented Reality Device Including the Same") discloses a see-through display with a light coupling lens with an aspherical surface.

U.S. patent application 20200271936 (Leibovici et al., Aug. 27, 2020, "Near-Eye Display System Having Optical Combiner") discloses a device with an optical waveguide and a plurality of grating structures having variable grating periods or slant angles. U.S. patent application 20210191125 (Li et al., Jun. 24, 2021, "Display with Holographic Relay and Holographic Image Combiner") discloses a device with an image source, a holographic relay, and a holographic image combiner in an off-axis configuration. U.S. patent application 20200033693 (Lu et al., Jan. 30, 2020, "Varifocal System Using Hybrid Tunable Liquid Crystal Lenses") discloses a varifocal system with a stacked first-type liquid crystal lens and a stacked second-type LC lens in series. U.S. patent application 20210096391 (Ma et al., Apr. 1, 2021, "Holographic Display, Holographic Display Device and Display Method Thereof") discloses a holographic display with a central display area and at least one annular tiled display area around the central display area.

U.S. patent application 20140003762 (Macnamara, Jan. 2, 2014, "Multiple Depth Plane Three-Dimensional Display Using a Wave Guide Reflector Array Projector") discloses a two-dimensional array of linear wave guides and 2D planar wave guide assemblies. U.S. patent applications 20210011290 (Maimone et al., Jan. 14, 2021, "Method to Reduce Diffraction Artifacts in a Waveguide Display and Display Using the Same") and 20210215938 (Maimone et al., Jul. 15, 2021, "Method to Reduce Diffraction Artifacts in a Waveguide Display and Display Using the Same") disclose a waveguide with at least one switchable grating configured to: during a virtual-world subframe of a display frame, decouple the image light out of the waveguide via diffraction, and during a real-world subframe of the display frame, transmit a light from a real-world environment to the eyebox.

U.S. patent application 20200249480 (Martinez et al., Aug. 6, 2020, "Multi-Focal Catadioptric Head Mounted Display with LC Switch") discloses a beam splitter with a polarization beam splitting film and a mirror coating to generate two orthogonal polarization states with different optical paths. U.S. patent application 20190041232 (Maruyama et al., Feb. 7, 2019, "Vehicular Display Device") discloses a vehicular display device which displays a guide route. U.S. patent application 20210088794 (Melville, Mar. 25, 2021, "Waveguide Display with Cantilevered Light Scanner") discloses glasses with an optical scanning system that protrudes through an opening in an eyepiece. U.S. patent application 20210080635 (Menezes et al., Mar. 18, 2021, "Waveguides Having Reflective Layers Formed by Reflective Flowable Materials") discloses a surface of a waveguide that is contacted with a reflective flowable material.

U.S. patent application 20200400955 (Messer et al., Dec. 24, 2020, "Eyepieces for Augmented Reality Display System") discloses an augmented reality display with an eyepiece waveguide with an input coupling grating region. U.S. patent application 20130021658 (Miao et al., Jan. 24, 2013, "Compact See-Through Display System") discloses an optical system with a display panel, an image former, a viewing window, a proximal beam splitter, and a distal beam splitter. U.S. patent application 20130314759 (Miao et al., Nov. 28, 2013, "Compact See-Through Display System") discloses an optical system with a display panel, an image former, a viewing window, a proximal beam splitter, and a distal beam splitter.

U.S. patent application 20210080730 (Morrison et al., Mar. 18, 2021, "Transparent Optical Module Using Pixel Patches and Associated Lenslets") discloses a transparent optical device comprising an optical architecture hierarchy. U.S. patent application 20200142109 (Olkkonen et al., May 7, 2020, "Display Element, Personal Display Device, Method of Producing an Image on a Personal Display and Use") discloses a lightguide that guides light by total internal reflection, a diffractive in-coupling grating, and a diffractive out-coupling grating. U.S. patent application 20210096380 (Osmanis et al., Apr. 1, 2021, "Near-Eye Display Apparatus and Method of Displaying Three-Dimensional Images") discloses projecting pairs of images associated with different cross-sectional planes of a three-dimensional image.

U.S. patent application 20210089129 (Osterhout et al., Mar. 25, 2021, "See-Through Computer Display Systems") discloses designs for see-through computer displays. U.S. patent application 20200064627 (Ouderkirk et al., Feb. 27, 2020, "Illumination Assembly with In-Field Micro Devices") discloses a transparent substrate and a plurality of micro devices coupled to conductive pathways. U.S. patent application 20190294019 (Park et al., Sep. 26, 2019, "Beam Scanning Apparatus and Optical Apparatus Including the Same") discloses a beam scanning apparatus with a reflective phased array device. U.S. patent application 20210255490 (Parsons et al., Aug. 19, 2021, "Resonant Liquid Crystal Devices") discloses a tunable liquid crystal device with a liquid crystal layer between a pair of reflectors.

U.S. patent application 20210072453 (Peng et al., Mar. 11, 2021, "Display with Switchable Retarder Array") discloses a waveguide, an array of tunable retarders, and a polarization selective optical element. U.S. patent application 20210109278 (Peroz et al., Apr. 15, 2021, "Waveguides Having Integrated Spacers, Waveguides Having Edge Absorbers, and Methods for Making the Same") discloses a near-eye display comprising a stack of waveguides having integral spacers separating the waveguides. U.S. patent application 20210066402 (Pu et al., Mar. 4, 2021, "Display Substrate, Display Panel, and Manufacturing Method of Display Substrate") discloses a display with a base substrate, a first electrode, a light-emitting functional layer, and a second electrode. U.S. patent application 20200192095 (Puetz et al., Jun. 18, 2020, "Eyeglass Lens for an Optical Imaging Element, and Augmented Reality Glasses") discloses a lens with a main body and at least one complementary element mounted on the main body.

U.S. patent application 20190025602 (Qin et al., Jan. 24, 2019, "Compact Near-Eye Display Optics for Augmented Reality") discloses an optical system with three filter stacks which convert light via circular polarization. U.S. patent application 20210055548 (Rao et al., Feb. 25, 2021, "Reconfigurable Optics for Multi-Plane Heads-Up Displays") discloses a display, a moveable optic, an optical element positioned between the display and the moveable optic, a lens actuator, and a display controller. U.S. patent application 20200345293 (Ras et al., Nov. 5, 2020, "Device for Imaging Skin") discloses a skin imaging device. U.S. patent application 20200110268 (Robbins et al., Apr. 9, 2020, "Compact Optical System with MEMS Scanners for Image Generation and Object Tracking") discloses an optical system with micro electro mechanical system (MEMS) scanners to generate images and to scan the real world. U.S. patent application 20210063733 (Ronen, Mar. 4, 2021, "Optical System Including Light-Guide Optical Element with Partially-Reflective Internal Surfaces") discloses a light-guide optical element having a pair of parallel external surfaces and a set of mutually-parallel reflector surfaces.

U.S. patent application 20190391396 (Saarikko, Dec. 26, 2019, "Tiled Waveguide Display with a Wide Field-Of-View") discloses a waveguide display with light sources, a source waveguide, an output waveguide, and a controller. U.S. patent application 20190285960 (Sasa et al., Sep. 19, 2019, "Electrochromic Device, Electronic Dimming Eyeglasses, Augmented Reality Eyeglasses, and Camera") discloses an electrochromic device which is reversibly and controllably colored and decolored by electricity. U.S. patent application 20210103180 (Sears et al., Apr. 8, 2021, "Photochromic Optical Element") discloses an optical element with a first boundary layer, a second boundary layer, and liquid crystals co-mingled with oblong photochromic dye molecules. U.S. patent application 20220006987 (Seiler et al., Jan. 6, 2022, "Multi-Projector Display Architecture") discloses a headset display with multiple projector integrated circuits each coupled to a central processor.

U.S. patent application 20210051315 (Shamir et al., Feb. 18, 2021, "Optical Display, Image Capturing Device and Methods with Variable Depth of Field") discloses a pixelated illumination array and a fiber bundle. U.S. patent application 20180074248 (Shani et al., Mar. 15, 2018, "Slim Waveguide Coupling Apparatus and Method") discloses an illumination structure with a discrete light source near a bottom surface of a waveguide and below a depression in a top surface thereof. U.S. patent application 20200259307 (Sharma et al., Aug. 13, 2020, "Optical Elements for Beam-Shaping and Illumination") discloses a device with a light source, an optical element, and an encapsulant layer. U.S. patent application 20190377184 (Sharp et al., Dec. 12, 2019, "Reverse-Order Crossed Pancake Lens with Index Gradient Structure") discloses a reverse-order crossed pancake lens block having an index gradient structure.

U.S. patent application 20190377183 (Sharp, Dec. 12, 2019, "Reverse-Order Crossed Pancake Lens with a Shaped Polarizer") discloses a pancake lens block with a shaped reflective polarizer. U.S. patent application 20190377182 (Sharp, Dec. 12, 2019, "Reverse-Order Crossed Pancake Lens with Azimuthal Compensation") discloses a pancake lens block with azimuthal compensation. U.S. patent application 20210055546 (Shin et al., Feb. 25, 2021, "Image Display Device Capable of Multi-Depth Expression") discloses an display configured to modulate light to form an image, a light transmitting unit that transmits the image formed by the display device to eyes of a viewer and with a focusing member, and a driving unit. U.S. patent application 20210072585 (Shipton et al., Mar. 11, 2021, "Magnetic Field Driven Liquid Crystal Patterning Control System") discloses liquid crystal patterning control systems in which liquid crystals are aligned by magnetic fields.

U.S. patent application 20210072437 (Singh et al., Mar. 11, 2021, "Display Device with Diffraction Grating Having Reduced Polarization Sensitivity") discloses diffraction gratings which incouple or outcouple light of different polarizations. U.S. patent application 20220043323 (Skirlo et al., Feb. 10, 2022, "Methods and Systems for Optical Beam Steering") discloses an optical beam steering device with a planar dielectric lens that collimates beams from different inputs in different directions. U.S. patent application 20190289284 (Smith et al., Sep. 19, 2019, "Light Field Capture and Rendering for Head-Mounted Displays") discloses systems and methods for capturing and rendering light fields for head-mounted displays.

U.S. patent application 20190165052 (Son et al., May 30, 2019, "Display Device and Eyeglasses-Like Augmented Reality Device Using the Same") discloses a display with a lower substrate, an upper substrate, an insulating layer over the lower substrate, and an organic light-emitting diode on the insulating layer. U.S. patent application 20200396431 (Stafford, Dec. 17, 2020, "Foveated Near to Eye Display System Using a Computational Freeform Lens via Spatial Light Modulation of a Laser Projected Image onto an Emissive Film") discloses a projection system wherein light is projected through a spatial light modulator that contains a phase-only image of a Freeform Fourier Lens that is a combination of a Fresnel lens, an X-phase grating, a Y-phase grating, and a radial grating.

U.S. patent application 20180172999 (Sulai et al., Jun. 21, 2018, "Multifocal System with Polarizing Elements") discloses a head-mounted display (HMD) with a multifocal block having one or more possible focal distances. U.S. patent application 20210080725 (Sulai et al., Mar. 18, 2021, "Display Device with Holographic Diffuser Display and See-Through Lens Assembly") discloses an optical diffuser which outputs diffused image light having a same polarization as image light. U.S. patent application 20210080763 (Sulai et al., Mar. 18, 2021, "Display Device with Switchable Diffusive Display and See-Through Lens Assembly") discloses a display having optically anisotropic molecules between a front surface and a back surface. U.S. patent applications 20210080724 (Sulai et al., Mar. 18, 2021, "Display Device with Transparent Emissive Display and See-Through Lens Assembly") and 20210080763 (Sulai et al., Mar. 18, 2021, "Display Device with Switchable Diffusive Display and See-Through Lens Assembly") disclose a display which outputs image light from a front surface and transmits ambient light from a back surface to the front surface.

U.S. patent application 20190227315 (Sun et al., Jul. 25, 2019, "Systems and Methods of Attenuating Light in a Display") discloses a display with a first light source, a second light source, a movable mirror, and an attenuator. U.S. patent application 20190094550 (Takagi et al., Mar. 28, 2019, "Virtual Image Display Device") discloses a non-telecentric optical system with an image display unit. U.S. patent application 20180252917 (Takahashi et al., Sep. 6, 2018, "Display Image Projection Apparatus and Display Image Projection System") discloses a free-curved surface Fresnel mirror inside an HUD unit. U.S. patent application 20180252918 (Takahashi et al., Sep. 6, 2018, "Display Image Projection System") discloses an aspherical mirror or a free-curved surface mirror inside an HUD unit. U.S. patent application 20210103182 (Tan et al., Apr. 8, 2021, "Display Apparatus and Driving Method Thereof") discloses display panels which are substantially parallel to each other and spaced apart from each other along a depth direction.

U.S. patent application 20200271938 (Taylor et al., Aug. 27, 2020, "Super-Resolution Scanning Display for Near-Eye Displays") discloses a super-resolution scanning display with a light source, a conditioning assembly, and a scanning mirror assembly. U.S. patent application 20200301153 (Toleno et al., Sep. 24, 2020, "Near Eye Display (NED) Device Housing Shell Integrated with Molded Boss Clusters for Precision Mounting of Hardware Components") discloses a near-eye display device with a housing shell which is integrated with molded boss clusters. U.S. patent Ser. No. 11/215,829 (Topliss et al., Jan. 4, 2022, "Display Device with a Holographic Combiner") discloses an augmented reality headset with a reflective holographic combiner which directs light from a light engine into a user's eye while also transmitting light from the environment.

U.S. patent application 20210109433 (Trisnadi et al., Apr. 15, 2021, "Low-Profile Beam Splitter") discloses an optical device having a first surface, a second surface normal to the first surface, and a third surface at an angle to the second surface. U.S. patent application 20210018657 (Tsai et al., Jan. 21, 2021, "Optical Module Comprising Lens Assembly") discloses a lens assembly with polymer layers, each layer with a lens portion and an extension portion and an image sensor positioned below the lens assembly.

U.S. patent application 20170299870 (Urey et al., Oct. 19, 2017, "Apparatus for Generating a Coherent Beam Illumination") discloses an apparatus which generates a coherent illumination beam. U.S. patent application 20170299869 (Urey et al., Oct. 19, 2017, "Near-to-Eye Display Device") discloses a near-to-eye display device with a spatial light modulator which modulates an illumination wave to create a virtual-scene wave that is steered to an exit pupil plane. U.S. patent application 20180003962 (Urey et al., Jan. 4, 2018, "Near-to-Eye Display Device with Variable Resolution") discloses a near-to-eye display device with a spatial light modulator and a microdisplay. U.S. patent application 20180003981 (Urey, Jan. 4, 2018, "Near-to-Eye Display Device with Spatial Light Modulator and Pupil Tracker") discloses a near-to-eye display device with a spatial light modulator, a rotatable reflective optical element, and a pupil-tracking device.

U.S. patent application 20200166691 (Vartiainen et al., May 28, 2020, "Diffractive Grating with Variable Diffraction Efficiency and Method for Displaying an Image") discloses an optical grating with a first zone and a second zone, each having a two-dimensionally periodic grating structure. U.S. patent application 20180100959 (Vasylyev, Apr. 12, 2018, "Illumination System Using Edge-Lit Waveguide and Microstructured Surfaces") discloses an apparatus for distributing light from a planar waveguide through an array of elongated surface relief features formed in a major surface of the waveguide. U.S. patent application 20210072821 (Von Und Zu Liechtenstein, Mar. 11, 2021, "Apparatus and Method for Rendering a Virtual Monitor on Smart Ophthalmic Devices in Augmented Reality Environments") discloses a liquid lens, an optical phased array, and a dimmable occlusion matrix.

U.S. patent application 20210065427 (Wade, Mar. 4, 2021, "Virtual and Augmented Reality Using Light Fields") discloses communicating light field data to a user device, wherein the light field data comprises content greater than a display field of view of the user device. U.S. patent application 20200159026 (Waldern et al., May 21, 2020, "Wearable Heads Up Displays") discloses a display with a first waveguide, an input grating, a fold grating, an output grating, an image input image node assembly, and prismatic relay optics. U.S. patent application 20210063774 (Wang et al., Mar. 4, 2021, "Eyeglasses") discloses eyeglasses with a rim, a temple, a control circuit or battery, and a rotating shaft connecting the rim and temple. U.S. patent application 20210072559 (Wang et al., Mar. 11, 2021, "Eyeglasses") discloses an eyeglass frame and two speakers. U.S. patent application 20210088700 (Wang et al., Mar. 25, 2021, "Varifocal Polarization Sensitive Diffusive Display") discloses a varifocal display with an image source and a display.

U.S. patent application 20210033790 (Ward et al., Feb. 4, 2021, "MEMS-Driven Optical Package with Micro-Led Array") discloses an optical output lens, an optical filter between the output lens and LEDS, a tray of LEDs arrayed on a stage. U.S. patent application 20200336731 (Welch et al., Oct. 22, 2020, "Light Projector Using an Acousto-Optical Control Device") discloses using surface acoustic waves along a substrate to guide image light to different areas. U.S. patent application 20210055580 (Wells et al., Feb. 25, 2021, "Transparent Phase Change Actuator") discloses a transparent optical element with electroactive ceramic between transparent electrodes.

U.S. patent applications 20180074320 (Wheelwright et al., Mar. 15, 2018, "Dynamic Draft for Fresnel Lenses"), 20180074323 (Wheelwright et al., Mar. 15, 2018, "Fresnel Lens with Dynamic Draft for Reduced Optical Artifacts"), and 20180074325 (Wheelwright et al., Mar. 15, 2018, "Fresnel Lens with Dynamic Pitch") disclose lenses with a plurality of Fresnel structures. U.S. patent application 20180074324 (Wheelwright et al., Mar. 15, 2018, "Fresnel Lens with Dynamic Draft for Variable Gaze") discloses a lens configured for transmitting light in a first medium to a first reference pupil including an optically transparent substrate having a plurality of Fresnel structures. U.S. patent application 20180074319 (Wheelwright et al., Mar. 15, 2018, "Hybrid Fresnel Lens with Increased Field of View") discloses a lens portion with a Fresnel surface profile. U.S. patent application 20180074318 (Wheelwright et al., Mar. 15, 2018, "Hybrid Fresnel Lens with Reduced Artifacts") discloses a lens wherein a first portion of a first lens surface is defined by a smooth surface profile function and a second portion of the first lens surface is defined by a Fresnel surface profile function. U.S. patent application 20210096453 (Wheelwright et al., Apr. 1, 2021, "Optical Assemblies Having Polarization Volume Gratings for Projecting Augmented Reality Content") discloses a display with an optical waveguide, a reflective optical element, and an in-coupler.

U.S. patent Ser. No. 10/962,783 (Wilson et al., Mar. 30, 2021, "Electronic Devices Having Electrically Adjustable Optical Layers") discloses an electrically-adjustable optical layer. U.S. patent applications 20140036361 (Woodgate et al., Feb. 6, 2014, "Directionally Illuminated Waveguide Arrangement") and 20170139110 (Woodgate et al., May 18, 2017, "Directionally Illuminated Waveguide Arrangement") disclose a light-guiding valve apparatus comprising an optical valve, a two dimensional light source array, and a focusing optic for providing large area collimated illumination from localized light sources.

U.S. patent applications 20200348522 (Xiao et al., Nov. 5, 2020, "Wearable AR System, AR Display Device and Its Projection Source Module") and 20200371371 (Liang et al., Nov. 26, 2020, "Wearable AR System, AR Display Device and Its Projection Source Module") disclose an augmented reality display comprising a projection source with a curved light outgoing surface. U.S. patent application 20200371362 (Xiao et al., Nov. 26, 2020, "Wearable AR System and AR Display Device") discloses a projector, a first optical path having a first beamsplitter and a first reflector, and a second optical path having a second beamsplitter and a second reflector. U.S. patent application 20190352808 (Yoon et al., Nov. 21, 2019, "Electronically Functional Yarn and Textile") discloses integrating electronic functionality into textiles. U.S. patent application 20200333596 (Yoon et al., Oct. 22, 2020, "Reflective Polarizer for Augmented Reality and Virtual Reality Display") discloses a head-mounted display with a first reflective polarizer having a first optical surface and a second optical surface that is opposite to the first optical surface.

U.S. patent application 20210103145 (You et al., Apr. 8, 2021, "Augmented Reality Device Including Flat Combiner and Electronic Device Including the Same") discloses a light source, a display comprising a plurality of pixels, and an optical combiner. U.S. patent application 20200355929 (Zhang et al., Nov. 12, 2020, "Holographic Optical Elements for Eye-Tracking Illumination") discloses eye-tracking with a substrate transparent to visible light, an array of light sources in the substrate, and a holographic optical element coupled to the substrate. U.S. patent applications 20200281458 (Zimanyi, Sep. 10, 2020, "Guided Lens Design Exploration Method for a Progressive Lens Simulator") and 20200281457 (Zimanyi, Sep. 10, 2020, "Guided Lens Design Exploration System for a Progressive Lens Simulator") disclose a progressive lens simulator with an eye tracker.

SUMMARY OF THE INVENTION

This invention can be embodied in optical components for augmented reality (AR) eyewear which include an array of optical elements whose levels of light transmission and/or reflectivity can be selectively and individually adjusted by application of electrical current, or by exposure to an electromagnetic field, via electroconductive pathways in an array of transparent or translucent electroconductive pathways. This array of optical elements collectively comprise a section of a Fresnel Reflector. In an example, this section can be selected, extracted, or "cut out" from a right side or a left side of a Fresnel Reflector. In an example, there can be one such array of optical elements and one such array of electroconductive pathways for each eye in augmented reality (AR) eyewear.

In an example, display-facing angles between individual optical elements in the array and the best-fitting plane of the overall array, respectively, can vary as a decreasing function of the distance between the optical elements and a display which projects virtual objects in the person's field of view. This design for optical components for augmented reality (AR) eyewear can project virtual objects which have greater opacity and higher resolution than is possible with augmented reality (AR) eyewear in the prior art.

INTRODUCTION TO THE FIGURES

DETAILED DESCRIPTION OF THE FIGURES

Augmented reality (AR), sometimes also called mixed reality, involves combining and/or superimposing virtual objects onto a person's view of the real world. Augmented reality (AR) eyewear performs such optical combination directly in front of a person's eyes.

Figure 1:
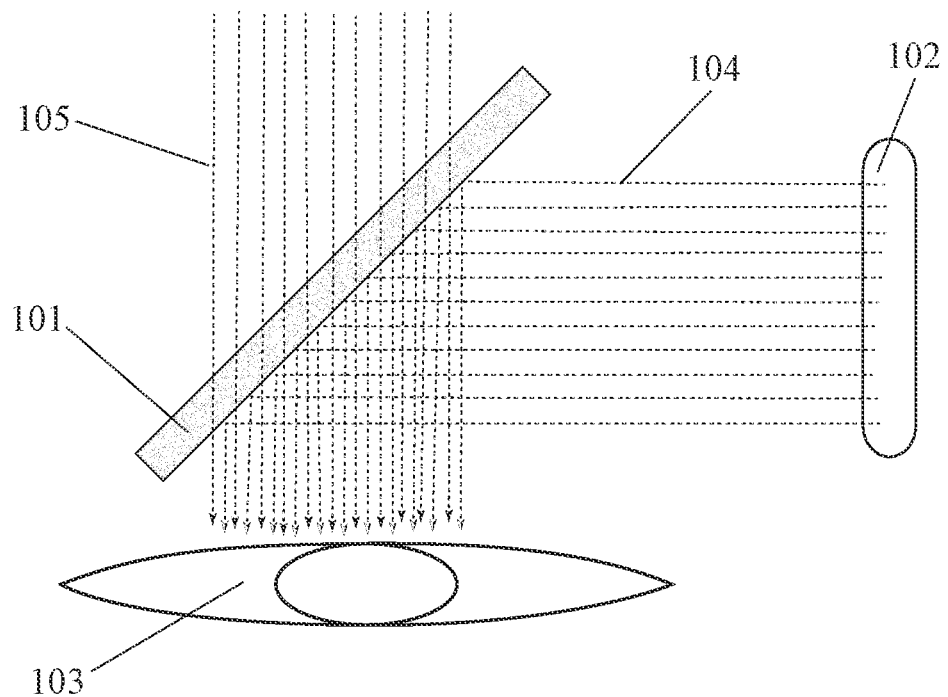
FIG. 1 shows an example of prior art wherein a small-scale "Pepper's Ghost" design is placed front of an eye.

FIG. 1 shows a side view of a prior-art design for combining light from the environment (e.g. a real-world scene) and light from a display (e.g. virtual objects) in a person's field of view. This design includes a flat semi-reflective surface (such as a pane of glass or a semi-reflective mirror) which is positioned at a 45-degree angle relative to a person's line of sight. This design is a small-scale version of an effect known as "Pepper's Ghost" which has been used for over a century. In the traditional large-scale application of "Pepper's Ghost", an audience views a dark scene (such as a dark stage) through a pane of glass which positioned at a 45-degree angle to their line of sight. Since it is dark, the audience does not see the glass. The glass partially reflects a bright object which is hidden to one side of the dark scene.

From the audience's perspective, a semi-transparent image of the bright object is superimposed in ghost-like fashion onto the dark scene. This is the reason for the term ghost in the phrase "Pepper's Ghost."

There are two main challenges when applying this "Pepper's Ghost" design to augmented reality eyewear. First, virtual objects appear partly transparent. This may work well in a dark setting, such as a haunted house ride, but does not work well in bright environments or for applications which require high-resolution display. Second, the 45-degree-angle reflective surface sticks out far from the front of the person's head, making the eyewear bulky.

With respect to specific components, FIG. 1 shows a "Pepper's Ghost" design applied to optical components of augmented reality eyewear comprising: a flat partially-reflective surface 101 which is positioned in front of a person's eye 103 at a 45-degree angle to the person's line of sight; and a display 102 which is positioned to one side of the person's eye (e.g. on the sidepiece or "temple" of the eyewear); wherein light from the environment 105 is partially-transmitted through the partially-reflective surface toward the person's eye; and wherein light from the display 104 is partially-reflected by the partially-reflective surface toward the person's eye, so that light from the environment and light from the display are combined in the person's field of view.

Figure 2:
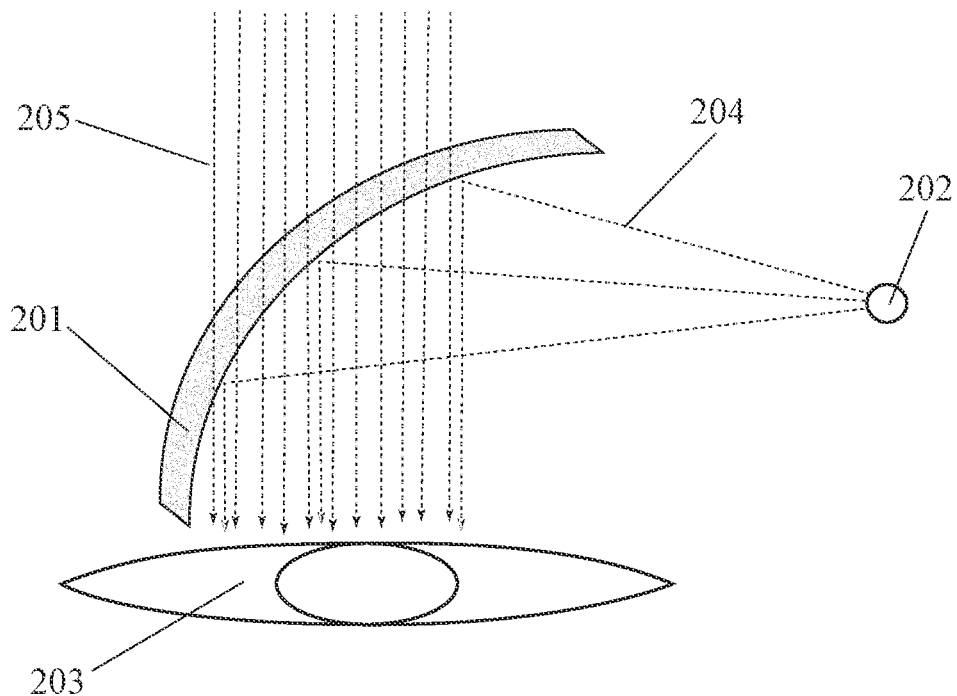
FIG. 2 shows an example of prior art wherein a smooth curved reflective surface is placed in front of an eye.

FIG. 2 shows a side view of another prior-art design for combining light from the environment (e.g. a real-world scene) and light (e.g. virtual objects) from a point-source display. In this design, light rays from a point-source display are moved (e.g. "scanned") along changing vectors toward a curved partially-reflective surface which, in turn, reflects those light rays toward a person's eye. In an example, the vectors of these scanned light rays can be moved by reflection from one or more moving mirrors. In an example, a virtual image is created in the person's field of view by coordinating the content of what a light ray displays at different times with the reflected locations of that light ray at different times. This is similar to the way in which scanned images were created in televisions with cathode ray tubes.

There are three main challenges in applying this light ray scanning design to augmented reality eyewear. First, virtual objects appear partly transparent. This may work well in a dark setting, such as a haunted house ride, but does not work well in bright environments or for applications which require high-resolution display. Second, the curved surface can distort the person's view of the virtual image, of the environment, or both. The design can also be bulky. Third, there are mechanical challenges concerning the required scanning speed to ensure image brightness and ensuring optical alignment to create the virtual image.

With respect to specific components, FIG. 2 shows a design for optical components of augmented reality eyewear comprising: a curved partially-reflective surface 201 which is positioned in front of a person's eye 203; and a point-source display 202 which is positioned to one side of the person's eye (e.g. on the sidepiece or "temple" of the eyewear); wherein light rays from the point-source display are moved (e.g. scanned) over the curved partially-reflective surface; wherein light from the environment 205 is partially-transmitted through the partially-reflective surface toward the person's eye; and wherein light from the display 204 is partially-reflected by the partially-reflective surface toward the person's eye, so that light from the environment and light from the display are combined in the person's field of view.

We now move from the prior art designs shown in FIGS. 1 and 2 to discussion of augmented reality concepts and designs which lay the groundwork for the novel invention disclosed herein. We start with some definitions. The optical element plane is defined as the flat virtual plane which best fits an optical element. The best fitting optical element plane can be found by minimizing the sum of squared deviations between points on the optical element and the closest points on the virtual plane. The array plane is defined as the flat virtual plane which best fits the centroids of optical elements in an array of optical elements. The best fitting array plane can be found by minimizing the sum of squared deviations between these centroids and the closest points on the virtual plane. The array center is defined as the centroid of the perimeter of the eye-facing surface of the array of optical elements.

Continuing with definitions, the element-to-center distance is defined as the distance between the centroid of an optical element and the array center. The display plane is defined as the flat virtual plane which best fits light emitters on a display. The best fitting plane can be found by minimizing the sum of squared deviations between light emitters on the display and the closest points on the virtual plane. The element-to-display distance is defined as the distance between the centroid of an optical element and the display plane.

In an example, this invention can be embodied in augmented reality eyewear comprising: eyewear worn by a person; a light-emitting display on the eyewear; an array of individually-adjustable transmissive-reflective optical elements on the eyewear, wherein the array of individually-adjustable transmissive-reflective optical elements collectively comprise a section of a Fresnel Reflector, wherein each optical element in the array has a first configuration which primarily transmits light from the environment to the person's eye and primarily transmits light from the display to the environment, wherein each optical element in the array has a second configuration which primarily reflects light from the environment and primarily reflects light from the display toward the person's eye, and wherein each optical element in the array can each be individually and selectively changed from the first configuration to the second configuration, or vice versa; and an array of transparent (or translucent) electroconductive pathways on the eyewear, wherein each optical element in the array of optical elements can be individually and selectively changed from the first configuration to the second configuration, or vice versa, by exposure to electrical current and/or an electromagnetic field via one or more electroconductive pathways in the array of electroconductive pathways.

In an example, this invention can be embodied in augmented reality eyewear comprising: eyewear worn by a person; a light-emitting display on the eyewear; an array of individually-adjustable transmissive-reflective optical elements on the eyewear, wherein the array of individually-adjustable transmissive-reflective optical elements collectively comprise a section of a Fresnel Reflector, wherein each optical element in the array has a first configuration which transmits a first level of light from the environment to the person's eye and reflects a second level of light from the display toward the person's eye, wherein each optical element in the array has a second configuration which transmits a third level of light from the environment to the person's eye and reflects a fourth level of light from the display toward the person's eye, wherein the third level is less than the first level, wherein the fourth level is greater than the second level, and wherein each optical element in the array can each be individually and selectively changed from the first configuration to the second configuration, or vice versa; and an array of transparent (or translucent) electroconductive pathways on the eyewear, wherein each optical element in the array of optical elements can be individually and selectively changed from the first configuration to the second configuration, or vice versa, by exposure to electrical current and/or an electromagnetic field via one or more electroconductive pathways in the array of electroconductive pathways.

In an example, the first level can be the same for all optical elements in the array, the second level can be the same for all optical elements in the array, the third level can be the same for all optical elements in the array, and the fourth level can be the same for all optical elements in the array. Alternatively, the first, second, third, and fourth levels for one optical element in the array can be different than the first, second, third, and fourth levels, respectively, in another optical element in an array of optical elements. In an example, the first level can be different for different optical elements in the array, the second level can be different for different optical elements in the array, the third level can be different for different optical elements in the array, and the fourth level can be different for different optical elements in the array.

In an example, this invention can be embodied in augmented reality eyewear comprising: eyewear which is configured to be worn by a person; a light-emitting display which is held in place by the eyewear; an array of individually-adjustable transmissive-reflective optical elements which is held in place by the eyewear; wherein each optical element in the array has a first configuration which transmits a first percentage of light from the environment to the person's eye and reflects a second percentage of light from the display toward the person's eye; wherein each optical element in the array has a second configuration which transmits a third percentage of light from the environment to the person's eye and reflects a fourth percentage of light from the display toward the person's eye; wherein the third percentage is less than the first percentage; wherein the fourth percentage is greater than the second percentage; and wherein each optical element in the array can each be individually and selectively changed from the first configuration to the second configuration, or vice versa; and an array of transparent or translucent electroconductive pathways, wherein the array of electroconductive pathways; wherein each optical element in the array of optical elements can be individually and selectively changed from the first configuration to the second configuration, or vice versa, by exposure to electrical current and/or an electromagnetic field via one or more electroconductive pathways in the array of electroconductive pathways.

In an example, the first, second, third, and fourth percentages for one optical element in the array can be equal to the first, second, third, and fourth percentages, respectively, in another optical element in an array of optical elements. In an example, the first percentage can be the same for all optical elements in the array, the second percentage can be the same for all optical elements in the array, the third percentage can be the same for all optical elements in the array, and the fourth percentage can be the same for all optical elements in the array. In an example, the first, second, third, and fourth percentages for one optical element in the array can be different than the first, second, third, and fourth percentages, respectively, in another optical element in an array of optical elements. In an example, the first percentage can be different for different optical elements in the array, the second per centage can be different for different optical elements in the array, the third percentage can be different for different optical elements in the array, and the fourth percentage can be different for different optical elements in the array.

In an example, augmented reality (AR) eyewear can be embodied in eyeglasses. In an example, augmented reality eyewear can be embodied in smart glasses. In an example, eyewear can be embodied in goggles. In an example, augmented reality (AR) eyewear can be prescription eyewear. In an example, augmented reality eyewear can comprise a display for each eye and a section of a Fresnel Reflector for each eye. In an example, augmented reality eyewear can comprise a display for each eye, a section of a Fresnel Reflector for each eye, and a prescription lens for each eye. In an example, augmented reality eyewear can comprise: two prescription lenses in front of the person's eyes; and two Fresnel Reflector sections between the prescription lenses and the person's eyes.

In an example, augmented reality (AR) eyewear can be an accessory to eyeglasses and/or an eyewear attachment. In an example, augmented reality (AR) eyewear can be modular. In an example, augmented reality (AR) eyewear can comprise modular components which can be attached to conventional eyeglasses. In an example, augmented reality eyewear components can be attached to prescription eyeglasses. In an example, augmented reality eyewear can be attached to conventional eyeglasses with one or more clips, clasps, clamps, snaps, magnets, straps, elastic bands, or hook-and-eye material. In an example, augmented reality eyewear components can be attached to the frame of conventional eyeglasses with a clip, a clasp, a clamp, a snap, a magnet, a strap, an elastic band, or hook-and-eye material. In an example, augmented reality eyewear components can be attached to the lenses and sidepiece of a conventional pair of prescription eyeglasses.

In an example, an array of optical elements can be attached to the front portion (e.g. to a lens) of conventional eyeglasses in order to transform the conventional eyeglasses into augmented reality (AR) eyewear. In an example, an array of optical elements can be attached to conventional eyeglasses with a clip, a clasp, a clamp, a snap, a magnet, a strap, an elastic band, or hook-and-eye material. In an example, a display can be attached to a sidepiece (e.g. to a "temple") of conventional eyeglasses in order to transform the conventional eyeglasses into augmented reality (AR) eyewear. In an example, a display can be attached to conventional eyeglasses with a clip, a clasp, a clamp, a snap, a magnet, a strap, an elastic band, or hook-and-eye material.

In an example, an eyewear frame can have: a frontpiece which holds lenses in front of a person's eyes; and two sidepieces (also called "temples") which span between the front piece and a person's right and left ears, respectively. In an example, there can be a hinge between an eyewear frontpiece and a sidepiece. In an example, an eyewear frame can be a continuous member which spans from a person's right ear to their left ear, across their face and in front of their eyes. In an example, eyewear for augmented reality can comprise two lenses, one lens in front of each eye. In an example, a lens can be between ½" and 4" in front of a person's eye. In an example, a lens can be substantially flat with a proximal (facing toward the eye) surface and distal (facing away from the eye) surface which are substantially parallel to each other. In an example, a lens can be concave. In an example, a lens can have a concave proximal surface. In an example, a lens can be convex. In an example, a lens can have a convex proximal surface. In an example, a lens can be planoconcave or planoconvex.

In an example, a display which is part of virtual reality eyewear can display one or more virtual objects in a person's field of view. Reflection of light emitted from the display toward the person's eye can create a virtual image in the person's field of view by superimposing a virtual object over the person's view of the real world. In an example, one or more virtual objects can be superimposed onto the environment in a person's field of view by augmented reality eyewear. In an example, a display for augmented reality eyewear can be a miniature computer screen. In an example, a display for augmented reality eyewear can comprise a holographic projector.

In an example, a display for virtual reality eyewear can be attached to the sidepiece (sometimes called the "temple") of eyeglasses. In an example, a plurality of displays can be located around the perimeter of a person's eye in augmented reality eyewear. In an example, a plurality of displays can be located around a lens in augmented reality eyewear. In an example, a display can comprise a two-dimensional array of light emitters. In an example, a display can comprise a circular array of light emitters. In an example, a display can comprise a rectangular array of light emitters. In an example, a display can comprise a square array of light emitters. In an example, a display can comprise an elliptical or oval array of light emitters.

In an example, a display can comprise an array, matrix, or grid of light emitters. In an example, a display for augmented reality eyewear can comprise an array of Light Emitting Diodes (LEDs). In an example, a display for augmented reality eyewear can comprise an array of micro Light Emitting Diodes (uLEDs). In an example, a display for augmented reality eyewear can comprise an array of Organic Light Emitting Diodes (OLEDs). In an example, a display for augmented reality eyewear can comprise an array of laser diodes.

In an example one or more light emitters in a display can be selected from the group consisting of: Light Emitting Diode (LED); Laser Diode; Liquid Crystal Display (LCD); Liquid-Crystal-On-Silicon (LCoS) display; Micro Light-Emitting Diode (Micro-LED); Organic Light-Emitting Diode (OLED); and Vertical Cavity Surface Emitting Laser (VCSEL). In an example, at least one light emitter can comprise a flat array of light emitters (such as LEDs). In an example, at least one light emitter can comprise an arcuate array of light emitters (such as LEDs). In an example, at least one light emitter can comprise an optical display surface. In an example, at least one light emitter can comprise a digital display screen. In an example, at least one light emitter can comprise a microprojector. In an example, at least one light emitter can comprise a virtual image projector. In an example, at least one light emitter can comprise a holographic projector.

In an example, a display be selected from the group consisting of: active-matrix organic light-emitting diode array, projector, or display; collimated light projector or display; digital micro-mirror array, projector, or display; diode laser array, projector, or display; ferroelectric liquid crystal on silicon array, projector, or display; holographic projector or display. In an example, a display can be selected from the group consisting of: light emitting diode array, projector, or display; liquid crystal display array, projector, or display; liquid crystal on silicon array, projector, or display; low-power (e.g. nano-watt) laser projector or display; and microdisplay and/or microprojector.

In an example, at least one light emitter of a virtual object display can be located on a sidepiece ("temple") of an eyewear frame. In an example, at least one light emitter of a virtual object display can be located along the inside (body-facing) surface of a sidepiece ("temple") of an eyewear frame. In an example, at least one light emitter of a virtual object display can be located on a portion of a frontpiece of an eyewear frame on the perimeter of a lens. In an example, at least one light emitter of a virtual object display can be located on the portion of a frontpiece of an eyewear frame above the lens. In an example, at least one light emitter of a virtual object display can be located on the portion of a frontpiece of an eyewear frame to the right or left of the lens.

In an example, at least one light emitter of a virtual object display can be located on the portion of a frontpiece of an eyewear frame to the right of the lens and on the portion of the frontpiece to the left of the lens. In an example, at least one light emitter of a virtual object display can be located on the portion of a frontpiece of an eyewear frame below the lens. In an example, augmented reality eyewear can comprise a plurality of (e.g. three or more) light emitters on an eyewear frontpiece at different locations around the perimeter of a lens.

In an example, a display can comprise a single light source whose light emissions are reflected by one or more moving mirrors (e.g. scanned) across a reflective surface and/or array of optical elements. In an example, a display for augmented reality eyewear can comprise a single light source whose light emissions are scanned across an array of optical elements. In an example, a display for augmented reality eyewear can comprise a scanning laser. In this design, the vector and content of light rays from the display varies, causing the light rays to scan across the semi-reflective optical element and create a two-dimensional virtual object in the person's field of view.

In an example, augmented reality eyewear can have a scanning light mechanism, where light rays from one or more light emitters are moved back and forth on the proximal surface of a lens (and thus, the proximal surfaces of reflective elements on the lens). In an example, augmented reality eyewear can have at least one moving reflective member (e.g. a moving micromirror) which reflects and redirects light from one or more light emitters before it reaches a lens. In an example, augmented reality eyewear can have at least one light emitter and at least one moving mirror on a sidepiece of an eyewear frame.

In an example, a virtual object projected by a display can be perceptually linked in physical location and/or position relative to a real environmental object in a person's field of view. In an example, a virtual object can appear to be connected to an environmental object. A virtual object can appear to a viewer as being consistently on top of, adjacent to, or beneath an environmental object. In an example, a virtual object can be super-imposed over (i.e. shown in front of and/or occluding) an environmental object or sub-imposed under (i.e. shown behind and/or occluded by) an environmental object in a person's field of view. In an example, a virtual object can appear to be moving with an environmental object when the environmental object moves. In an example, both a virtual object and an environmental object can appear to move together, relative to a person's field of view, when the person moves their head.

In an example, the appearance of a virtual object can be changed to simulate its physical interaction with a physical environmental object. In an example, a virtual object can appear to be obscured by a physical object when the two objects meet. In an example, a virtual object can appear to come out of (or go into) a physical object. In an example, a virtual object can function as a virtual mouse and/or cursor to enable a person to interact with their environment in augmented reality. In an example, a person can select an environmental object by moving a virtual object (e.g. virtual mouse, cursor, or pointer) to the environmental object.

In an example, augmented reality eyewear can include an array of individually-adjustable transmissive-reflective optical elements which can be individually and selectively changed to: allow different levels (or percentages) of light from the environment reach a person's eye at different locations in the person's field of view at different times; and reflect different levels (or percentages) of light from a display toward the person's eye at different locations in the person's field of view at different times. In an example, transmission of environmental light can be substantially blocked in areas of a person's field of view where virtual objects are displayed to help the virtual objects to appear more solid, brighter, and/or with higher resolution.

In an example, augmented reality eyewear can include an array of reflection-adjustable optical elements which can be individually and selectively changed to: reflect different levels (or percentages) of light from the environment reach at different locations in the person's field of view at different times; and reflect different levels (or percentages) of light from a display toward the person's eye at different locations in the person's field of view at different times. In an example, augmented reality eyewear can include an array of opacity-adjustable optical elements which can be individually and selectively changed to: block different levels (or percentages) of light from the environment reach at different locations in the person's field of view at different times; and not reflect different levels (or percentages) of light from a display toward the person's eye at different locations in the person's field of view at different times.

In an example, augmented reality eyewear can include an array of transparency-adjustable optical elements which can be individually and selectively changed to: transmit different levels (or percentages) of light from the environment reach at different locations in the person's field of view at different times; and transmit different levels (or percentages) of light from a display to the environment at different locations in the person's field of view at different times. In an example, each individually-adjustable transmissive-reflective optical element in an array can be individually, selectively, and reversibly changed from a first configuration which primarily transmits light hitting it from the environment (to a person's eye) to a second configuration which primarily reflects light hitting it from the environment thereby blocking the transmission of environmental light to the person's eye.

In an example, each individually-adjustable transmissive-reflective optical element in an array can be individually, selectively, and reversibly changed from a first configuration which primarily transmits light hitting it from a display to a second configuration which primarily reflects light hitting it from the display toward a person's eye, thereby creating a virtual image in the person's field of view. In an example, each individually-adjustable transmissive-reflective optical element in an array can be individually, selectively, and reversibly changed from a first configuration which primarily transmits light hitting it from the environment to a person's eye to a second configuration with which primarily blocks light hitting it from the environment from reaching the person's eye and reflects light hitting it from a display toward the person's eye.

In an example, primarily transmissive can be defined as transmitting at least 50% of the light hitting the surface (e.g. incident light) of an optical element. In an example, primarily reflective can be defined as reflecting at least 50% of the light hitting the surface (e.g. incident light) of an optical element. In an example, each individually-adjustable transmissive-reflective optical element in an array can be individually, selectively, and reversibly changed from a first configuration which transmits at least 50% of the light hitting it from the environment to a person's eye to a second configuration which blocks at least 50% of the light hitting it from the environment from reaching the person's eye and reflects at least 50% of the light hitting it from a display toward the person's eye.

In an example, a selected irregularly-shaped subset of optical elements in an array of optical elements can be changed from their first configurations to their second configurations by electrical current or an electromagnetic field from an array of transparent (or at least translucent) electroconductive pathways. In an example, a subset of optical elements with an irregular shape can be selected from an array of optical elements to be changed from their first configurations to their second configurations by electrical current or an electromagnetic field from an array of transparent (or at least translucent) electroconductive pathways. In an example, the location and shape of this subset of optical elements can be selected to match the location and shape of a virtual object which is projected in a person's field of view in order to sharpen the image of the virtual object in a person's field of view.

For example, if a circular virtual object is projected in a person's field of view, then a circular subset of optical elements can be adjusted to block environmental light and reflect light from the display, wherein the perimeter of the circular subset of optical elements overlaps the circular perimeter of the virtual object. In another example, if a virtual tree is projected in a person's field of view, then a tree-shaped subset of optical elements can be selected and changed to block environmental light and reflect light from the display, wherein the perimeter of the selected subset overlaps the perimeter of the virtual tree. When a subset of optical elements which overlaps a virtual object are changed from their first (substantially transparent) configurations to their second (substantially reflective) configurations, then this more effectively reflects the image of the virtual person in the viewer's field of view and more effectively blocks light from the environment which otherwise would shine through the virtual object. Although not as impressive as Dr. Peter Venkman's proton pack, it can be effective for getting rid of ghosts.

In an example, optical elements can be quadrilateral shaped. In an example, they can be selectively combined to create irregularly-shaped subsets of optical elements which are reversibly changed from their first to second configurations. In an example, optical elements can be hexagonal shaped. In an example, augmented reality eyewear can comprise a hexagonal array, grid, or mesh of reflection-adjustable optical elements. In an example, augmented reality eyewear can comprise a honeycomb array, grid, or mesh of reflection-adjustable optical elements. In an example, optical elements can have circular, elliptical, or oval shapes which can be selectively combined to create irregularly-shaped subsets of optical elements which are reversibly changed from their first to second configurations.

In an example, optical elements can be sufficiently small to constitute pixels in a person's field of vision, wherein irregularly-shaped selected subsets of optical elements corresponding to the shapes of virtual objects can be selected to be changed from their first to second configurations. In an example, reflection-adjustable optical elements can serve as pixels for projecting virtual objects in a person's field of view. In an example, optical elements within the perimeter of a projected virtual object can be set to their reflective configurations and optical elements outside the perimeter of the projected virtual object can be set to their transparent configurations.

In an example, optical elements within the perimeter of a projected virtual object can be set to their reflective configurations and optical elements outside the perimeter of the projected virtual object can be set to their transparent configurations by transmission of electrical current through transparent (or translucent) electroconductive pathways. In an example, optical elements within the perimeter of a projected virtual object can be set to their reflective configurations and optical elements outside the perimeter of the projected virtual object can be set to their transparent configurations by the creation of an electromagnetic field via transparent (or translucent) electroconductive pathways.

In an example, plurality non-contiguous subsets of optical elements, corresponding to a plurality of non-contiguous virtual objects projected in a person's field of view, can be selected and changed from their first to second configurations. In an example, a first virtual object in a person's field of view may have a generally square perimeter and a separate second virtual object in the person's field of view may have a generally circular perimeter. Accordingly, a square subset of optical elements corresponding to the perimeter of the first virtual object and a separate circular subset of optical elements corresponding to the perimeter of the second virtual object can be selected, wherein these two subsets have their configurations changed from their first to second configurations. This is not possible with prior art AR eyewear designs in which the opacity and/or reflectivity of the entire field of vision is adjusted.

In an example, the perimeter of a sub-set of optical elements which are changed into their second (less transmissive and more reflective) configurations can be larger than the perimeter of a virtual object which is projected in a person's field of view in order to help avoid a "halo" around the virtual object. In an example, there can be variation in the opacity and/or reflectivity of optical elements in their second configurations within in a sub-set of optical elements. In an example, optical elements which are closer to the center of the sub-set of optical elements can be more opaque and/or more reflective than optical elements around the perimeter of the sub-set. In an example, optical elements which are farther from the center of the sub-set of optical elements can be more opaque and/or more reflective than optical elements closer to the center of the sub-set.

In an example, an optical element can be changed from a substantially-transparent state to a substantially-reflective state by sending electrical current through the optical element for a first interval of time and then changed back from the substantially-reflective state to the substantially-reflective state by sending electrical current through the optical element for a second interval of time. In an example, an individually-adjustable transmissive-reflective optical element in its second configuration can transmit less than 50% of the light from the environment reaching that element (e.g. incident light from the environment) toward a person's eye and can reflect more than 50% of the light from a near-eye display reaching that element (e.g. incident from the display) toward the person's eye.

In an example, the percentage (or level) of light from a display which is reflected by an optical element toward a person's eye can change when the optical element is exposed to electrical voltage and/or an electromagnetic field.

In an example, an optical element can be changed from a substantially-transparent state to a substantially-reflective state by exposing the optical element to an electromagnetic field with a first orientation and then changed back from a substantially-reflective state to a substantially-reflective state by exposing the optical element to an electromagnetic field with a second orientation. In an example, an individually-adjustable transmissive-reflective optical element can be an optical element whose opacity, light transmission, and/or light reflection changes when exposed to an electrical current.

In an example, an optical element can be changed from a substantially-transparent state to a substantially-reflective state by exposing the optical element to an electromagnetic field with a first power level and then changed back from a substantially-reflective state to a substantially-reflective state by exposing the optical element to an electromagnetic field with a second power level. In an example, an optical element can become less transparent and/or more opaque when it is exposed to an electromagnetic field.

In an example, an optical element can be changed from a substantially-transparent state to a substantially-reflective state by sending electrical current through the optical element in a first direction and then changed back from a substantially-reflective state to a substantially-reflective state by sending electrical current through the optical element in a second direction. In an example, an optical element can become more reflective when an electrical current is passed through it. In an example, an optical element can become more reflective when it is exposed to an electromagnetic field. In an example, the electromagnetic field can be generated by the array of transparent (or translucent) electroconductive pathways.

In an example, an optical element can toggle between being primarily transparent and primarily reflective when it is exposed to different kinds or durations of electrical current and/or electromagnetic fields. In an example, an optical element can be changed from a substantially-transparent state to a substantially-reflective state by sending electrical current through the optical element in a first direction and changed back from the substantially-reflective state to the substantially-reflective state by sending electrical current through the optical element in the opposite direction. In an example, an optical element can be changed from a substantially-transparent state to a substantially-reflective state by sending electrical current through the optical element with a first polarity and then changed back from the substantially-reflective state to the substantially-reflective state by sending electrical current through the optical element with the opposite polarity.

In an example, an optical element can be changed from a substantially-transparent state to a substantially-reflective state by sending electrical current through the optical element with a first voltage and changed from a substantially-reflective state to a substantially-reflective state by sending electrical current through the optical element with a second voltage. In an example, the second voltage can be greater than the first voltage. In an example, an individually-adjustable transmissive-reflective optical element can have a first configuration wherein it transmits more than 25% of the light from the environment reaching that element toward a person's eye and reflects less than 75% of the light from a near-eye display reaching that element toward the person's eye.

In an example, an individually-adjustable transmissive-reflective optical element can be an optical element whose (level or percentage of) opacity, light transmission, and/or light reflection changes when exposed to a localized electromagnetic field. In an example, this localized electromagnetic field can be created by transparent electroconductive pathways with which the optical element is in electromagnetic communication. In an example, an optical element can be changed from a substantially-transparent state to a substantially-reflective state by sending electrical current through a first location on the optical element and then changed back from the substantially-reflective state to the substantially-reflective state by sending electrical current through a second location on optical element.

In an example, an individually-adjustable transmissive-reflective optical element can comprise optical material whose opacity, light transmission, and/or light reflection is modulated by the application of electrical current and/or exposure to an electromagnetic field. In an example, an optical element can be changed from a substantially-transparent state to a substantially-reflective state, or vice versa, by sending electrical current through the optical element. In an example, an optical element can be changed from a substantially-transparent state to a substantially-reflective state by sending electrical current through the optical element with a first voltage and changed from a substantially-reflective state to a substantially-reflective state by sending electrical current through the optical element with a second voltage. In an example, the second voltage can be less than the first voltage.

In an example, the perimeter of a sub-set of optical elements which are changed into their second (less transmissive and more reflective) configurations can be slightly smaller than the perimeter of a virtual object which is projected in a person's field of view to help avoid a "halo" around the virtual object. In an example, an individually-adjustable transmissive-reflective optical element can be an optical element whose opacity, light transmission, and/or light reflection changes when exposed to a localized electromagnetic field. In an example, optical elements in an array of optical elements can have substantially the same sizes as display elements (e.g. pixels) in a display. In an example, an individually-adjustable transmissive-reflective optical element can be an optical element whose percentage of light transmission changes when exposed to an electrical current and/or an electromagnetic field. In an example, an optical element can be switched (e.g. toggled) between being primarily transparent and primarily opaque by passing electrical current through it.

In an example, an optical element can toggle between being primarily transparent and primarily reflective when an electrical current is passed through it. In an example, an individually-adjustable transmissive-reflective optical element can be an optical element whose level or percentage of opacity, light transmission, and/or light reflection changes when exposed to an electrical current. In an example, an optical element can become more opaque when an electrical current is passed through it. In an example, an optical element can be switched (e.g. toggled) between being primarily transparent and primarily opaque when it is exposed to an electromagnetic field.

In an example, augmented reality (AR) eyewear can include a lens comprising a plurality of adjustable reflective optical elements, wherein each optical element has a first orientation which allows light transmission and a second orientation which blocks light transmission and reflects incident light. In an example, augmented reality (AR) eyewear can include a section of a Fresnel Lens comprising a plurality of adjustable reflective optical elements, wherein each optical element has a first orientation which allows light transmission and a second orientation which blocks light transmission and reflects incident light. In an example, augmented reality (AR) eyewear can include a section of a Fresnel Reflector comprising a plurality of adjustable reflective optical elements, wherein each optical element has a first orientation which allows light transmission and a second orientation which blocks light transmission and reflects incident light.

In an example, augmented reality (AR) eyewear can include a section of a Fresnel Reflector comprising a plurality of adjustable reflective optical elements, wherein the section is between 5% and 10% of the (frontal) size of the Fresnel Reflector, and wherein each optical element has a first orientation which allows light transmission and a second orientation which blocks light transmission and reflects incident light. In an example, augmented reality (AR) eyewear can include a section of a Fresnel Reflector comprising a plurality of adjustable reflective optical elements, wherein the section is between 10% and 25% of the (frontal) size of the Fresnel Reflector, and wherein each optical element has a first orientation which allows light transmission and a second orientation which blocks light transmission and reflects incident light.

In an example, the perimeter of an array of optical elements can have a convex shape which is selected from the group consisting of: circular, elliptical, oval, and egg shaped. In an example, the size of the array of optical elements can be between 200% and 500% greater than the size of the display. In an example, an array of optical elements collectively comprise a section of a Fresnel Reflector which reflects images from a display to the right (or left) of the array toward a person's eye.

In an example, an array of optical elements can comprise an array of adjustably transmissive-reflective surfaces on a lens. In an example, an array of optical elements can comprise an array of adjustably transmissive-reflective surfaces on flat lens. In an example, an array of optical elements can comprise an array of adjustably transmissive-reflective surfaces on one side of a lens wherein the other side of the lens is flat. In an example, an array of optical elements can comprise an array of adjustably transmissive-reflective surfaces on the side of a lens which faces toward a person's eye, wherein the other side of the lens which faces away from the person's eye is flat. In an example, an array of optical elements can comprise an array of adjustably transmissive-reflective surfaces on the side of a lens which faces toward a person's eye, wherein the other side of the lens which faces away from the person's eye is convex or concave.

In an example, there can be a relationship between the shapes, sizes, orientations and/or quantities of optical elements in an array of optical elements a person's eye and the shapes, sizes, orientations, and/or quantities of display elements (e.g. pixels) in a display. In an example, pixels in a displayed image and optical elements in an array of optical elements can both have square shapes. In an example, the percentage (or level) of environmental light which is transmitted through an optical element to a person's eye changes when the optical element is exposed to electrical voltage and/or an electromagnetic field.

In an example, a plurality of reflective surfaces can transmit least 80% of light hitting them from the environment (e.g. incident light) from reaching the eye in their first configuration and reflect at least 80% of the light hitting them from the environment (e.g. incident light) in their second configuration. In an example, an array of optical elements collectively comprise a section of a Fresnel Reflector which reflects images from a display to the right (or left)

of the array toward a person's eye with light rays which are parallel. In an example, the quantity of optical elements in an array of optical elements can be substantially the same as the quantity of display elements (e.g. pixels) in a display.

In an example, an array of optical elements collectively comprise a section of a Fresnel Reflector which reflects images from a display to the right (or left) of the array toward a person's eye with light rays which converge on the pupil of the eye. In an example, pixels in a displayed image and optical elements in an array of optical elements can both have hexagonal shapes. In an example, an array of individually-adjustable transmissive-reflective optical elements can comprise a plurality of circular rotatable reflective surfaces whose centers are connected to axles and which rotate around those axles.

In an example, an array of optical elements collectively comprise a section of a Fresnel Reflector which reflects images from a display to the right (or left) of the array toward a person's eye with light rays which converge on the retinal of the eye. In an example, the size of the array of optical elements can be between 100% and 300% greater than the size of the display. In an example, the size of the array of optical elements can be between 100% and 300% of the size of the display. In an example, the size of the array of optical elements can be greater than the size of the display. In an example, pixels in a displayed image and optical elements in an array of optical elements can both have circular shapes.

In an example, an array of optical elements can be a concentric ring array of optical elements and a display can comprise a concentric ring array of display elements. In an example, an array of individually-adjustable transmissive-reflective optical elements can comprise a plurality of microscale rotatable reflective surfaces which rotate around microscale axles when exposed to electrical current and/or an electromagnetic field. In an example, an array of optical elements can be a quadrilateral array (e.g. quadrilateral grid) of optical elements and a display can comprise a quadrilateral array of display elements. In an example, an array of optical elements can be a ring-and-spoke array of optical elements and a display can comprise a ring-and-spoke array of display elements. In an example, an individually-adjustable transmissive-reflective optical element can be an optical element whose percentage of light reflection changes when exposed to an electrical current and/or an electromagnetic field.

In an example, an array of individually-adjustable transmissive-reflective optical elements can further comprise a plurality of square reflective surfaces which are centrally-connected to axles and which rotate around those axles. In an example, augmented reality eyewear can comprise a plurality of optical elements which is configured to be positioned in front of a person's eye, wherein the optical elements reflect light, wherein the optical elements can be rotated around their central axes, wherein the optical elements transmit light from the environment to a person's eye in a first configuration and block and/or reflect light from the environment in a second configuration, wherein the optical elements are changed from their first configuration to their second configuration by being rotated around their central axes, and wherein the optical elements are rotated around their central axes by exposure to electrical current and/or an electromagnetic field.

In an example, augmented reality eyewear can comprise a plurality of reflective optical elements which can be rotated around their central axes. In example, optical elements are rotated around their central axes by exposure to electrical current and/or an electromagnetic field. In an example, when the optical elements are rotated to a first orientation, they substantially transmit light (e.g. transmit at least 80% of incident light) and when the optical elements are rotated to a second orientation, they substantially block and/or reflect light (e.g. block and/or reflect at least 80% of incident light). In an example, augmented reality eyewear can comprise a plurality of reflective optical elements which can be rotated around their central axes.

In example, optical elements can be rotated around their central axes by exposure to electrical current and/or an electromagnetic field. In an example, when the optical elements are rotated to a first orientation, they substantially transmit light (e.g. transmit at least 95% of incident light) and when the optical elements are rotated to a second orientation, they substantially block and/or reflect light (e.g. block and/or reflect at least 95% of incident light). In an example, an array of individually-adjustable transmissive-reflective optical elements can further comprise a plurality of hexagonal reflective surfaces which are centrally-connected to axles and which rotate around those axles.

In an example, an array of reflective optical elements can be arrayed in a honeycomb grid (e.g. grid, mesh, or lattice), wherein each optical element in the grid can be rotated around an axis between two of its six vertexes. In an example, an array of reflective optical elements can be arrayed in a honeycomb grid, wherein each optical element in the grid can be rotated around an axis between two of its six vertexes, wherein this rotation is caused by exposing the optical element to an electromagnetic field.

In an example, an array of reflective optical elements can be arrayed in a honeycomb grid, wherein each optical element in the grid can be rotated around an axis between two of its six vertexes, wherein this rotation is caused by exposing the optical element to a localized electromagnetic field created by one or more electroconductive pathways in an array of transparent (or translucent) electroconductive pathways. In an example, an array of reflective optical elements can be arrayed in a honeycomb grid, wherein each optical element in the grid can be rotated around an axis between two of its six vertexes, wherein this rotation is caused by exposing the optical element to a localized electromagnetic field created by electrical current running through electroconductive pathways in an array of transparent (or translucent) electroconductive pathways.

In an example, an array of reflective optical elements can be arrayed in a honeycomb grid, wherein each optical element in the grid can be rotated around an axis between two of its six vertexes, wherein this rotation is caused by the actuation of a MEMS unit. In an example, an array of reflective optical elements can be arrayed in a honeycomb grid, wherein each optical element in the grid can be rotated around an axis between two of its six vertexes, wherein this rotation is caused by the actuation of a microscale actuator.

In an example, an array of individually-adjustable transmissive-reflective optical elements can comprise a plurality of rotatable reflective surfaces whose centers are connected to axles and which rotate around those axles. In an example, an array of individually-adjustable transmissive-reflective optical elements can further comprise: an array of microscale axles; and an array of microscale reflective components which are connected to those axles, wherein exposure of the reflective components to electrical current and/or an electromagnetic field causes them to rotate around the axles, thereby changing the opacity and/or reflectivity of the optical elements.

In an example, an array of individually-adjustable transmissive-reflective optical elements can further comprise a plurality of rotatable reflective surfaces which rotate around axles. In an example, an array of individually-adjustable transmissive-reflective optical elements can further comprise a plurality of hexagonal rotatable reflective surfaces whose centers are connected to axles and which rotate around those axles. In an example, an array of individually-adjustable transmissive-reflective optical elements can further comprise a plurality of rotatable reflective surfaces which rotate around central axles. In an example, an array of individually-adjustable transmissive-reflective optical elements can further comprise a plurality of circular reflective surfaces which are centrally-connected to axles and which rotate around those axles.

In an example, a plurality of reflective surfaces can have a first configuration in which their longitudinal axes are substantially parallel to the line of sight from an eye and a second configuration in which their longitudinal axes are substantially perpendicular to the line of sight from the eye. In an example, an array of individually-adjustable transmissive-reflective optical elements can further comprise: an array of microscale axles; and an array of microscale reflective components which are connected to those axles, wherein exposure of the reflective components to electrical current and/or an electromagnetic field causes them to rotate around the axles from first configurations in which they are substantially aligned and the optical element is substantially transparent to second configurations in which they are substantially non-aligned and the optical element is substantially opaque and/or reflective.

In an example, optical elements in an array of optical elements can have substantially the same shapes as display elements (e.g. pixels) in a display. In an example, an array of individually-adjustable transmissive-reflective optical elements can further comprise a plurality of rotatable reflective surfaces which are centrally-connected to axles and which rotate around those axles. In an example, each individually-adjustable transmissive-reflective optical element in the array can be adjusted with respect to its level of light transmission vs. light reflection.

In an example, an array of optical elements can comprise a hub-and-spoke array. In an example, an array of optical elements can be an array of optical elements comprising a central hub and radial spokes, each of which has multiple optical elements arranged in a linear manner. In an example, spokes of optical elements can extend outward radially from the lateral center of the array. In an example, optical elements which are closer to the hub can be smaller and/or closer together than optical elements which are farther from the hub.

In an example, an array of optical elements can comprise a ring-and-ray array of optical elements. In an example, an array of optical elements can comprise multiple nested rings, each of which has multiple optical elements distributed around the ring. In an example, optical elements on nested rings can also be radially aligned with each other to form linear rays of optical elements in addition to rings of optical elements. In an example, optical elements which are closer to the center of an array can be smaller and/or closer together than optical elements which are farther from the center of the array.

In an example, an array of optical elements can comprise a polar coordinate array. In an example, an array of optical elements can comprise a starburst array of optical elements. In an example, an array of optical elements can comprise a nested ring array of optical elements. In an example, an array of optical elements can comprise a concentric ring array of optical elements. In an example, the density of optical elements closer to the center of an array can be greater than the density of optical elements farther from the center of the array.

In another example, an array of optical elements can be a honeycomb array of optical elements. In another example, an array of optical elements can be a honeycomb (hexagonal) array of reflective hexagonal-shaped elements. In an example, optical elements which are closer to the center of a honeycomb array can be smaller and/or closer together than optical elements which are farther from the center of the honeycomb array. In another example, an array of optical elements can be a row-and-column array of optical elements. In another example, an array of optical elements can be a quadrilateral grid of optical elements. In another example, an array of optical elements can be a checkerboard grid of optical elements. In an example, an array of optical elements can be a nest ring array.

In an example, primarily transmissive can be defined as transmitting at least 75% of light hitting the surface of an optical element (e.g. incident light). In an example, primarily reflective can be defined as reflecting at least 75% of light hitting the surface of an optical element. In an example, each individually-adjustable transmissive-reflective optical element in an array can be individually, selectively, and reversibly changed from a first configuration which transmits at least 75% of the light hitting it from the environment to a person's eye to a second configuration which primarily blocks at least 75% of the light hitting it from the environment from reaching the person's eye and reflects at least 75% of the light hitting it from a display toward the person's eye.

In an example, an optical element in an array of individually-adjustable transmissive-reflective optical elements can comprise two layers: a first layer which faces toward a person's eye and a second layer which faces away from the person's eye. In an example, the first layer remains transparent, but the second layer can be selectively and reversibly changed from a first configuration which is primarily transmissive (e.g. light transmitting) to a second configuration which is primarily opaque (e.g. light blocking) or reflective. In an example, the second layer can be changed from the first configuration to the second configuration by exposure to electrical current or a localized electromagnetic field.

In an example, an optical element in an array of individually-adjustable transmissive-reflective optical elements can comprise two layers: a first layer which faces toward a person's eye and a second layer which faces away from the person's eye. In an example, the second layer remains transparent, but the first layer can be selectively and reversibly changed from a first configuration which is primarily transmissive (e.g. light transmitting) to a second configuration which is primarily opaque (e.g. light blocking) or reflective. In an example, the first layer can be selectively changed from the first configuration to the second configuration by exposure to electrical current or an electromagnetic field.

In an example, an optical element in an array of individually-adjustable transmissive-reflective optical elements can comprise three layers: a first layer which faces toward a person's eye; a second layer which faces away from the person's eye; and third layer between the first and second layers. In an example, the first and third layers remain transparent, but the second layer can be selectively and reversibly changed from a first configuration which is primarily transmissive (e.g. light transmitting) to a second configuration which is primarily opaque (e.g. light blocking) or reflective. In an example, the second layer can be selectively changed from the first configuration to the second configuration by exposure to electrical current or an electromagnetic field.

In an example, an optical element in an array of individually-adjustable transmissive-reflective optical elements can comprise two layers: a first layer which faces toward a person's eye and a second layer which faces away from the person's eye. In an example, the first layer remains transparent, but the second layer can be selectively and reversibly changed from a first configuration which is primarily transmissive (e.g. light transmitting) to a second configuration which is primarily reflective (e.g. light reflecting). In an example, the second layer can be selectively changed from the first configuration to the second configuration by exposure to electrical current or an electromagnetic field.

In an example, an optical element in an array of individually-adjustable transmissive-reflective optical elements can comprise two layers: a first layer which faces toward a person's eye and a second layer which faces away from the person's eye. In an example, the second layer remains transparent, but the first layer can be selectively and reversibly changed from a first configuration which is primarily transmissive (e.g. light transmitting) to a second configuration which is primarily reflective (e.g. light reflecting). In an example, the first layer can be selectively changed from the first configuration to the second configuration by exposure to electrical current or an electromagnetic field.

In an example, an optical element in an array of individually-adjustable transmissive-reflective optical elements can comprise three layers: a first layer which faces toward a person's eye; a second layer which faces away from the person's eye; and third layer between the first and second layers. In an example, the first and third layers can remain transparent. In an example, the second layer can be selectively and reversibly changed from a first configuration which is primarily transmissive (e.g. light transmitting) to a second configuration which is primarily reflective (e.g. light reflecting). In an example, the second layer can be selectively changed from the first configuration to the second configuration by exposure to electrical current or an electromagnetic field.

In an example, an optical element in an array of individually-adjustable transmissive-reflective optical elements can comprise a variable-opacity layer sandwiched between two transparent layers, wherein the opacity of the variable-opacity layer is changed by transmission of electrical current through the variable-opacity layer. In an example, an optical element in an array of individually-adjustable transmissive-reflective optical elements can comprise a variable-reflective layer sandwiched between two transparent layers, wherein the light reflectivity of the variable-reflectivity layer is changed by transmission of electrical current through the variable-reflectivity layer.

In an example, an optical element in an array of individually-adjustable transmissive-reflective optical elements can comprise a variable-opacity layer sandwiched between two transparent layers, wherein the opacity of the variable-opacity layer is changed by the creation of a localized electromagnetic field. In an example, an optical element in an array of individually-adjustable transmissive-reflective optical elements can comprise a variable-reflective layer sandwiched between two transparent layers, wherein the light reflectivity of the variable-reflectivity layer is changed by creation of a localized electromagnetic field.

In an example, an optical element in an array of individually-adjustable transmissive-reflective optical elements can comprise a transparent layer with an electrochromic coating. When the electrochromic coating is exposed to electrical current and/or an electromagnetic field, it changes color. In an example, when the electrochromic coating is a first color, the optical element is primarily light transmissive, but when the electrochromic coating is a second color, the optical element is primarily light reflective. In an example, primarily light transmissive can mean transmitting at least 50% of light hitting the optical element and primarily light reflective means reflecting at least 50% of light hitting the optical element. Alternatively, primarily light transmissive can mean transmitting at least 90% of light hitting the optical element and primarily light reflective can mean reflecting at least 90% of light hitting the optical element.

In an example, an optical element in an array of individually-adjustable transmissive-reflective optical elements can comprise an array of reflective nanoparticles suspended in a fluid between two transparent layers. In an example, transmission of electrical current through the optical element changes the orientations of the reflective nanoparticles, thereby changing the opacity, the level of light transmission, and/or the level of light reflection by the optical element. In an example, exposure of the optical element to a localized electromagnetic field can change the orientations of the reflective nanoparticles, thereby changing the opacity, the level of light transmission, and/or the level of light reflection by the optical element.

In an example, an optical element in an array of individually-adjustable transmissive-reflective optical elements can comprise a first transparent layer and a second electrochromic layer. When the electrochromic layer is exposed to electrical current and/or an electromagnetic field, it changes color. In an example, when the electrochromic layer is a first color, the optical element is primarily light transmissive, but when the electrochromic layer is a second color, the optical element is primarily light reflective. In an example, primarily light transmissive can be transmitting at least 50% of light hitting the optical element and primarily light reflective can be reflecting at least 50% of light hitting the optical element. Alternatively, primarily light transmissive can be transmitting at least 90% of light hitting the optical element and primarily light reflective can be reflecting at least 90% of light hitting the optical element.

In an example, an optical element in an array of individually-adjustable transmissive-reflective optical elements can comprise an array of reflective nanoparticles which are suspended in a fluid or gas between two transparent layers. In an example, transmission of electrical current through the optical element aligns the orientations of the reflective nanoparticles, thereby changing the opacity, level of light transmission, and/or level of light reflection by the optical element. In an example, transmission of electrical current through the optical element rotates the reflective nanoparticles in the liquid or gas, thereby changing the opacity, level of light transmission, and/or level of light reflection by the optical element. In an example, exposure of the optical element to a localized electromagnetic field aligns the orientations of the reflective nanoparticles, thereby changing the opacity, level of light transmission, and/or level of light reflection by the optical element.

In an example, an optical element in an array of individually-adjustable transmissive-reflective optical elements can comprise an array of reflective nanoparticles which are suspended by electromagnetism between two transparent layers. In an example, transmission of electrical current through the optical element aligns the orientations of the reflective nanoparticles, thereby changing the opacity, level of light transmission, and/or level of light reflection by the optical element. In an example, transmission of electrical current through the optical element rotates the reflective nanoparticles in an electromagnetic field, thereby changing the opacity, level of light transmission, and/or level of light reflection by the optical element. In an example, exposure of the optical element to a localized electromagnetic field aligns the orientations of the reflective nanoparticles, thereby changing the opacity, level of light transmission, and/or level of light reflection by the optical element.

In an example, an optical element in an array of individually-adjustable transmissive-reflective optical elements can comprise an array of ellipsoidal reflective nanoparticles suspended in a fluid between two transparent layers. In an example, transmission of electrical current through the optical element aligns the orientations of the ellipsoidal reflective nanoparticles, thereby changing the opacity, level of light transmission, and/or level of light reflection by the optical element. In an example, exposure of the optical element to a localized electromagnetic field aligns the orientations of the ellipsoidal reflective nanoparticles, thereby changing the opacity, level of light transmission, and/or level of light reflection by the optical element.

In an example, an optical element in an array of individually-adjustable transmissive-reflective optical elements can comprise an array of disk-shaped reflective nanoparticles suspended in a fluid between two transparent layers. In an example, transmission of electrical current through the optical element aligns the orientations of the disk-shaped reflective nanoparticles, thereby changing the opacity, level of light transmission, and/or level of light reflection by the optical element. In an example, exposure of the optical element to a localized electromagnetic field aligns the orientations of the disk-shaped reflective nanoparticles, thereby changing the opacity, level of light transmission, and/or level of light reflection by the optical element.

In an example, an optical element in an array of individually-adjustable transmissive-reflective optical elements can comprise an array of hexagonal reflective nanoparticles suspended in a fluid between two transparent layers. In an example, transmission of electrical current through the optical element aligns the orientations of the hexagonal reflective nanoparticles, thereby changing the opacity, level of light transmission, and/or level of light reflection by the optical element. In an example, exposure of the optical element to a localized electromagnetic field aligns the orientations of the hexagonal reflective nanoparticles, thereby changing the opacity, level of light transmission, and/or level of light reflection by the optical element.

In an example, an optical element in an array of individually-adjustable transmissive-reflective optical elements can comprise a plurality of reflective nanoparticles. In an example, when the optical element is exposed to electrical current, the nanoparticles change from a first set of orientations which are generally parallel with the plane of the optical element to a second set of orientations which are generally perpendicular to the plane of the optical element, or vice versa. In an example, when the optical element is exposed to electrical current, the nanoparticles change from a first set of orientations which are generally parallel with the lines of sight from a person's eye to a second set of orientations which are generally perpendicular to the lines of sight from the person's eye, or vice versa.

In an example, an optical element in an array of individually-adjustable transmissive-reflective optical elements can comprise two or more layers of reflective particles. In an example, when the optical element is exposed to electrical current and/or an electromagnetic field, then the two or more layers shift laterally, changing the transparency, opacity, and/or reflectivity of the optical element. In an example, when the optical element is exposed to electrical current and/or an electromagnetic field, then the two or more layers move relative to each other, changing the transparency, opacity, and/or reflectivity of the optical element. In an example, when the optical element is exposed to electrical current and/or an electromagnetic field, then the two or more layers move apart from each other, changing the transparency, opacity, and/or reflectivity of the optical element. In an example, when the optical element is exposed to electrical current and/or an electromagnetic field, then the two or more layers move closer to each other, thereby changing the transparency, opacity, and/or reflectivity of the optical element.

In an example, when an optical element is exposed to an electromagnetic field, reflective nanoparticles in the optical element can change from a first set of orientations which are generally parallel with the plane of the optical element to a second set of orientations which are generally perpendicular to the plane of the optical element, or vice versa. In an example, when the optical element is exposed to an electromagnetic field, then the nanoparticles change from a first set of orientations which are generally parallel with the lines of sight from a person's eye to a second set of orientations which are generally perpendicular to the lines of sight from the person's eye, or vice versa.

In an example, an optical element in an array of individually-adjustable transmissive-reflective optical elements can comprise a plurality of reflective microstructures. In an example, when the optical element is exposed to electrical current, the microstructures change from a first set of orientations which are generally parallel with the plane of the optical element to a second set of orientations which are generally perpendicular to the plane of the optical element, or vice versa. In an example, when the optical element is exposed to electrical current, the microstructures change from a first set of orientations which are generally parallel with the lines of sight from a person's eye to a second set of orientations which are generally perpendicular to the lines of sight from the person's eye, or vice versa.

In an example, when an optical element with reflective microstructures is exposed to an electromagnetic field, then microstructures in the optical element change from a first set of orientations which are generally parallel with the plane of the optical element to a second set of orientations which are generally perpendicular to the plane of the optical element, or vice versa. In an example, when the optical element is exposed to an electromagnetic field, then the microstructures change from a first set of orientations which are generally parallel with the lines of sight from a person's eye to a second set of orientations which are generally perpendicular to the lines of sight from the person's eye, or vice versa.

In an example, an optical element in an array of individually-adjustable transmissive-reflective optical elements can comprise a plurality of micromirrors. In an example, when the optical element is exposed to electrical current, the micromirrors change from a first set of orientations which are generally parallel with the plane of the optical element to a second set of orientations which are generally perpendicular to the plane of the optical element, or vice versa. In an example, when the optical element is exposed to electrical current, the micromirrors change from a first set of orientations which are generally parallel with the lines of sight from a person's eye to a second set of orientations which are generally perpendicular to the lines of sight from the person's eye, or vice versa.

In an example, when an optical element is exposed to an electromagnetic field, reflective microstructures in the optical element change from a first set of orientations which are generally parallel with the plane of the optical element to a second set of orientations which are generally perpendicular to the plane of the optical element, or vice versa. In an example, when the optical element is exposed to an electromagnetic field, the microstructures change from a first set of orientations which are generally parallel with the lines of sight from a person's eye to a second set of orientations which are generally perpendicular to the lines of sight from the person's eye, or vice versa.

In an example, an optical element in an array of individually-adjustable transmissive-reflective optical elements can comprise a plurality of reflective nanoparticles which are suspended in an electromagnetic field. In an example, the orientations of these reflective nanoparticles can be changed by changing parameters of the electromagnetic field. In an example, the orientations of these reflective nanoparticles can be changed by changing the direction and/or intensity of the electromagnetic field. In an example, the opacity and/or light reflectivity of the optical element can be changed by changing the direction and/or intensity of an electromagnetic field to which the optical element is exposed.

In an example, an optical element in an array of individually-adjustable transmissive-reflective optical elements can comprise one or more Micro-Electro-Mechanical Systems (MEMS). In an example, an optical element can be selectively and reversibly changed from its first configuration to its second configuration by the operation of one or more Micro-Electro-Mechanical Systems (MEMS). In an example, the opaqueness of an optical element can be selectively and reversibly adjusted by one or more Micro-Electro-Mechanical System (MEMS). In an example, the reflectivity of an optical element can be selectively and reversibly adjusted by one or more Micro-Electro-Mechanical System (MEMS). In an example, the percentage or level of light transmission through an optical element can be selectively and reversibly adjusted by one or more Micro-Electro-Mechanical System (MEMS).

In an example, the orientation of an optical element in an array of individually-adjustable transmissive-reflective optical elements can be changed by one or more Micro-Electro-Mechanical Systems (MEMS). In an example, the color of an optical element in an array of individually-adjustable transmissive-reflective optical elements can be changed by one or more Micro-Electro-Mechanical Systems (MEMS). In an example, the distance between optical layers in an optical element in an array of individually-adjustable transmissive-reflective optical elements can be changed by one or more Micro-Electro-Mechanical Systems (MEMS). In an example, the angle between optical layers in an optical element in an array of individually-adjustable transmissive-reflective optical elements can be changed by one or more Micro-Electro-Mechanical Systems (MEMS).

In an example, the opacity and/or reflectivity of an optical element can be changed by changing the distance between two optical layers in the optical element. In an example, the opacity and/or reflectivity of an optical element can be changed by changing the distance between two optical layers in the optical element using one or more Micro-Electro-Mechanical Systems (MEMS). In an example, the opacity and/or reflectivity of an optical element can be changed by changing the angle between two optical layers in the optical element. In an example, the opacity and/or reflectivity of an optical element can be changed by changing the angle between two optical layers in the optical element using one or more Micro-Electro-Mechanical Systems (MEMS).

In an example, an optical element can be moved from its first configuration to its second configuration, or vice versa, by being tilted, pivoted, and/or rotated around a central axis. In an example, an optical element can be moved from its first configuration to its second configuration, or vice versa, by being tilted, pivoted, and/or rotated around one of its sides or vertexes. In an example, a hexagonal optical element can be moved by being tilted and/or rotated around an axis between a pair of opposing vertexes. In an example, a square optical element can be moved by being tilted and/or rotated around an axis between opposite side mid-points. In an example, a round optical element can be moved by being tilted and/or rotated around an axis along a diameter.

In an example, an optical element can move from its first configuration to its second configuration by tilting, pivoting, and/or rotating around a physical axle. In an example, an optical element can be connected to such an axle. In an example an optical element can be tilted, pivoted, and/or rotated by the mechanical tilting, pivoting, and/or rotation of a physical axle to which the element is connected. In an example, a physical axle can span a central diameter or mid-section of an optical element. In an example, a physical axle can span an optical element from one vertex of the element to another vertex of the element. In an example, a physical axle can span an optical element from one vertex of the element to an opposite-side vertex of the element. In an example, an optical element can have a physical axle around which it tilts, pivots, and/or rotates, but the force which causes the optical element to move can come from the transmission of electromagnetic energy and/or changes in an electromagnetic field with which the optical element interacts rather than through mechanical motion of the axle.

In an example, an optical element can be suspended in an electromagnetic field in which it tilts, pivots, and/or rotates without the need for a physical axle. In an example, an optical element can be suspended in a fluid in which it tilts, pivots, and/or rotates. In an example, an optical element can be encapsulated in a fluid, gel, or solid in which it tilts, pivots, and/or rotates. In an example, an optical element can be tilted, pivoted, and/or rotated by the application of electromagnetic energy. In an example, an optical element can be tilted, pivoted, and/or rotated by changes in an electromagnetic field with which the optical element interacts. In an example, an optical element can be tilted, pivoted, and/or rotated by changes in air flow and/or air pressure. In an example, an optical element can be tilted, pivoted, and/or rotated by interaction with a high-frequency sound wave (e.g. an ultrasonic wave).

In an example, an optical element can be moved from its first configuration to its second configuration, or vice versa, by the transmission of electromagnetic energy. In an example, transmission of electromagnetic energy can create an electromagnetic field which tilts, pivots, and/or rotates an optical element. In an example, an optical element can have portions (e.g. sides or vertexes) with different levels of electromagnetic attraction, causing the optical element to tilt, pivot, and/or rotate in the presence of an electromagnetic field. In an example, transmission of electromagnetic energy through electromagnetic pathways which are substantially parallel to the cross-sectional plane of the lens can create an electromagnetic field which tilts, pivots, and/or rotates an optical element. In an example, transmission of electromagnetic energy through electromagnetic pathways which are substantially perpendicular to the cross-sectional plane of the lens can create an electromagnetic field which tilts, pivots, and/or rotates an optical element.

In an example, a selected subset of optical elements in an array of optical elements can be moved between their first and second configurations by the transmission of electromagnetic energy through a selected subset of electroconductive pathways in a nearby electroconductive grid. In an example, an electroconductive grid can be proximal (e.g. closer to an eye) relative to an array optical elements. In an example, an electroconductive grid can be distal (e.g. farther from an eye) relative to an array optical elements. In an example, an electroconductive grid can have proximal and distal layers, wherein an array of optical elements is between these layers. In an example, there can be two electroconductive grids, one which is proximal relative to an array of optical elements and one which is distal relative to the array of optical elements.

In an example, an electroconductive grid can be substantially transparent. In an example, an electroconductive grid can be made from transparent polymer material which has been doped and/or impregnated with conductive particles which are sufficiently small that they do not substantially interfere with the transmission of light through the grid. In an example, an electroconductive grid which is used to move optical elements can be a two dimensional grid. In an example, an electroconductive grid which is used to move optical elements can be a grid of orthogonal electroconductive pathways (e.g. a row and column grid). In an example, an electroconductive grid which is used to move optical elements can be a radial grid of electroconductive pathways (e.g. a hub and spoke grid). In an example, an electroconductive grid which is used to move optical elements can be a honeycomb (e.g. hexagonal) grid of conductive pathways. In an example, an electroconductive grid which is used to move optical elements can be a nested-ring grid (e.g. with concentric rings) of conductive pathways.

In an example, a row-and-column grid of electroconductive pathways can be paired with a row-and-column array of optical elements in order to selectively move optical elements by the transmission of electromagnetic energy. In an example, a radial grid of electroconductive pathways can be paired with a radial array of optical elements in order to selectively move optical elements by the transmission of electromagnetic energy. In an example, a honeycomb grid of electroconductive pathways can be paired with a honeycomb array of optical elements in order to selectively move optical elements by the transmission of electromagnetic energy. In an example, a nested-ring grid of electroconductive pathways can be paired with a nested-ring array of optical elements in order to selectively move optical elements by the transmission of electromagnetic energy.

In an example, transmission of a first level of electromagnetic energy through a grid can tilt, pivot, and/or rotate an optical element by a first amount and/or in a first direction and transmission of a second level of electromagnetic energy through the grid can tilt, pivot, and/or rotate an optical element by a second amount and/or in a second direction. In an example, transmission of a electromagnetic energy through a first subset of electroconductive pathways in an electroconductive grid can tilt, pivot, and/or rotate an optical element by a first amount and/or in a first direction and transmission of electromagnetic energy through a second subset of electroconductive pathways in the grid can tilt, pivot, and/or rotate an optical element by a second amount and/or in a second direction.

In an example, an optical element can be moved from its first configuration to its second configuration, or vice versa, by a MEMS actuator. In an example, each optical element can have its own MEMS actuator so that individual optical elements can be selectively, individually, and independently changed from their first configurations to their second configurations, or vice versa. In an example, an optical element can be moved by an acoustic wave and/or air pulse.

In an example, an optical element in an array of individually-adjustable transmissive-reflective optical elements can be made with electrochromic material, wherein the color, opacity, level of light transmission, and/or level of light reflection of the material changes when the material is exposed to electrical current and/or an electromagnetic field. In an example, an optical element in an array of individually-adjustable transmissive-reflective optical elements can be made with electrochromic, photochromic, and/or electrogenic material.

In an example, an optical element can have an electrochromic component. In an example, an optical element can have an electrochromic layer, wherein the color, opacity, level of light transmission, and/or level of light reflection of the layer changes when the layer is exposed to electrical current and/or an electromagnetic field. In an example, an optical element can have two layers: a consistently transparent layer; and an electrochromic layer, wherein the color, opacity, level of light transmission, and/or level of light reflection of the electrochromic layer changes when the layer is exposed to electrical current and/or an electromagnetic field. In an example, the electrochromic layer can be changed to a black or silver color, causing the transparent layer to act as a mirror. In an example, an optical element can comprise a variable-reflectivity mirror. In an example, an optical element can comprise a transparent layer and a coating of electrochromic material on the transparent layer.

In an example, an individually-adjustable transmissive-reflective optical element can be made with photochromic material whose opacity, level of light transmission, and/or level of light refection changes when exposed to light in a selected portion of the electromagnetic spectrum. In an example, an individually-adjustable transmissive-reflective optical element can be made with photochromic material whose opacity, level of light transmission, and/or level of light refection changes when exposed to infrared or near-infrared light. In an example, an individually-adjustable transmissive-reflective optical element can be made with photochromic material whose opacity, level of light transmission, and/or level of light refection changes when exposed to light projected by a display. In an example, an optical element can be made with photopolymer material. In an example, an optical element can be made with photorefractive material, wherein the index of refraction is modulated.

In an example, an optical element in an array of individually-adjustable transmissive-reflective optical elements can include liquid crystals. In an example, an optical element can comprise liquid crystals whose opacity, level of light transmission, and/or level of light reflection changes when exposed to electric current and/or an electromagnetic field. In an example, the liquid crystals can be polarized. In an example, the liquid crystals can be dispersed in a polymer. In an example, the liquid crystals can be on silicon. In an example, an optical element can comprise zinc or lithium niobate.

In an example, an optical element in an array of individually-adjustable transmissive-reflective optical elements can comprise reflective particles which are suspended in a liquid or gel, wherein exposure to electric current and/or an electromagnetic field moves the reflective particles into (or out of) alignment with the plane of the optical element, thereby changing the opacity, level of light transmission, and/or level of light reflection by the optical element. In an example, an optical element in an array of individually-adjustable transmissive-reflective optical elements can comprise reflective particles which are suspended in a liquid or gel, wherein exposure to electric current and/or an electromagnetic field moves the reflective particles into (or out of) alignment, thereby changing the opacity, level of light transmission, and/or level of light reflection by the optical element.

In an example, an optical element in an array of individually-adjustable transmissive-reflective optical elements can comprise reflective particles which are suspended in a gas, wherein exposure to electric current and/or an electromagnetic field moves the reflective particles into (or out of) alignment with the plane of the optical element, thereby changing the opacity, level of light transmission, and/or level of light reflection by the optical element. In an example, an optical element in an array of individually-adjustable transmissive-reflective optical elements can comprise reflective particles which are suspended in a gas, wherein exposure to electric current and/or an electromagnetic field moves the reflective particles into (or out of) alignment, thereby changing the opacity, level of light transmission, and/or level of light reflection by the optical element.

In an example, an optical element in an array of individually-adjustable transmissive-reflective optical elements can comprise optical particles which are suspended in a liquid or gel, wherein exposure to electric current and/or an electromagnetic field moves the optical particles into alignment or out of alignment with each other. In an example, the transparent portions of an optical element can be made with glass or acrylic. In an example, reflective particles in an optical element can be made from glass or acrylic. In an example, an optical element can be partly made with indium (e.g. indium tin oxide). In an example, transparent electroconductive pathways which expose reflective particles in an optical element to an electromagnetic field can be made from indium (e.g. indium tin oxide).

In an example, an optical element in an array of individually-adjustable transmissive-charged optical elements can comprise charged particles which are suspended in a liquid or gel, wherein exposure to electric current and/or an electromagnetic field moves the charged particles into alignment or out of alignment. In an example, an optical element in an array of individually-adjustable transmissive-charged optical elements can comprise ionized particles which are suspended in a liquid or gel, wherein exposure to electric current and/or an electromagnetic field moves the ionized particles into alignment or out of alignment.

In an example, an optical element in an array of individually-adjustable transmissive-reflective optical elements can comprise optical particles which are suspended in a liquid, gel, or gas—wherein exposure to electric current and/or an electromagnetic field moves the optical particles into (or out of) alignment, thereby changing the opacity, level of light transmission, and/or level of light reflection by the optical element. In an example, an optical element in an array of individually-adjustable transmissive-reflective optical elements can comprise optical particles which are suspended in a liquid, gel, or gas—wherein exposure to electric current and/or an electromagnetic field moves the optical particles into (or out of) alignment with each other, thereby changing the opacity, level of light transmission, and/or level of light reflection by the optical element.

In an example, an optical element in an array of individually-adjustable transmissive-reflective optical elements can comprise optical particles which are suspended in a liquid or gel, wherein exposure to electric current and/or an electromagnetic field moves the optical particles into (or out of) alignment with the plane of the optical element, thereby changing the opacity, level of light transmission, and/or level of light reflection by the optical element. In an example, an optical element and/or electroconductive pathways which are in electromagnetic communication with that optical element can be made from an oxide material selected from the group consisting of: indium tin oxide, molybdenum oxide, nickel oxide, niobium oxide, tungsten oxide, aluminum oxide, fluorinated tin oxide, polytetramethylene oxide, polyethylene oxide, silicon oxide, tantalum oxide, transition metal oxide, and tungsten oxide.

In an example, an optical element in an array of individually-adjustable transmissive-charged optical elements can comprise charged particles which are suspended in a liquid or gel, wherein exposure to electric current and/or an electromagnetic field moves the charged particles from a first configuration in which their orientations are substantially random and a second configuration in which their orientations are substantially aligned with the plane of the optical element, or vice versa. In an example, an optical element in an array of individually-adjustable transmissive-reflective optical elements can comprise optical particles which are suspended in a liquid or gel, wherein exposure to electric current and/or an electromagnetic field moves the optical particles from a first configuration in which their orientations are substantially random and a second configuration in which their orientations are substantially aligned with each other, or vice versa.

In an example, an optical element in an array of individually-adjustable transmissive-reflective optical elements can comprise optical particles which are suspended in a liquid or gel, wherein exposure to electric current and/or an electromagnetic field moves the optical particles from a first configuration in which their orientations are substantially random and a second configuration in which their orientations are substantially aligned with the plane of the optical element, or vice versa.

In an example, an optical element in an array of individually-adjustable transmissive-reflective optical elements can comprise ellipsoidal optical particles which are suspended in a liquid or gel, wherein exposure to electric current and/or an electromagnetic field moves the optical particles from a first configuration in which their orientations are substantially random and a second configuration in which their orientations are substantially aligned with the plane of the optical element, or vice versa. In an example, an optical element in an array of individually-adjustable transmissive-reflective optical elements can comprise hexagonal particles which are suspended in a liquid or gel, wherein exposure to electric current and/or an electromagnetic field moves the optical particles from a first configuration in which their orientations are substantially random and a second configuration in which their orientations are substantially aligned with the plane of the optical element, or vice versa.

In an example, an optical element in an array of individually-adjustable transmissive-reflective optical elements can comprise optical particles which are suspended in a liquid or gel, wherein exposure to electric current and/or an electromagnetic field moves the optical particles from a first configuration in which their orientations are substantially parallel with lines of sight from a person's eye and a second configuration in which their orientations are substantially perpendicular to lines of sight from the person's eye. In an example, an optical element in an array of individually-adjustable transmissive-reflective optical elements can comprise reflective particles which are suspended in a liquid or gel, wherein exposure to electric current and/or an electromagnetic field moves the reflective particles from a first configuration in which their orientations are substantially random and a second configuration in which their orientations are substantially aligned with the plane of the optical element, or vice versa.

In an example, an optical element in an array of individually-adjustable transmissive-reflective optical elements can comprise reflective particles which are suspended in a liquid or gel, wherein exposure to electric current and/or an electromagnetic field moves the reflective particles from a first configuration in which their orientations are substantially random and a second configuration in which their orientations are substantially aligned with each other, or vice versa.

In an example, an optical element can include components made from silver (e.g. silver alloy, silver epoxy, or silver halide emulsion). In an example, an optical element can comprise a layer of silver particles which are suspended in a liquid or gel, wherein the orientations of these particles are changed by exposure to electrical current and/or an electromagnetic field. In an example, an optical element can comprise a layer of electrically-charged metal particles which are suspended in a liquid or gel, wherein the orientations of these particles are changed by exposure to electrical current and/or an electromagnetic field.

In an example, an optical element in an array of individually-adjustable transmissive-charged optical elements can comprise charged particles which are suspended in a liquid or gel, wherein exposure to electric current and/or an electromagnetic field moves the charged particles from a first configuration in which their orientations are substantially parallel with lines of sight from a person's eye and a second configuration in which their orientations are substantially perpendicular to lines of sight from the person's eye.

In an example, an optical element can be made from a generally-nonconductive polymer which has been doped, impregnated, and/or coated with conductive particles. In an example, an optical element can be made from one or more polymers selected from the group consisting of: polypyrrole, polytetrafluoroethylene (PTFE), polyacrylate, polyamide, polycarbonate, polyester, polyethylene naphtalate (PEN), polyethylene terephthalate (PET), polyaniline, polypyrrole, polythiophene, polyvinyl alcohol (PVA), polyimide, polymethyl methacrylate (PMMA), polypropylene oxide (PPO), polyvinylidene difluoride (PVDF), and polyvinylpyrrolidone (PVP).

In an example, an optical element can include metal. In an example, an optical element can be made with metal carbide or a switchable metal hydride film. In an example, an optical element can be made with gold, silver, nickel, or copper (e.g. a copper alloy). In an example, an optical element can be made with aluminum (with Scotty's help) or an aluminum compound such as aluminum oxide. In an example, an optical element can be made with acetate, silicone, or crystal.

In an example, an optical element in an array of individually-adjustable transmissive-reflective optical elements can comprise reflective particles which are suspended in a liquid or gel, wherein exposure to electric current and/or an electromagnetic field moves the reflective particles from a first configuration in which their orientations are substantially parallel with lines of sight from a person's eye and a second configuration in which their orientations are substantially perpendicular to lines of sight from the person's eye. In an example, an optical element can be made with neoprene, nylon, elastane, or parylene. In an example, an optical element can be made with nitride material.

In an example, an optical element can be part of a lens selected from the group consisting of: aspheric lens, asymmetric lens, collimating lens, compound lens, concave lens, concentric lenses, contact lens, convex lens, curved lens, diverging lens, filtered lens, flat lens, fluid lens, fly's eye lens, Fresnel lens, lens with integrated circuitry, lens with nanoscale gratings, liquid lens, MEMS-based lens array, microlens, mirrored lens, movable lens, optoelectric lens, parabolic lens, prescription lens, semi-reflective lens, simple lens, smart lens, spherical lens, tinted lens, variable-focus lens, virtual curved lens, vision-correcting lens, and wedge-shaped lens.

In an example, an optical element in an array of individually-adjustable transmissive-charged optical elements can comprise charged particles which are suspended in a liquid or gel, wherein exposure to electric current and/or an electromagnetic field moves the charged particles into (or out of) alignment, thereby changing the opacity, level of light transmission, and/or level of light reflection by the optical element. In an example, an optical element in an array of individually-adjustable transmissive-reflective optical elements can comprise optical particles which are suspended in a liquid or gel, wherein exposure to electric current and/or an electromagnetic field moves the optical particles. In an example, an optical element can be made with Prussian blue material. In an example, an optical element can be made with ethylene tetrafluoroethylene (ETFE) or ethylene vinyl acetate (EVA). In an example, an optical element can be made with gallium nitride (GaN).

In an example, an optical element in an array of individually-adjustable transmissive-charged optical elements can comprise charged particles which are suspended in a liquid, gel, or gas—wherein exposure to electric current and/or an electromagnetic field moves the charged particles into (or out of) alignment with each other, thereby changing the opacity, level of light transmission, and/or level of light reflection by the optical element. In an example, an individually-adjustable transmissive-reflective optical element can be made with chiral nematic liquid crystals (e.g. crystals made from hydroxypropyl cellulose or cholesteryl benzoate). In an example, an individually-adjustable transmissive-reflective optical element can comprise smectic liquid crystals with bistable properties. In an example, an individually-adjustable transmissive-reflective optical element can comprise smegal crystals because they are so precious. In an example, an individually-adjustable transmissive-reflective optical element can comprise smectic liquid crystals.

In an example, an optical element in an array of individually-adjustable transmissive-charged optical elements can comprise charged particles which are suspended in a liquid or gel, wherein exposure to electric current and/or an electromagnetic field moves the charged particles from a first configuration in which their orientations are substantially random and a second configuration in which their orientations are substantially aligned with each other, or vice versa. In an example, an optical element and/or charged particles in the optical element can be made with carbon (e.g. carbon nanotubes, carbon fibers, or carbonitride). In an example, an optical element can be made with dichromated gelatin.

In an example, an optical element in an array of individually-adjustable transmissive-reflective optical elements can comprise reflective particles which are suspended in a liquid or gel, wherein exposure to electric current and/or an electromagnetic field moves the reflective particles into (or out of) alignment with each other, thereby changing the opacity, level of light transmission, and/or level of light reflection by the optical element. In an example, an optical element in an array of individually-adjustable transmissive-charged optical elements can comprise charged particles which are suspended in a liquid or gel, wherein exposure to electric current and/or an electromagnetic field moves the charged particles. In an example, an optical element in an array of individually-adjustable transmissive-reflective optical elements can comprise reflective particles which are suspended in a liquid or gel, wherein exposure to electric current and/or an electromagnetic field moves the reflective particles into alignment or out of alignment.

In an example, an individually-adjustable transmissive-reflective optical element can be an electrophoretic device. In an example, an optical element can include charged particles which move when exposed to electrical current and/or an electromagnetic field. In an example, an optical element in an array of individually-adjustable transmissive-reflective optical elements can comprise reflective particles which are suspended in a liquid or gel, wherein exposure to electric current and/or an electromagnetic field moves the reflective particles.

In an example, an optical element in an array of individually-adjustable transmissive-charged optical elements can comprise charged particles which are suspended in a liquid or gel, wherein exposure to electric current and/or an electromagnetic field moves the charged particles into (or out of) alignment with the plane of the optical element, thereby changing the opacity, level of light transmission, and/or level of light reflection by the optical element. In an example, an optical element can be made with a viologen compound or cadmium. Alternatively, an optical element and/or electroconductive pathways which deliver electrical current to the optical element can be made with graphene.

In an example, an individually-adjustable transmissive-reflective optical element can comprise liquid crystals whose opacity and/or reflectivity is changed by electrical current and/or exposure to an electromagnetic field. In an example, an individually-adjustable transmissive-reflective optical element can include an adjustable magnesium hydride mirror. In an example, an optical element can contain a plurality of nanoparticles which are suspended in a liquid, wherein application of electric current and/or exposure to an electromagnetic field causes the nanoparticles to align and the optical element to reflect light. In an example, the (center-facing) angle between (the center facing surface of) optical elements and the best-fitting plane of an array of optical elements can decrease with the distance of optical elements from the center of an array of optical elements.

In an example, an individually-adjustable transmissive-reflective optical element can have a first configuration wherein it transmits more than 50% of the light from the environment reaching that element toward a person's eye and reflects less than 50% of the light from a near-eye display reaching that element toward the person's eye. In an example, an individually-adjustable transmissive-reflective optical element can have a first configuration wherein it transmits more than 75% of the light from the environment reaching that element toward a person's eye and reflects less than 25% of the light from a near-eye display reaching that element toward the person's eye.

In an example, an individually-adjustable transmissive-reflective optical element can have a second configuration wherein it transmits less than 75% of the light from the environment reaching that element toward a person's eye and reflects more than 25% of the light from a near-eye display reaching that element toward the person's eye. In an example, an individually-adjustable transmissive-reflective optical element can comprise a liquid crystal grating. In an example, an array of adjustable optical elements can collectively form a Catadioptric Lens or a section of a Catadioptric Lens.

In an example, an individually-adjustable transmissive-reflective optical element can comprise an electro-optical device whose color, light transmission, and/or light reflectivity changes when exposed to electrical current and/or an electromagnetic field. In an example, an individually-adjustable transmissive-reflective optical element can have a second configuration wherein it transmits less than 25% of the light from the environment reaching that element toward a person's eye and reflects more than 75% of the light from a near-eye display reaching that element toward the person's eye.

In an example, the perimeter of a first selected subset of adjustable optical elements can align with the perimeter of a virtual object at a first location in the person's field of view at a first point in time and the perimeter of a second selected subset of adjustable optical elements can align with the perimeter of the same virtual object at a second location in the person's field of view at a second point in time. In an example, the perimeter of the first selected subset of adjustable optical elements can align with the perimeter of a first virtual object in the person's field of view at a first point in time and the perimeter of the second selected subset of adjustable optical elements can align with the perimeter of a second virtual object in the person's field of view at a second point in time.

In an example, an extension of the virtual plane which best fits the display can be substantially-perpendicular to an extension of the virtual plane which best fits the array of optical elements. In an example, an extension of the virtual plane which best fits the display can be intersect an extension the virtual plane which best fits the array of optical elements by an angle within the range of 80 to 100 degrees. In an example, an extension of the virtual plane which best fits the display can be intersect an extension the virtual plane which best fits the array of optical elements by an angle within the range of 70 to 90 degrees. In an example, an extension of the virtual plane which best fits the display can be intersect an extension the virtual plane which best fits the array of optical elements by an angle within the range of 60 to 80 degrees.

In an example, different optical elements in the array (or virtual extensions of these optical elements) can intersect the array plane at different angles. In an example, the intersection angles between optical elements (or virtual extensions of these elements) and the array plane can increase with distance from the center of the array. In an example, optical elements which are farther from the center of the array intersect the array plane at greater angles than optical elements which are closer to the center of the array. In an example, optical elements which are farther from the display intersect the array plane at greater angles than optical elements which are closer to the display.

In an example, the (center-facing) angle between (the center facing surface of) optical elements and the best-fitting plane of an array of optical elements can increase with the distance of optical elements from the center of an array of optical elements. In an example, the angles at which optical elements intersect the array plane vary as a linear function of the distance from the angles to the display. In an example, the angles at which optical elements intersect the array plane vary as a quadratic function of the distance from the angles to the display. In an example, the angles at which optical elements intersect the array plane vary as a linear function of the distance from the angles to the center of the array.

In an example, the angles at which optical elements intersect the array plane can vary as a quadratic function of the distance from the angles to the center of the array. In an example, the intersection angles between optical elements (or virtual extensions of these elements) and the array plane can decrease with distance from the center of the array. In an example, the intersection angles between optical elements (or virtual extensions of these elements) and the array plane increase with distance from the display. In an example, the intersection angles between optical elements (or virtual extensions of these elements) and the array plane can decrease with distance from the display.

In an example, an array of adjustable optical elements can collectively comprise a diffraction grating. In an example, an array of adjustable optical elements can collectively comprise an adjustable grating with a variable pitch. In an example, an array of adjustable optical elements can collectively comprise an adjustable Bragg grating. In an example, an array of adjustable optical elements can collectively comprise a metagrating. In an example, an array of adjustable optical elements can collectively comprise a grating with periodic modulation of its refractive index. In an example, an array of adjustable optical elements can collectively comprise a grating with a variable refractive index.

In an example, an array of individually-adjustable transmissive-reflective optical elements can collectively form a nested array of annular prisms (or rings or ridges). Each of the annular prisms (or rings or ridges) can have a first flat surface which is substantially parallel with lines of sight from a person's eye and can remain transparent. Each of the annular prisms (or rings or ridges) can also have a second flat surface which faces a display and whose level of opacity and/or reflectivity can be adjusted. In an example, the level of light reflectivity from the second surface can be changed by application of electrical current or exposure to an electromagnetic field.

In an example, the angle between a first flat surface on a prism (or ring or ridge) and a second flat surface on a prism (or ring or ridge) can vary in proportion to the distance of a prism (or ring or ridge) from the center of the array. In an example, the angle between a first flat surface and a second flat surface can vary in linear proportion to (e.g. as a linear function of) the distance of a prism (or ring or ridge) from the center of the array. In an example, the angle between a first flat surface and a second flat surface can vary in quadratic proportion to (e.g. as a quadratic function of) the distance of a prism (or ring or ridge) from the center of the array.

In an example, an array of individually-adjustable transmissive-reflective optical elements can collectively form a Fresnel Reflector with a nested array of annular prisms, rings, or ridges wherein a first surface of each prism, ring, or ridge is transparent and a second surface of each prism, ring, or ridge has adjustable reflectivity. In an example, an array of individually-adjustable transmissive-reflective optical elements can collectively form a (left or right side) section of a Fresnel Reflector, wherein the Fresnel Reflector is a nested array of annular prisms, rings, or ridges wherein a first surface of each prism, ring, or ridge is transparent and a second surface of each prism, ring, or ridge has adjustable reflectivity.

In an example, an array of individually-adjustable transmissive-reflective optical elements can comprise an array of nested (e.g. concentric) optical rings, wherein each ring has a first (flat) surface which faces toward the display and a second (flat) surface which faces away from the display, wherein the first surface has a first generally-transmissive (e.g. transparent) configuration and a second generally-non-transmissive (e.g. reflective) configuration, and wherein the second surface always has a generally-transmissive (e.g. transparent) configuration.

In an example, an array of individually-adjustable transmissive-reflective optical elements can comprise an array of radially-alternating optical rings, wherein the optical rings alternative between first rings (flat) surfaces which face toward the display and second rings which faces away from the display, wherein first rings have a first generally-transmissive (e.g. transparent) configuration and a second generally-non-transmissive (e.g. reflective) configuration, and wherein second rings have a generally-transmissive (e.g. transparent) configuration.

In an example, the size of optical elements can increase with the distance of optical elements from the center of an array of optical elements. In an example, the sizes of optical elements can increase with increased distance from the display. In an example, the sizes of optical elements can increase with increased distance from the center of the array. In an example, the sizes of optical elements can vary as a function of distance from the display. In an example, the sizes of optical elements can vary as a linear function of distance from the center of the array.

In an example, the sizes of optical elements can vary as a function of distance from the center of the array. In an example, the sizes of optical elements can vary as a linear function of distance from the display. In an example, the sizes of optical elements can vary as a quadratic function of distance from the display. In an example, the sizes of optical elements can vary as a quadratic function of distance from the center of the array. In an example, the width of optical elements can increase with the distance of optical elements from the center of an array of optical elements.

A Fresnel Reflector can receive substantially-parallel light rays from a distant light source in front of the Fresnel Reflector and reflect those light rays so that they converge onto a point directly in front of the center of the Fresnel Reflector. A Fresnel Reflector design can be used in this manner to create an electrical generator which is powered by solar energy. In an example, a Fresnel Reflector can perform plane-wave-to-point reflection. A Fresnel Reflector can also function in the opposite direction, receiving light rays from a point directly in front of the of the Fresnel Reflector and reflecting those light rays that that they exit the front of the Fresnel along vectors which are substantially perpendicular to the Fresnel Reflector and substantially parallel to each other. A Fresnel Reflector design is sometimes in this way to project light rays from a spot light.

In an example, nested annular prisms or ridges in a Fresnel Reflector section can reflect an image from a display which is located on one side (e.g. to the right or left) of an eye toward the eye. In an example, nested annular prisms or ridges in a Fresnel Reflector section can reflect light rays from a display located on one side (e.g. to the right or left) of an eye toward the eye. In an example, light rays reflected from the Fresnel Reflector section toward the eye can be substantially parallel to each other. In an example, light rays reflected from the Fresnel Reflector section toward the eye can be substantially perpendicular to the plane of the Fresnel Reflector section. In an example, light rays reflected from the Fresnel Reflector section toward the eye can converge onto the pupil of the eye. In an example, light rays reflected from the Fresnel Reflector section toward the eye can converge onto the retina of the eye.

In an example, a Fresnel Reflector can comprise an array of concentric annular prisms which receive light rays from a point in space which is directly in front of the center of array (on a virtual extension of the central optical axis of the array) and reflect these light rays out from the front of the array along vectors which are (substantially) parallel to each other and (substantially) perpendicular to the virtual plane which best fits the array. In an example, each of the annular prisms can be sub-divided into separate optical elements.

In an example, a Fresnel Reflector can comprise an array of concentric annular reflective ridges which receive light rays from a point in space which is directly in front of the center of array (on a virtual extension of the central optical axis of the array) and reflect these light rays out from the front of the array along vectors which are (substantially) parallel to each other and (substantially) perpendicular to the virtual plane which best fits the array. In an example, each of the annular reflective ridges can be sub-divided into separate optical elements.

In an example, a Quasi Fresnel Reflector (QFR) can be a section of a Fresnel Reflector. A QFR can be created by selecting (e.g. "cutting out") a section of the right half or left half (viewed from a frontal perspective) of a Fresnel Reflector. In an example, the shape of such a QFR (e.g. section of a Fresnel Reflector) can be a circular, elliptical, or oval. A QFR (e.g. section of a Fresnel Reflector) can receive light rays from a light source which is located to the left or to the right of a person's eye (e.g. from a display on the sidepiece of eyewear) and can reflect those light rays out from the QFR along vectors which are substantially perpendicular to QFR and parallel to each other.

As applied to augmented reality eyewear, a QFR (e.g. section of a Fresnel Reflector) can receive light rays from a light source (e.g. image display) located to the left or right of a person's eye and then reflect these light rays toward the person's eye. A QFR (e.g. section of a Fresnel Reflector) can do this with less bulk than a 45-degree reflector (e.g. Pepper's Ghost) and with less distortion than a smooth-curved reflector (e.g. a "Bird Bath" reflector). In an example, a QFR (e.g. section of a Fresnel Reflector) can be divided into an array of adjustable optical elements. In an example, a QFR (e.g. section of a Fresnel Reflector) can be formed by an array of adjustable optical elements. In an example, an array of adjustable optical elements can collectively form a section of a Fresnel Reflector.

In an example, an array of optical elements can comprise a section or portion of the front surface of a Fresnel Reflector. In an example, an array of optical elements can comprise a section of the right half or the left half of a Fresnel Reflector. In an example, an array of optical elements can comprise a section of the right-most or left-most quarter of Fresnel Reflector In an example, the area of this section can comprise between 1% and 10% of the front-side area of the Fresnel Reflector. In an example, the area of this section can comprise between 5% and 20% of the front-side area of the Fresnel Reflector. In an example, an array of optical elements can be a spoke-and-ring array of optical elements. In an example, an array of optical elements can be a spoke-and-ring array of optical elements which combine to form a section of a Fresnel Reflector. In an example, an array of optical elements can combined to comprise a nested array of annular adjustably-reflective prisms.

In an example, an array of optical elements can comprise a side section of a Fresnel Reflector, wherein a side section is a section of the right half or the left half of the Fresnel Reflector (as seen with a circular perimeter from a front or rear perspective). In an example, an array of optical elements can comprise a symmetric central section of a Fresnel Reflector, wherein a symmetric central section is a section of the Fresnel Reflector whose center is the center of the Fresnel Reflector (as seen with a circular perimeter from an front or rear perspective). In an example, an array of optical elements can comprise an asymmetric central section of a Fresnel Reflector, wherein an asymmetric central section is a section of the Fresnel Reflector which includes the center of the Fresnel Reflector but whose center is not the center of the Fresnel Reflector (as seen with a circular perimeter from an front or rear perspective.

In an example a right-side or left-side section of a Fresnel Reflector can receive light rays from a light source to the left or right, respectively, of the section and reflect those light rays outward in a substantially-parallel manner. In an example a side section of a Fresnel Reflector can receive light rays from a display to one side of an eye and reflect those light rays toward the eye in a substantially-parallel manner. In an example a symmetric central section of a Fresnel Reflector can receive and reflect light rays in a similar manner to the full Fresnel Reflector. In an example, an array of these optical elements can comprise a section (or portion) of a Fresnel Reflector. In an example, an array of these optical elements can comprise a circular, elliptical, or oval section (or portion) of a Fresnel Reflector. In an example, a Fresnel Reflector can comprise an array of nested (e.g. concentric) rings around a central point.

In an example, a first selected subset of adjustable optical elements in a section of a Fresnel Reflector can be selected and changed from their first configurations to their second configurations at a first point in time (wherein optical elements not in this subset remain in their first configurations) and a second selected subset of adjustable optical elements can be selected and changed from their first configurations to their second configurations at a second point in time (wherein optical elements not in this subset remain in their first configurations).

In an example, augmented reality eyewear which is worn by a person can comprise right and left Fresnel Reflector sections on the frontpiece of the eyewear and right and left displays on the right and left sidepieces (e.g. temples), respectively, of the eyewear, wherein light from the right and left displays is reflected by selected subsections of the right and left Fresnel Reflector sections, respectively, toward the person's right and left eyes, and wherein the selected subsections align with virtual objects in the displays in the person's field of view.

In an example, augmented reality eyewear which is worn by a person can comprise two Fresnel Reflector sections in front of the person's eyes and two prescription lenses between the Fresnel Reflector sections and the person's eyes. In an example, augmented reality eyewear which is worn by a person can comprise right and left Fresnel Reflector sections on the frontpiece of the eyewear and right and left displays on the right and left sidepieces (e.g. temples), respectively, of the eyewear, wherein light from the right and left displays is reflected by the right and left Fresnel Reflector sections, respectively, toward the person's right and left eyes.

In an example, the central optical axis of a Fresnel Reflector is a line which passes through the center of the reflector and is perpendicular to the best-fitting common plane of the reflector. In an example, a Fresnel Reflector can: (1) receive substantially-parallel light rays from a distance source and reflect these light rays onto a common focal point on its central optical axis; or (2) receive light rays from a focal point on its central optical axis and reflect those light rays outward in a substantially-parallel manner.

In an example, a Fresnel Reflector can have a plurality of concentric annular ridges (e.g. ridges, saw teeth, rings, and/or prisms), wherein these ridges comprise an alternating sequence of light-reflecting and light-transmitting annular surfaces as one moves radially outward from the center of the Fresnel Reflector. In an example, the light reflective surfaces face toward the center of the Fresnel Reflector. In an example, each annular ridge, ring, and/or prism can be sub-divided by radial spokes into individual optical elements, wherein each individual optical element includes an adjustable light-reflecting surface which can be changed from a first configuration which (primarily) transmits light to a second configuration which (primarily) reflects light. In an example, a Fresnel Reflector can perform plane-wave-to-plane-wave reflection.

In an example, a Fresnel Reflector which is configured to be placed in front of a person's eye can comprise a plurality of nested annular ridges (e.g. ridges, peaks, and/or saw-teeth), wherein each ridge has a first side which is always transparent and substantially parallel to a line of sight from the person's eye, and wherein each ridge has a second side which is adjustably-reflective and not parallel to a line of sight from the person's eye. In an example, section of a Fresnel Reflector which is configured to be placed in front of a person's eye can comprise a series of curved ridges (e.g. ridges, peaks, and/or saw-teeth), wherein each ridge has a first side which is always transparent and substantially parallel to a line of sight from the person's eye, and wherein each ridge has a second side which is adjustably-reflective and not parallel to a line of sight from the person's eye.

The degree of curvature (e.g. convexity) of ridges (e.g. ridges, peaks, and/or saw-teeth) in a right-or-left-side section of a Fresnel Reflector depends on the size of the section relative to the size of the overall Fresnel Reflector. For example, as the size of a right-or-left-side section of a Fresnel Reflector becomes smaller relative to the size of the Fresnel Reflector (or, from another perspective, the size of the Fresnel Reflector becomes larger relative to the size of a right-or-left-side the section), ridges in that section become less curved and more straight. In the extreme, as the size of the Fresnel Reflector approaches infinity, ridges in a fixed-size section converge to parallel straight ridges.

The curvature of ridges (e.g. ridges, peaks, and/or saw-teeth) in a right-or-left-side section of a Fresnel Reflector also depends on the location of the section relative to the overall Fresnel Reflector. For example, as fixed-size right-or-left-side section of a Fresnel Reflector moves away from the center of the Fresnel Reflector, then ridges in that section become less curved and straighter. The distances between ridges (e.g. ridges, peaks, and/or saw-teeth) in a right-or-left-side section of a Fresnel Reflector depend on the distances between ridges in the overall Fresnel Reflector from which the section is extracted. If the distances between ridges in the overall Fresnel Reflector are not constant with distance from the center of the Reflector, then the distances between ridges in a section can also depend on distance of the section from the center of the Fresnel Reflector.

In an example, the opacity, level of light transmission, and/or light reflectivity of an individually-adjustable transmissive-reflective optical element in an array of optical element can be selectively changed by exposing the element to electrical current and/or an electromagnetic field via an array of primarily transparent (or, at least translucent) electroconductive pathways. In an example, the opacity, level of light transmission, and/or light reflectivity of individually-adjustable transmissive-reflective optical elements in an array of optical element can be individually and selectively changed by exposing them to electrical current and/or an electromagnetic field via an array of primarily transparent (or, at least translucent) electroconductive pathways.

In an example, an optical element can have points of electroconductive communication with electroconductive pathways in an array of electroconductive pathways. In an example, when electrical current is passed between the two points, then this changes the opacity, level of light transmission, and/or level of light reflectivity of the optical element. In an example, two vertexes of an optical element can be in electroconductive communication with electroconductive pathways in an array of electroconductive pathways. In an example, when electrical current is passed through the pathways and between the two vertexes, then this changes the levels of light transmission vs. light reflectance of the optical element.

In an example, an optical element can have a polygonal shape, wherein two vertexes of the optical element are in electromagnetic communication with transparent (or translucent) electroconductive pathways and wherein passing electrical current through these two vertexes causes the optical element to become more light reflective and less light transmissive, or vice versa. In an example, an optical element can have a rectangular shape, wherein two vertexes of the optical element are in electromagnetic communication with transparent (or translucent) electroconductive pathways and wherein passing electrical current through these two vertexes causes the optical element to become more light reflective and less light transmissive, or vice versa.

In an example, an optical element can have a hexagonal shape, wherein two vertexes of the optical element are in electromagnetic communication with transparent (or translucent) electroconductive pathways and wherein passing electrical current through these two vertexes causes the optical element to become more light reflective and less light transmissive, or vice versa. In an example, an optical element can have a wedge and/or keystone shape, wherein two vertexes of the optical element are in electromagnetic communication with transparent (or translucent) electroconductive pathways and wherein passing electrical current through these two vertexes causes the optical element to become more light reflective and less light transmissive, or vice versa.

In an example, two layers of an optical element can be in electroconductive communication with electroconductive pathways in an array of electroconductive pathways. In an example, when electrical current is passed through the pathways and between the two layers, then this changes the levels of light transmission vs. light reflectance of the optical element. In an example, two sides of an optical element can be in electroconductive communication with electroconductive pathways in an array of electroconductive pathways. In an example, when electrical current is passed through the pathways and between the two sides, then this changes the levels of light transmission vs. light reflectance of the optical element. In an example, an optical element can comprise a photochromic layer between two electrodes. In an example, an optical element can comprise an electrochromic coating and two or more electrodes.

In an example, an array of transparent electroconductive pathways can comprise a row and column grid (e.g. grid, mesh, or array) of pathways. In an example, electroconductive pathways in an array of electroconductive pathways can be undulating, serpentine, and/or sinusoidal. In an example, an electroconductive pathway can be made with carbon (e.g. carbon fibers, carbon nanotubes, or carbonitrides). In an example, an electroconductive pathway can be made with nylon. In an example, an optical element can comprise a first transparent (or at least translucent) electroconductive layer, a second transparent (or at least translucent) electroconductive layer, and an adjustable transmissive-reflective layer between the first and second transparent layers.

In an example, different electroconductive pathways in an array can have different lengths or thicknesses. In an example, electroconductive pathways closer to the center of the array can be shorter and/or thinner than pathways farther from the center. In an example, a transparent electroconductive pathway can have variable resistance. In an example, electroconductive pathways at different locations in an array of electroconductive pathways can have different levels of resistance. In an example, an array of transparent electroconductive pathways can comprise a ring and spoke grid (e.g. grid, mesh, or array) of pathways. In an example, an electroconductive pathway can be made with elastane. In an example, a transparent electroconductive pathway can encircle an optical element. In an example, an electroconductive pathway can be made with nickel.

In an example, transparent electroconductive pathways can span between optical elements in an array of optical elements. In an example, electroconductive pathways can run along the perimeters of optical elements. In an example, an optical element can comprise a first transparent (or at least translucent) electrode, a second transparent (or at least translucent) electrode, and an electrochromic layer between the first and second transparent electrodes. In an example, an electroconductive pathway can be made from a transparent (or at least translucent) generally-nonconductive polymer which has been doped and/or impregnated with electroconductive particles. In an example, an electroconductive pathway can be made from a silicon-based polymer which has been doped and/or impregnated with metal particles.

In an example, an array of transparent electroconductive pathways can comprise a nested ring grid (e.g. grid, mesh, or array) of pathways. In an example, an array of transparent electroconductive pathways can comprise a concentric ring grid (e.g. grid, mesh, or array) of pathways. In an example, an electroconductive pathway can be made with ethylene tetrafluoroethylene (ETFE) or ethylene vinyl acetate (EVA). In an example, an electroconductive pathway can be made with gallium nitride (GaN). In an example, pathways in an array of transparent electroconductive pathways can be undulating or sinusoidal. In an example, an electroconductive pathway can be made with gold.

In an example, an array of transparent electroconductive pathways can comprise a hexagonal grid (e.g. grid, mesh, or array) of pathways. In an example, an electroconductive pathway can be made with acrylic. In an example, an electroconductive pathway can be made with tungsten. In an example, pathways in an array of transparent electroconductive pathways can have zigzag or sawtooth shapes. In an example, an electroconductive pathway can be made with graphene.

In an example, distances between electroconductive pathways can be smaller toward the center of an array of electroconductive pathways and toward the perimeter of the array. In an example, an electroconductive pathway can be made with indium tin oxide (ITO). In an example, the density of electroconductive pathways can be greater toward the center of an array of electroconductive pathways and toward the perimeter of the array. In an example, an electroconductive pathway can be made with lithium niobate. In an example, an optical element can comprise a first transparent (or at least translucent) electroconductive layer, a second transparent (or at least translucent) electroconductive layer, and an electrochromic layer between the first and second transparent layers. In an example, an electroconductive pathway can be made with parylene.

In an example, an optical element can comprise a first transparent (or at least translucent) electroconductive layer, a second transparent (or at least translucent) electroconductive layer, and a liquid crystal layer between the first and second transparent layers. In an example, an electroconductive pathway can be made with an oxide compound [e.g. Indium Tin Oxide (ITO, aluminum oxide (AO), fluorine-doped tin oxide, polyethylene oxide (PEO), polypropylene oxide (PPO), silicon oxide, tantalum oxide, titanium oxide, or tungsten oxide]. In an example, an array of transparent electroconductive pathways can comprise a quadrilateral grid (e.g. grid, mesh, or array) of pathways. In an example, an electroconductive pathway can be made with aluminum. In an example, an electroconductive pathway can be made with zinc.

In an example, an array of transparent electroconductive pathways can comprise a latitudinal and longitudinal grid (e.g. grid, mesh, or array) of pathways. In an example, an electroconductive pathway can be made with cadmium. In an example, an array of transparent electroconductive pathways can comprise a grid (e.g. grid, mesh, or array) of pathways wherein there are hexagon-shaped spaces between pathways. In an example, a transparent electroconductive pathway can span the perimeter of a polygonal optical element.

In an example, an optical element can comprise a first transparent (or at least translucent) electrode, a second transparent (or at least translucent) electrode, and an adjustable transmissive-reflective layer between the first and second transparent electrodes. In an example, an electroconductive pathway can be made with a polymer [e.g., PEDOT:PPS, polyvinylpyrrolidone (PVP), polytetramethylene oxide (PTMO), polypyrrole, polyacrylate, polytetrafluoroethylene (PTFE), polyamide, polyester, polymethyl methacrylate (PMMA), polyvinyl alcohol (PVA), polyethylene naphtalate (PEN), polyethylene terephthalate (PET), polycarbonate, polyimide, or polyvinylidene difluoride (PVDF)].

In an example, a transparent electroconductive pathway can span at least two sides of a polygonal optical element. In an example, transparent electroconductive pathways can travel between optical elements in an array of optical elements. In an example, an optical element can comprise a first transparent (or at least translucent) electroconductive layer, a second transparent (or at least translucent) electroconductive layer, and an adjustable transmissive-reflective layer between the first and second transparent layers, wherein transmission of electrical energy through the adjustable transmissive-reflective layer and/or exposure of the adjustable transmissive-reflective layer to electromagnetic field via the electroconductive layers changes the opacity, level of light transmission, and/or level of light reflection of the adjustable transmissive-reflective layer. In an example, an electroconductive pathway can be made with silicon, polysilicon, silicon nitride, and/or silicon oxy nitride.

In an example, an array of transparent electroconductive pathways can comprise a hub and spoke grid (e.g. grid, mesh, or array) of pathways. In an example, an electroconductive pathway can be made with copper (e.g. a copper alloy). In an example, an array of transparent electroconductive pathways can comprise a grid (e.g. grid, mesh, or array) of pathways wherein there are quadrilateral-shaped spaces between pathways.

In an example, an optical element can comprise a first transparent (or at least translucent) electroconductive layer, a second transparent (or at least translucent) electroconductive layer, and an liquid crystal layer between the first and second transparent layers, wherein transmission of electrical energy through the liquid crystal layer and/or exposure of the liquid crystal layer to electromagnetic field via the electroconductive layers changes the opacity, level of light transmission, and/or level of light reflection of the liquid crystal layer. In an example, an electroconductive pathway can be made with silver (e.g. silver alloy, silver nanowires, silver epoxy, and/or silver halide emulsion).

In an example, an array of transparent electroconductive pathways can comprise a grid (e.g. grid, mesh, or array) of pathways wherein there are wedge or keystone shaped spaces between pathways. In an example, an electroconductive pathway can be made with acetate. In an example, an electroconductive pathway can be made with titanium nitride. In an example, a transparent electroconductive pathway can be electrically anisotropic. In an example, an electroconductive pathway can be made with nitride material.

In an example, two transparent electroconductive pathways can be in communication with the two sides, respectively, of an optical element. In an example, an optical element can comprise a first transparent (or at least translucent) electrode, a second transparent (or at least translucent) electrode, and a liquid crystal layer between the first and second transparent electrodes. In an example, an electroconductive pathway can be made from a transparent (or at least translucent) polymer which has been doped and/or impregnated with electroconductive particles. In an example, the density of electroconductive pathways can be greater in the center of an array of electroconductive pathways than in the periphery of the array. In an example, an electroconductive pathway can be made with neoprene. In an example, an array of transparent electroconductive pathways can comprise a grid (e.g. grid, mesh, or array) of pathways wherein there are triangular-shaped spaces between pathways.

In an example, an optical element can comprise a first transparent (or at least translucent) electroconductive layer, a second transparent (or at least translucent) electroconductive layer, and an electrochromic layer between the first and second transparent layers, wherein transmission of electrical energy through the electrochromic layer and/or exposure of the electrochromic layer to electromagnetic field via the electroconductive layers changes the opacity, level of light transmission, and/or level of light reflection of the electrochromic layer. In an example, an electroconductive pathway can be made with tin. In an example, distances between electroconductive pathways can be smaller in the center of an array of electroconductive pathways than in periphery of the array. In an example, an electroconductive pathway can be made with metal carbide.

In an example, a Fresnel Reflector can comprise a nested array of reflective ridges, wherein the widths of the reflective ridges change as a linear function of distance from the center of the reflector. In an example, an optical element can comprise a layer with helical sequences of reflective particles which are suspended in a fluid or gas, wherein the orientations of these particles changed by exposure to electrical current and/or an electromagnetic field. In an example, an electroconductive pathway can be made from silver, copper, or gold nanowires. In an example, an electroconductive pathway can be made from indium tin oxide or indium gallium zinc oxide.

In an example, a Fresnel Reflector can comprise a nested array of reflective ridges, wherein the angles of the reflective ridges change as a quadratic function of distance from the center of the reflector. In an example, a Fresnel Reflector can be made with aluminum oxide, hafnium oxide, or titanium dioxide. In an example, an optical element can comprise a layer of optically-anisotropic particles which are suspended in a fluid or gas, wherein the orientations of these particles are switchably aligned, or misaligned, by exposure to electrical current and/or an electromagnetic field. In an example, a Fresnel Reflector can comprise a nested array of reflective ridges, wherein the widths of the reflective ridges change as a quadratic function of distance from the center of the reflector.

In an example, a Fresnel Reflector can comprise a nested array of reflective ridges, wherein the heights of the reflective ridges change as a quadratic function of distance from the center of the reflector. In an example, a Fresnel Reflector can comprise a nested array of reflective ridges, wherein the angles of the reflective ridges change as a step-linear function of distance from the center of the reflector. In an example, a Fresnel Reflector can comprise a nested array of reflective ridges, wherein the widths of the reflective ridges change as one moves away from the center of the reflector. In an example, an optical element can comprise a layer of optically-anisotropic particles which are suspended in a fluid or gas, wherein the orientations of these particles are changed by exposure to electrical current and/or an electromagnetic field.

In an example, a Fresnel Reflector can comprise a nested array of reflective ridges, wherein the widths of the reflective ridges change as a step-linear function of distance from the center of the reflector. In an example, a Fresnel Reflector can comprise a nested array of reflective ridges, wherein the heights of the reflective ridges change as a step-linear function of distance from the center of the reflector. In an example, an electroconductive pathway can be made from an electrically conductive polymer. In an example, an optical element can comprise a layer of optically-anisotropic particles which are suspended in a fluid or gas, wherein the orientations of these particles are changed by exposure to electrical current and/or an electromagnetic field. In an example, an optical element can be made from an electroactive and/or electrostrictive polymer.

In an example, a Fresnel Reflector can comprise a nested array of reflective ridges, wherein the heights of the reflective ridges change as one moves away from the center of the reflector. In an example, an optical element can comprise a layer of optically-anisotropic particles which are suspended in a fluid or gas, wherein the orientations of these particles are rotated by exposure to electrical current and/or an electromagnetic field. In an example, a Fresnel Reflector can comprise a nested array of reflective ridges, wherein the angles of the reflective ridges change as a linear function of distance from the center of the reflector.

In an example, an optical element can comprise a layer of optically-anisotropic particles which are suspended in a fluid or gas, wherein the orientations of these particles are reversibly aligned, or misaligned, by exposure to electrical current and/or an electromagnetic field. In an example, a Fresnel Reflector can be made using thin film physical vapor deposition. In an example, an optical element can comprise a layer of optically-anisotropic particles which are suspended in a fluid or gas, wherein the orientations of these particles are rotated by exposure to electrical current and/or an electromagnetic field. In an example, a Fresnel Reflector can be made with magnesium oxide or magnesium fluoride.

In an example, an optical element can comprise a layer of optically-anisotropic reflective particles which are suspended in a fluid or gas, wherein the orientations of these particles are changed by exposure to electrical current and/or an electromagnetic field. In an example, a Fresnel Reflector can comprise a nested array of reflective ridges, wherein the heights of the reflective ridges change as a linear function of distance from the center of the reflector. In an example, an optical element can comprise helical arrays of reflective particles which are suspended in a fluid or gas, wherein the orientations of these particles changed by exposure to electrical current and/or an electromagnetic field.

In an example, a Fresnel Reflector can comprise a nested array of reflective ridges, wherein the angles of the reflective ridges change in a non-continuous manner as one moves away from the center of the reflector. In an example, an optical element can comprise a layer of optically-anisotropic reflective particles which are suspended in a fluid or gas, wherein the orientations of these particles are rotated by exposure to electrical current and/or an electromagnetic field. In an example, a Fresnel Reflector can comprise a nested array of reflective ridges, wherein the angles of the reflective ridges change as one moves away from the center of the reflector.

In an example, an optical element can comprise a layer of optically-anisotropic reflective particles which are suspended in a fluid or gas, wherein the orientations of these particles are switchably aligned, or misaligned, by exposure to electrical current and/or an electromagnetic field. In an example, an electroconductive pathway can be made from material including copper, silver, gold, or aluminum. In an example, a Fresnel Reflector can be made with a reflective thin film coating. In an example, an optical element can comprise a layer of optically-anisotropic particles which are suspended in a fluid or gas, wherein the orientations of these particles are reversibly aligned, or misaligned, by exposure to electrical current and/or an electromagnetic field. In an example, an electroconductive pathway can be made from graphene.

In an example, a Fresnel Reflector can comprise a nested array of reflective ridges, wherein the periodicity of the reflective ridges changes as one moves away from the center of the reflector. In an example, an optical element can comprise a layer of optically-anisotropic reflective particles which are suspended in a fluid or gas, wherein the orientations of these particles are reversibly aligned, or misaligned, by exposure to electrical current and/or an electromagnetic field. In an example, an electroconductive pathway can be made from carbon fibers or nanotubes.

In an example, augmented reality eyewear can further comprise a Digital Micromirror Array (DMA). In an example, augmented reality eyewear can further comprise one or more optical waveguides. In an example, augmented reality eyewear can further comprise one or more light-transmitting nanotubes. In an example, augmented reality eyewear can further comprise a Liquid Crystal Display (LCD). In an example, augmented reality eyewear can further comprise an off-axis optical projection system. In an example, augmented reality eyewear can further comprise a beam splitter.

In an example, augmented reality eyewear can further comprise a reflective liquid crystal array. In an example, augmented reality eyewear can further comprise a variable focus lens. In an example, augmented reality eyewear can further comprise a liquid crystal array or matrix. In an example, augmented reality eyewear can further comprise an electrically-activated liquid crystal lens. In an example, augmented reality eyewear can further comprise light transmitting nanotubes. In an example, augmented reality eyewear can further comprise an optical filter.

In an example, augmented reality eyewear can further comprise Light Emitting Diodes (LEDs). In an example, augmented reality eyewear can further comprise an optoelectric lens array or matrix. In an example, augmented reality eyewear can further comprise a data receiver. In an example, augmented reality eyewear can further comprise a lens. In an example, augmented reality eyewear can further comprise an optical waveguide. In an example, augmented reality eyewear can further comprise a metal oxide semiconductor. In an example, augmented reality eyewear can further comprise a microelectromechanical (MEMS) mirror array which directs light from a display toward an array of optical elements.

In an example, augmented reality eyewear can further comprise a micro-prism array. In an example, augmented reality eyewear can further comprise a polarizing beam splitter. In an example, augmented reality eyewear can further comprise a prism array or matrix. In an example, augmented reality eyewear can further comprise a data processor. In an example, augmented reality eyewear can further comprise a Digital Micromirror Device (DMD).

In an example, augmented reality eyewear can further comprise a battery. In an example, augmented reality eyewear can comprise a photonic metamaterial. In an example, augmented reality eyewear can further comprise a thin-film transistor. In an example, augmented reality eyewear can further comprise a collimator. In an example, augmented reality eyewear can further comprise a reflection holographic volume grating. In an example, augmented reality eyewear can further comprise a holographic array or matrix. In an example, augmented reality eyewear can further comprise a directional diffuser.

In an example, augmented reality eyewear can further comprise a spatial light modulator. In an example, augmented reality eyewear can further comprise a data transmitter. In an example, augmented reality eyewear can further comprise one or more light channels. In an example, augmented reality eyewear can comprise birefringent material. In an example, augmented reality eyewear can further comprise a reflective Liquid-Crystal-On-Silicon array.

In an example, augmented reality eyewear can further comprise a touch screen. In an example, augmented reality eyewear can further comprise a nanoscale grating. In an example, augmented reality eyewear can further comprise a diffraction grating. In an example, augmented reality eyewear can further comprise a spatial filter. In an example, augmented reality eyewear can further comprise a micromirror array.

In an example, augmented reality eyewear can comprise: eyewear which is configured to be worn by a person; one or more light-emitting displays which are held in place by the eyewear, wherein the displays projects one or more virtual objects in the person's field of view; one or more arrays of adjustably-reflective optical elements which is held in place by the eyewear, wherein optical elements in an array of adjustably-reflective optical elements collectively comprise a section of a Fresnel Reflector, wherein each optical element in an array has a first configuration which reflects a first percentage of light hitting it, wherein each optical element in an array has a second configuration which reflects a second percentage of light hitting it, and wherein the second percentage is greater than the first percentage, wherein optical elements in the array of adjustably-reflective optical element further comprise a layer of electrochromic material; and one or more arrays of transparent or translucent electroconductive pathways, wherein optical elements in an array of adjustably-reflective optical elements can be selectively and individually changed from their first configurations to their second configurations, or vice versa, by exposure to electrical current and/or an electromagnetic field via one or more electroconductive pathways in an array of transparent or translucent electroconductive pathways.

In an example, augmented reality eyewear can comprise: eyewear worn by a person; a light-emitting display on a sidepiece (e.g. "temple") of the eyewear; an array of individually-adjustable transmissive-reflective optical elements on the eyewear, wherein the array of individually-adjustable transmissive-reflective optical elements collectively comprise a convex section (e.g. circular, elliptical, oval, or egg-shaped section) of a Fresnel selected from (e.g. cut out from) the interior of a 10-30 degree pie-shaped section of the Fresnel Reflector, wherein each optical element in the array has a first configuration which primarily transmits light from the environment to the person's eye and primarily transmits light from the display to the environment, wherein each optical element in the array has a second configuration which primarily reflects light from the environment and primarily reflects light from the display toward the person's eye, and wherein each optical element in the array can each be individually and selectively changed from the first configuration to the second configuration, or vice versa; and an array of transparent (or translucent) electroconductive pathways on the eyewear, wherein each optical element in the array of optical elements can be individually and selectively changed from the first configuration to the second configuration, or vice versa, by exposure to electrical current and/or an electromagnetic field via one or more electroconductive pathways in the array of electroconductive pathways.

In an example, augmented reality eyewear can comprise: eyewear worn by a person; a display on the eyewear; a plurality of optical elements on the eyewear, wherein each optical element in the plurality of optical elements has a first configuration which is substantially transparent and a second configuration which is substantially reflective; and a plurality of electroconductive pathways, wherein each optical element in the plurality of optical elements can be individually and selectively changed from the first configuration to the second configuration by exposure to electrical current and/or an electromagnetic field via one or more electroconductive pathways in the plurality of electroconductive pathways. In an example, substantially transparent means transmitting at least 80% of incident light. In an example, substantially reflective means reflecting at least 80% of incident light.

In an example, augmented reality eyewear can comprise: eyewear which is configured to be worn by a person; a light-emitting display which is configured to be held to the right or left of one of the person's eyes by the eyewear; an array of individually-adjustable transmissive-reflective optical elements which is configured to be held in front of the person's eye by the eyewear; wherein optical elements in the array each have a first configuration which transmits a first level of light from the environment through the eyewear to the person's eye and reflects a second level of light from the display toward the person's eye; wherein optical elements in the array each have a second configuration which transmits a third level of light from the environment through the eyewear to the person's eye and reflects a fourth level of light from the display toward the person's eye; wherein the third level is less than the first level; wherein the fourth level is greater than the second level; and wherein optical elements in the array can be individually and selectively changed from their first configurations to their second configurations, or vice versa; and an array of transparent or translucent electroconductive pathways which is configured to be held in front of the person's eye by the eyewear; wherein the array of electroconductive pathways is in electrical and/or electromagnetic communication with the array of optical elements, wherein optical elements in the array of optical elements are changed from the first configuration to the second configuration, or vice versa, by electrical and/or electromagnetic energy from electroconductive pathways in the array of electroconductive pathways.

In an example, augmented reality eyewear can comprise: eyewear worn by a person; a display on the eyewear; a plurality of optical elements on the eyewear, wherein each optical element in the plurality of optical elements has a first configuration which is substantially transparent and a second configuration which is substantially reflective; and a plurality of electroconductive pathways, wherein each optical element in the plurality of optical elements can be individually and selectively changed from the first configuration to the second configuration by exposure to electrical current and/or an electromagnetic field via one or more electroconductive pathways in the plurality of electroconductive pathways. In an example, substantially transparent means transmitting at least 90% of incident light. In an example, substantially reflective means reflecting at least 90% of incident light.

In an example, augmented reality eyewear can comprise: eyewear worn by a person; a display on the eyewear; a plurality of optical elements on the eyewear, wherein the plurality of optical elements collectively comprise a section of a Fresnel Reflector, and wherein each optical element in the plurality of optical elements has a first configuration which is substantially transparent and a second configuration which is substantially reflective; and a plurality of electroconductive pathways, wherein each optical element in the plurality of optical elements can be individually and selectively changed from the first configuration to the second configuration by exposure to electrical current and/or an electromagnetic field via one or more electroconductive pathways in the plurality of electroconductive pathways. In an example, substantially transparent means transmitting at least 80% of incident light. In an example, substantially reflective means reflecting at least 80% of incident light.

In an example, augmented reality eyewear can comprise: eyewear worn by a person; a display on the eyewear; a plurality of optical elements on the eyewear, wherein the plurality of optical elements collectively comprise a section of a Fresnel Reflector, and wherein each optical element in the plurality of optical elements has a first configuration which is substantially transparent and a second configuration which is substantially reflective; and a plurality of electroconductive pathways, wherein each optical element in the plurality of optical elements can be individually and selectively changed from the first configuration to the second configuration by exposure to electrical current and/or an electromagnetic field via one or more electroconductive pathways in the plurality of electroconductive pathways. In an example, substantially transparent means transmitting at least 90% of incident light. In an example, substantially reflective means reflecting at least 90% of incident light.

In an example, augmented reality eyewear can comprise: eyewear which is configured to be worn by a person; one or more light-emitting displays which are held in place by the eyewear; one or more arrays of adjustably-reflective optical elements which is held in place by the eyewear, wherein optical elements in an array of adjustably-reflective optical elements collectively comprise a section of a Fresnel Reflector, wherein each optical element in an array has a first configuration which reflects a first percentage of light hitting it from the one or more displays, wherein each optical element in an array has a second configuration which reflects a second percentage of light hitting it from the one or more displays, and wherein the second percentage is greater than the first percentage; and one or more arrays of transparent or translucent electroconductive pathways, wherein optical elements in an array of adjustably-reflective optical elements can be selectively and individually changed from their first configurations to their second configurations, or vice versa, by exposure to electrical current and/or an electromagnetic field via one or more electroconductive pathways in an array of transparent or translucent electroconductive pathways.

In an example, augmented reality eyewear can comprise: eyewear worn by a person; a display on the eyewear; a plurality of optical elements on the eyewear, wherein the plurality of optical elements collectively comprise between 5% and 25% of a Fresnel Reflector, and wherein each optical element in the plurality of optical elements has a first configuration which is substantially transparent and a second configuration which is substantially reflective; and a plurality of electroconductive pathways, wherein each optical element in the plurality of optical elements can be individually and selectively changed from the first configuration to the second configuration by exposure to electrical current and/or an electromagnetic field via one or more electroconductive pathways in the plurality of electroconductive pathways. In an example, substantially transparent means transmitting at least 80% of incident light. In an example, substantially reflective means reflecting at least 80% of incident light.

In an example, augmented reality eyewear can comprise: eyewear worn by a person; a display on the eyewear; a plurality of optical elements on the eyewear, wherein the plurality of optical elements collectively comprise between 5% and 25% of a Fresnel Reflector, and wherein each optical element in the plurality of optical elements has a first configuration which is substantially transparent and a second configuration which is substantially reflective; and a plurality of electroconductive pathways, wherein each optical element in the plurality of optical elements can be individually and selectively changed from the first configuration to the second configuration by exposure to electrical current and/or an electromagnetic field via one or more electroconductive pathways in the plurality of electroconductive pathways. In an example, substantially transparent means transmitting at least 90% of incident light. In an example, substantially reflective means reflecting at least 90% of incident light.

In an example, augmented reality eyewear can comprise: eyewear worn by a person; a display on the eyewear; a plurality of optical elements on the eyewear, wherein the plurality of optical elements collectively comprise a section of the right or left half of a Fresnel Reflector, and wherein each optical element in the plurality of optical elements has a first configuration which is substantially transparent and a second configuration which is substantially reflective; and a plurality of electroconductive pathways, wherein each optical element in the plurality of optical elements can be individually and selectively changed from the first configuration to the second configuration by exposure to electrical current and/or an electromagnetic field via one or more electroconductive pathways in the plurality of electroconductive pathways. In an example, substantially transparent means transmitting at least 80% of incident light. In an example, substantially reflective means reflecting at least 80% of incident light.

In an example, augmented reality eyewear can comprise: eyewear which is configured to be worn by a person; a light-emitting display on the right sidepiece (e.g. the right side "temple") of the eyewear; an array of adjustably-reflective optical elements which is held in front of the person's right eye by the eyewear, wherein optical elements in the array of adjustably-reflective optical elements collectively comprise a section of the left side of a Fresnel Reflector, wherein each optical element in the array of adjustably-reflective optical elements has a first configuration which reflects a first percentage of light hitting it from the display, wherein each optical element in the array of adjustably-reflective optical elements has a second configuration which reflects a second percentage of light hitting it from the display, and wherein the second percentage is greater than the first percentage; and an array of transparent or translucent electroconductive pathways, wherein optical elements in the array of adjustably-reflective optical elements can be selectively and individually changed from their first configurations to their second configurations by exposure to electrical current and/or an electromagnetic field via one or more electroconductive pathways in the array of transparent or translucent electroconductive pathways.

In an example, augmented reality eyewear can comprise: eyewear which is configured to be worn by a person; a right-side light-emitting display on the right sidepiece (e.g. the right side "temple") of the eyewear; a right-side array of adjustably-reflective optical elements which is held in front of the person's right eye by the eyewear, wherein optical elements in the right-side array of adjustably-reflective optical elements collectively comprise a section of the left side of a Fresnel Reflector, wherein each optical element in the right-side array of adjustably-reflective optical elements has a first configuration which reflects a first percentage of light hitting it from the right-side display, wherein each optical element in the right-side array of adjustably-reflective optical elements has a second configuration which reflects a second percentage of light hitting it from the right-side display, and wherein the second percentage is greater than the first percentage; a right-side array of transparent or translucent electroconductive pathways, wherein optical elements in the right-side array of adjustably-reflective optical elements can be selectively and individually changed from their first configurations to their second configurations by exposure to electrical current and/or an electromagnetic field via one or more electroconductive pathways in the right-side array of transparent or translucent electroconductive pathways; a left-side light-emitting display on the left sidepiece (e.g. the left side "temple") of the eyewear; a left-side array of adjustably-reflective optical elements which is held in front of the person's left eye by the eyewear, wherein optical elements in the left-side array of adjustably-reflective optical elements collectively comprise a section of the right side of a Fresnel Reflector, wherein each optical element in the left-side array of adjustably-reflective optical elements has a first configuration which reflects a first percentage of light hitting it from the left-side display, wherein each optical element in the left-side array of adjustably-reflective optical elements has a second configuration which reflects a second percentage of light hitting it from the left-side display, and wherein the second percentage is greater than the first percentage; a left-side array of transparent or translucent electroconductive pathways, wherein optical elements in the left-side array of adjustably-reflective optical elements can be selectively and individually changed from their first configurations to their second configurations by exposure to electrical current and/or an electromagnetic field via one or more electroconductive pathways in the left-side array of transparent or translucent electroconductive pathways.

In an example, augmented reality eyewear can comprise: eyewear which is configured to be worn by a person; a light-emitting display which is held in place by the eyewear; an array of individually-adjustable transmissive-reflective optical elements which is held in place by the eyewear; wherein optical elements in the array each have a first configuration which transmits a first level of light from the environment through the eyewear to the person's eye and reflects a second level of light from the display toward the person's eye; wherein optical elements in the array each have a second configuration which transmits a third level of light from the environment through the eyewear to the person's eye and reflects a fourth level of light from the display toward the person's eye; wherein the third level is less than the first level; wherein the fourth level is greater than the second level; and wherein optical elements in the array can be individually and selectively changed from their first configurations to their second configurations, or vice versa; and an array of transparent or translucent electroconductive pathways, wherein the array of electroconductive pathways is in electrical and/or electromagnetic communication with the array of optical elements, wherein optical elements in the array of optical elements are changed from the first configuration to the second configuration, or vice versa, by electrical and/or electromagnetic energy from electroconductive pathways in the array of electroconductive pathways.

In an example, augmented reality eyewear can comprise: eyewear which is configured to be worn by a person; one or more light-emitting displays which are held in place by the eyewear, wherein the displays projects one or more virtual objects in the person's field of view; one or more arrays of adjustably-reflective optical elements which is held in place by the eyewear, wherein each optical element in an array has a first configuration which reflects a first percentage of light hitting it, wherein each optical element in an array has a second configuration which reflects a second percentage of light hitting it, and wherein the second percentage is greater than the first percentage; and one or more arrays of transparent or translucent electroconductive pathways, wherein optical elements in an array of adjustably-reflective optical elements can be selectively and individually changed from their first configurations to their second configurations, or vice versa, by exposure to electrical current and/or an electromagnetic field via one or more electroconductive pathways in an array of transparent or translucent electroconductive pathways.

In an example, augmented reality eyewear can comprise: eyewear which is configured to be worn by a person; one or more light-emitting displays which are held in place by the eyewear, wherein the displays projects one or more virtual objects in the person's field of view; one or more arrays of adjustably-reflective optical elements which is held in place by the eyewear, wherein optical elements in an array of adjustably-reflective optical elements collectively comprise a section of a Fresnel Reflector, wherein each optical element in an array has a first configuration which reflects a first percentage of light hitting it, wherein each optical element in an array has a second configuration which reflects a second percentage of light hitting it, and wherein the second percentage is greater than the first percentage, wherein optical elements in the array of adjustably-reflective optical element further comprise a layer of reflective particles suspended in a fluid or gas; and one or more arrays of transparent or translucent electroconductive pathways, wherein optical elements in an array of adjustably-reflective optical elements can be selectively and individually changed from their first configurations to their second configurations, or vice versa, by exposure to electrical current and/or an electromagnetic field via one or more electroconductive pathways in an array of transparent or translucent electroconductive pathways, and wherein the orientations of the reflective particles are changed by exposure to electrical current and/or an electromagnetic field via one or more electroconductive pathways in an array of transparent or translucent electroconductive pathways.

In an example, augmented reality eyewear can comprise: eyewear which is configured to be worn by a person; one or more light-emitting displays which are held in place by the eyewear, wherein the displays projects one or more virtual objects in the person's field of view; one or more arrays of adjustably-reflective optical elements which is held in place by the eyewear, wherein optical elements in an array of adjustably-reflective optical elements collectively comprise a section of a Fresnel Reflector, wherein each optical element in an array has a first configuration which reflects a first percentage of light hitting it, wherein each optical element in an array has a second configuration which reflects a second percentage of light hitting it, and wherein the second percentage is greater than the first percentage; and one or more arrays of transparent or translucent electroconductive pathways, wherein optical elements in an array of adjustably-reflective optical elements can be selectively and individually changed from their first configurations to their second configurations, or vice versa, by exposure to electrical current and/or an electromagnetic field via one or more electroconductive pathways in an array of transparent or translucent electroconductive pathways.

In an example, augmented reality eyewear can comprise: eyewear which is configured to be worn by a person; one or more light-emitting displays which are held in place by the eyewear; one or more arrays of adjustably-reflective optical elements which is held in place by the eyewear, wherein each optical element in an array has a first configuration which reflects a first percentage of light hitting it from the one or more displays, wherein each optical element in an array has a second configuration which reflects a second percentage of light hitting it from the one or more displays, and wherein the second percentage is greater than the first percentage; and one or more arrays of transparent or translucent electroconductive pathways, wherein optical elements in an array of adjustably-reflective optical elements can be selectively and individually changed from their first configurations to their second configurations, or vice versa, by exposure to electrical current and/or an electromagnetic field via one or more electroconductive pathways in an array of transparent or translucent electroconductive pathways.

In an example, augmented reality eyewear can comprise: eyewear worn by a person; a light-emitting display on a sidepiece (e.g. "temple") of the eyewear; an array of individually-adjustable transmissive-reflective optical elements on the eyewear, wherein the array of individually-adjustable transmissive-reflective optical elements collectively comprise a convex section (e.g. circular, elliptical, oval, or egg-shaped section) of a Fresnel selected from (e.g. cut out from) the interior of a 15-45 degree pie-shaped section of the Fresnel Reflector, wherein each optical element in the array has a first configuration which primarily transmits light from the environment to the person's eye and primarily transmits light from the display to the environment, wherein each optical element in the array has a second configuration which primarily reflects light from the environment and primarily reflects light from the display toward the person's eye, and wherein each optical element in the array can each be individually and selectively changed from the first configuration to the second configuration, or vice versa; and an array of transparent (or translucent) electroconductive pathways on the eyewear, wherein each optical element in the array of optical elements can be individually and selectively changed from the first configuration to the second configuration, or vice versa, by exposure to electrical current and/or an electromagnetic field via one or more electroconductive pathways in the array of electroconductive pathways.

In an example, augmented reality eyewear can comprise: eyewear which is configured to be worn by a person; a light-emitting display which is configured to be held to the right or left of one of the person's eyes by the eyewear; an array of individually-adjustable transmissive-reflective optical elements which is configured to be held in front of the person's eye by the eyewear; wherein optical elements in the array each have a first configuration which transmits light from the environment through the eyewear to the person's eye and does not reflects light from the display toward the person's eye; wherein optical elements in the array each have a second configuration which does not transmits light from the environment through the eyewear to the person's eye and does reflect light from the display toward the person's eye; and wherein optical elements in the array can be individually and selectively changed from their first configurations to their second configurations, or vice versa; and an array of transparent or translucent electroconductive pathways which is configured to be held in front of the person's eye by the eyewear; wherein the array of electroconductive pathways is in electrical and/or electromagnetic communication with the array of optical elements, wherein optical elements in the array of optical elements are changed from the first configuration to the second configuration, or vice versa, by electrical and/or electromagnetic energy from electroconductive pathways in the array of electroconductive pathways.

In an example, augmented reality eyewear can comprise: eyewear worn by a person; a light-emitting display on a sidepiece (e.g. "temple") of the eyewear; an array of individually-adjustable transmissive-reflective optical elements on the eyewear, wherein the array of individually-adjustable transmissive-reflective optical elements collectively comprise a convex section (e.g. circular, elliptical, oval, or egg-shaped section) of a Fresnel selected from (e.g. cut out from) the interior of a 5-10 degree pie-shaped section of the Fresnel Reflector, wherein each optical element in the array has a first configuration which primarily transmits light from the environment to the person's eye and primarily transmits light from the display to the environment, wherein each optical element in the array has a second configuration which primarily reflects light from the environment and primarily reflects light from the display toward the person's eye, and wherein each optical element in the array can each be individually and selectively changed from the first configuration to the second configuration, or vice versa; and an array of transparent (or translucent) electroconductive pathways on the eyewear, wherein each optical element in the array of optical elements can be individually and selectively changed from the first configuration to the second configuration, or vice versa, by exposure to electrical current and/or an electromagnetic field via one or more electroconductive pathways in the array of electroconductive pathways.

In an example, augmented reality eyewear can comprise: eyewear which is configured to be worn by a person; one or more light-emitting displays which are held in place by the eyewear, wherein the displays projects one or more virtual objects in the person's field of view; one or more arrays of adjustably-reflective optical elements which is held in place by the eyewear, wherein optical elements in an array of adjustably-reflective optical elements collectively comprise a right-side or left-side section of a Fresnel Reflector, wherein each optical element in an array has a first configuration which reflects a first percentage of light hitting it, wherein each optical element in an array has a second configuration which reflects a second percentage of light hitting it, and wherein the second percentage is greater than the first percentage; and one or more arrays of transparent or translucent electroconductive pathways, wherein optical elements in an array of adjustably-reflective optical elements can be selectively and individually changed from their first configurations to their second configurations, or vice versa, by exposure to electrical current and/or an electromagnetic field via one or more electroconductive pathways in an array of transparent or translucent electroconductive pathways.

In an example, augmented reality eyewear can comprise: eyewear worn by a person; a display on the eyewear; a plurality of optical elements on the eyewear, wherein the plurality of optical elements collectively comprise a section of the right or left half of a Fresnel Reflector, and wherein each optical element in the plurality of optical elements has a first configuration which is substantially transparent and a second configuration which is substantially reflective; and a plurality of electroconductive pathways, wherein each optical element in the plurality of optical elements can be individually and selectively changed from the first configuration to the second configuration by exposure to electrical current and/or an electromagnetic field via one or more electroconductive pathways in the plurality of electroconductive pathways. In an example, substantially transparent means transmitting at least 90% of incident light. In an example, substantially reflective means reflecting at least 90% of incident light.

In an example, optical components for augmented reality eyewear can comprise: a light-emitting display; an array of individually-adjustable transmissive-reflective optical elements, wherein the array of individually-adjustable transmissive-reflective optical elements collectively comprise a section of a Fresnel Reflector, wherein each optical element in the array has a first configuration which primarily transmits light from the environment to a person's eye and primarily transmits light from the display to the environment, wherein each optical element in the array has a second configuration which primarily reflects light from the environment and primarily reflects light from the display toward the person's eye, and wherein each optical element in the array can each be individually and selectively changed from the first configuration to the second configuration, or vice versa; and an array of transparent or translucent electroconductive pathways, wherein each optical element in the array of optical elements can be individually and selectively changed from the first configuration to the second configuration, or vice versa, by exposure to electrical current and/or an electromagnetic field via one or more electroconductive pathways in the array of electroconductive pathways.

In an example, the section of a Fresnel Reflector can be a section of a right side or a left side of the Fresnel Reflector. In an example, the size of the section of a Fresnel Reflector can be less than 25% of the overall size of the Fresnel Reflector. In an example, display-facing angles between best-fitting planes of optical elements and a best-fitting plane of the array of optical elements, respectively, can be a linear function of distances from the optical elements to the display. In an example, display-facing angles between best-fitting planes of optical elements and a best-fitting plane of the array of optical elements, respectively, can be a negative linear function of distances from the optical elements to the display. In an example, display-facing angles between best-fitting planes of optical elements and a best-fitting plane of the array of optical elements, respectively, can be a quadratic function of distances from the optical elements to the display.

In an example, an optical element in the array of optical elements can be changed from the first configuration to the second configuration, or vice versa, by electrical current from one or more electroconductive pathways in the array of electroconductive pathways. In an example, an optical element in the array of optical elements can be changed from the first configuration to the second configuration, or vice versa, by exposure to an electromagnetic field created by one or more electroconductive pathways in the array of electroconductive pathways.

In an example, optical components for augmented reality eyewear can comprise: a light-emitting display; an array of individually-adjustable transmissive-reflective optical elements, wherein the array of individually-adjustable transmissive-reflective optical elements collectively comprise a section of a Fresnel Reflector, wherein each optical element in the array has a first configuration which transmits a first level of light from the environment to the person's eye and reflects a second level of light from the display toward the person's eye, wherein each optical element in the array has a second configuration which transmits a third level of light from the environment to a person's eye and reflects a fourth level of light from the display toward the person's eye, wherein the third level is less than the first level, wherein the fourth level is greater than the second level, and wherein each optical element in the array can each be individually and selectively changed from the first configuration to the second configuration, or vice versa; and an array of transparent or translucent electroconductive pathways, wherein each optical element in the array of optical elements can be individually and selectively changed from the first configuration to the second configuration, or vice versa, by exposure to electrical current and/or an electromagnetic field via one or more electroconductive pathways in the array of electroconductive pathways.

In an example, the section of a Fresnel Reflector can be a section of a right side or a left side of the Fresnel Reflector. In an example, the size of the section of a Fresnel Reflector can be less than 25% of the overall size of the Fresnel Reflector. In an example, display-facing angles between best-fitting planes of optical elements and a best-fitting plane of the array of optical elements, respectively, can be a linear function of distances from the optical elements to the display. In an example, display-facing angles between best-fitting planes of optical elements and a best-fitting plane of the array of optical elements, respectively, can be a negative linear function of distances from the optical elements to the display. In an example, display-facing angles between best-fitting planes of optical elements and a best-fitting plane of the array of optical elements, respectively, can be a quadratic function of distances from the optical elements to the display.

In an example, an optical element in the array of optical elements can be changed from the first configuration to the second configuration, or vice versa, by electrical current from one or more electroconductive pathways in the array of electroconductive pathways. In an example, an optical element in the array of optical elements can be changed from the first configuration to the second configuration, or vice versa, by exposure to an electromagnetic field created by one or more electroconductive pathways in the array of electroconductive pathways.

In an example, optical components for augmented reality eyewear can comprise: a light-emitting display; an array of individually-adjustable transmissive-reflective optical elements, wherein an optical array plane is a plane which best fits the array of individually-adjustable transmissive-reflective optical elements, wherein the array of individually-adjustable transmissive-reflective optical elements collectively comprise a section from a right side or a left side of a Fresnel Reflector, wherein the array of individually-adjustable transmissive-reflective optical elements includes a first optical element and a second optical element, wherein the first optical element and the second optical element each have a first configuration which primarily transmits light from the environment to the person's eye and primarily transmits light from the display to the environment, wherein the first optical element and the second optical element each have a second configuration which primarily reflects light from the environment and primarily reflects light from the display toward a person's eye, wherein the first optical element and the second optical element can each be individually and selectively changed from the first configuration to the second configuration, or vice versa, wherein there is a first distance from the first optical element to the display, wherein there is a second distance from the second optical element to the display, wherein there is a first display-facing angle between the first optical element and the optical array plane, wherein there is a second display-facing angle between the second optical element and the optical array plane, wherein the first distance is greater than the second distance, and wherein the first display-facing angle is smaller than the second display-facing angle; and an array of transparent or translucent electroconductive pathways, including first electroconductive pathway and second electroconductive pathway, wherein the first optical element can be selectively and individually changed from the first configuration to the second configuration, or vice versa, by exposure to electrical current and/or an electromagnetic field from the first electroconductive pathway, and wherein the second optical element can be selectively and individually changed from the first configuration to the second configuration, or vice versa, by exposure to electrical current and/or an electromagnetic field from the second electroconductive pathway.

In an example, display-facing angles between best-fitting planes of optical elements and the optical array plane, respectively, can be a linear function of distances from the optical elements to the display. In an example, display-facing angles between best-fitting planes of optical elements and the optical array plane, respectively, can be a negative linear function of distances from the optical elements to the display. In an example, display-facing angles between best-fitting planes of optical elements and the optical array plane, respectively, can be a quadratic function of distances from the optical elements to the display.

Figure 3:
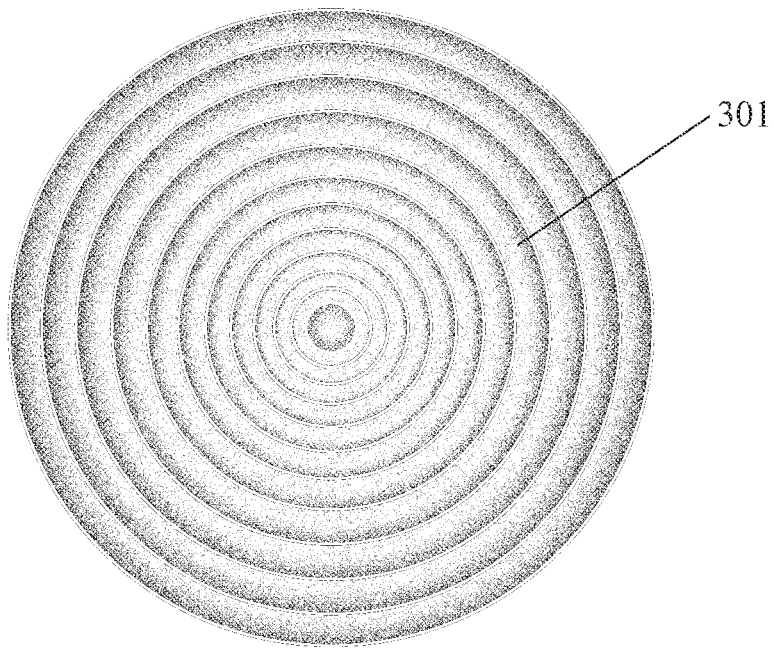
FIG. 3 shows a front view of a Fresnel Reflector.

FIG. 3 shows a front view of an example of a Fresnel Reflector 301. In this example, the Fresnel Reflector comprises an array of nested (e.g. concentric) annular reflective surfaces (e.g. ridges, saw teeth, rings, prisms), wherein these annular reflective surfaces face toward the center of the Fresnel Reflector.

In an example, a Fresnel Reflector can receive substantially-parallel light rays (e.g. from a distant light source) in front of the Fresnel Reflector and reflect those light rays so that they converge onto a point directly in front of the center of the Fresnel Reflector. A Fresnel Reflector design can be used in this manner to create an electrical generator which is powered by solar energy. In an example, a Fresnel Reflector can perform plane-to-point light wave reflection. In an example, a Fresnel Reflector can function in the opposite direction, receiving light rays from a point directly in front of the of the Fresnel Reflector and reflecting those light rays so that that they exit the front of the Fresnel along vectors which are substantially-perpendicular to the Fresnel Reflector and substantially-parallel to each other. A Fresnel Reflector design is sometimes in this way to project parallel light rays from a spot light. In an example, a Fresnel Reflector can perform point-to-plane light wave reflection.

In an example, a central optical axis of a Fresnel Reflector can be defined as a virtual line which passes through the center of the Fresnel Reflector and is perpendicular to the best-fitting virtual plane of the reflector. In an example, a Fresnel Reflector can: receive substantially-parallel light rays from a distance source and reflect these light rays so that they converge onto a common focal point on its central optical axis; or receive light rays from a focal point on its central optical axis and reflect those light rays outward along vectors which are substantially-parallel to each other and substantially-perpendicular to the virtual plan of the reflector. In an example, a nested array of annular reflective surfaces comprising a Fresnel Reflector can receive parallel light rays and reflect these light rays so that they converge on a point in front of the array. In an example, a nested array of annular reflective surfaces comprising a Fresnel Reflector can receive light rays from a point in front of the array and reflect these light rays so that they exit the array along substantially-parallel vectors.

In an example, the widths of the annular reflective surfaces can be a linear function of distance from the center of the Fresnel Reflector. In an example, the widths of the annular reflective surfaces can be a step-linear (or spline-linear) function of distance from the center of the Fresnel Reflector. In an example, the heights of the annular reflective surfaces can be a linear function of distance from the center of the Fresnel Reflector. In an example, the angles between the annular reflective surfaces and the virtual plane of the Fresnel Reflector can be a linear function of distance from the center of the Fresnel Reflector. In an example, the widths of the annular reflective surfaces can be a quadratic function of distance from the center of the Fresnel Reflector. In an example, the heights of the annular reflective surfaces can be a quadratic function of distance from the center of the Fresnel Reflector. In an example, the angles between the annular reflective surfaces and the virtual plane of the Fresnel Reflector can be a quadratic function of distance from the center of the Fresnel Reflector.

In an example, a Quasi Fresnel Reflector (QFR) can be created by selecting (e.g. extracting or "cutting out") a section from a side (e.g. the right or left side, as viewed from the front) of a Fresnel Reflector. In an example, the frontal area of this QFR section can be between 5% and 30% of the frontal area of the Fresnel Reflector as a whole. In various examples, a Quasi Fresnel Reflector (QFR) can have a circular, elliptical, oval, or egg-shaped shape. In various examples, a Quasi Fresnel Reflector (QFR) can be a circular, elliptical, oval, or egg-shaped shaped section of one side (e.g. right or left side, from a front perspective) of a Fresnel Reflector.

In an example, when applied to augmented reality eyewear, a Quasi Fresnel Reflector (QFR) in front of a person's eye can receive light rays from a light source (e.g. a display) which is located to the right or left of the front of the QFR and reflect those light rays out from the front of the QFR along vectors which are substantially-parallel to each other and substantially-perpendicular to the virtual plane of the QFR. In an example, a Quasi Fresnel Reflector (QFR) in front of a person's eye can receive light rays from a display to one side (e.g. the right or left side) of the person's eye and reflect those light rays out from the QFR so that they converge onto the pupil or the retina of the person's eye.

Figure 4:
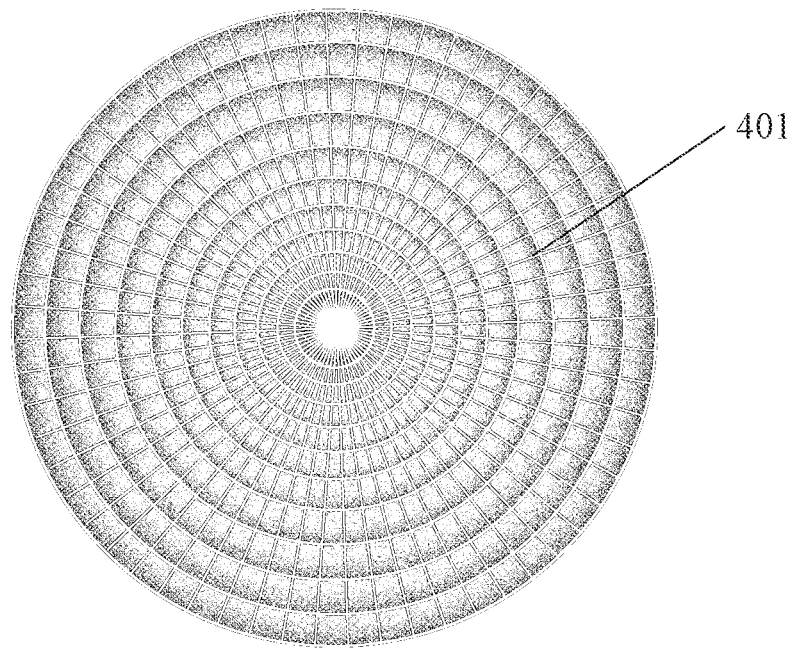
FIG. 4 shows a Fresnel Reflector having been radially-divided into an array of adjustably-reflective optical elements.

FIG. 4 shows a front view of an array of individually-adjustable optical elements 401 which has been created by dividing each of the nested annular reflective surfaces (e.g. ridges, saw teeth, rings, and/or prisms) of the Fresnel Reflector of FIG. 3 into a plurality of individually-adjustable reflective optical elements.

In an example, annular reflective surfaces (e.g. ridges, saw teeth, rings, and/or prisms) can be been divided into individually-adjustable reflective optical elements. In this example, the dividing lines are radial spokes from the center of the Fresnel Array, creating individually-adjustable reflective optical elements which have trapezoidal and/or keystone shapes. In various examples, annular reflective surfaces (e.g. ridges, saw teeth, rings, and/or prisms) of a Fresnel Reflector can be divided so as to create individually-adjustable reflective optical elements with shapes selected from the group consisting of: trapezoidal, keystone, hexagonal, circular, square, and rectangular. In an example, a QFR (e.g. section of the Fresnel Reflector) can be divided in a similar manner into an array of individually-adjustable optical elements.

In an example, the widths of the optical elements can be a linear function of distance from the center of the Fresnel Reflector. In an example, the widths of the optical elements can be a step-linear (or spline linear) function of distance from the center of the Fresnel Reflector. In an example, the heights of the optical elements can be a linear function of distance from the center of the Fresnel Reflector. In an example, the angles between the optical elements and the virtual plane of the Fresnel Reflector can be a linear function of distance from the center of the Fresnel Reflector. In an example, the widths of the optical elements can be a quadratic function of distance from the center of the Fresnel Reflector. In an example, the heights of the optical elements can be a quadratic function of distance from the center of the Fresnel Reflector. In an example, the angles between the optical elements and the virtual plane of the Fresnel Reflector can be a quadratic function of distance from the center of the Fresnel Reflector.

Figure 5:
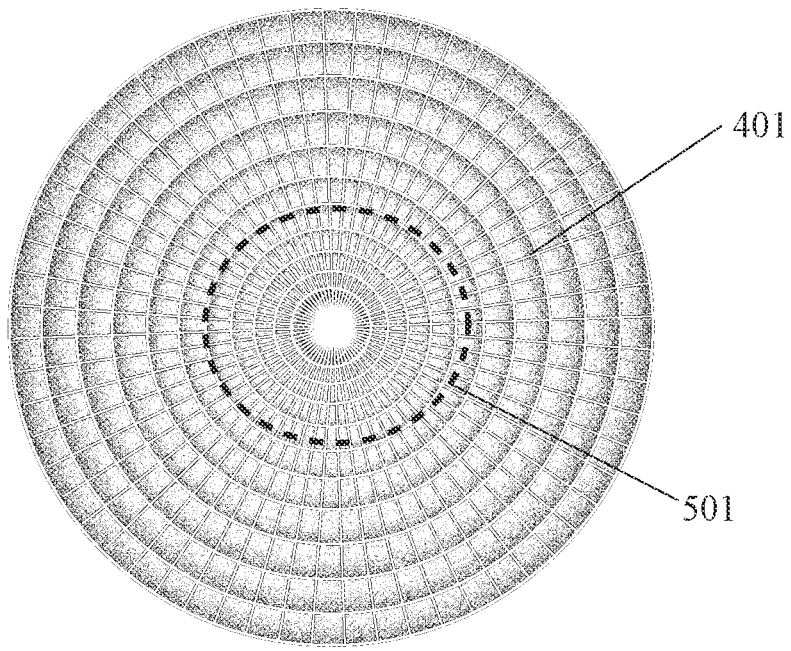
FIG. 5 shows an array of adjustable optical elements (in the dashed-line area) selected from the center of a Fresnel Reflector.

FIG. 5 shows a front view of a central section 501 (indicated by dashed lines) of the array of individually-adjustable optical elements 401 comprising a Fresnel Reflector shown in FIG. 4. In this example, the selected section is centered on the center of the Fresnel Reflector. Since this section is centered on the center of the overall Fresnel Reflector, it functions like a smaller Fresnel Reflector. It can (1) receive substantially-parallel light rays hitting its front surface and reflect those light rays outward so that they converge on a point in front of its center or (2) receives light from a point in front of its center and reflect those light rays outward from its front along substantially-parallel vectors.

Figure 6:
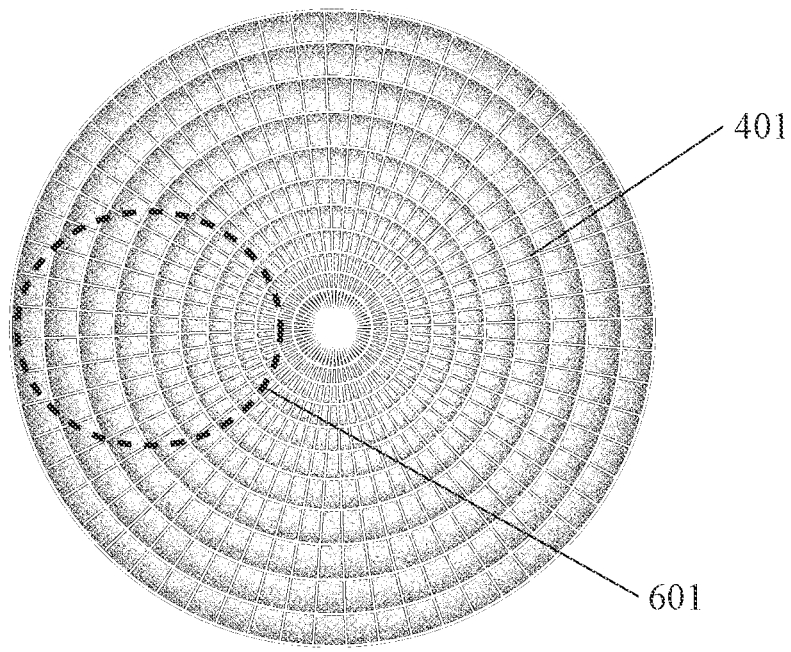
FIG. 6 shows an array of adjustable optical elements (in the dashed-line area) selected from the left side of a Fresnel Reflector.

FIG. 6 shows a front view of a side section 601 (indicated by dashed lines) of the array of individually-adjustable optical elements 401 comprising a Fresnel Reflector shown in FIG. 4. In this example, the selected section comes from one side (e.g. the left side) of the Fresnel Reflector. It is asymmetric and has optical properties which are different than the overall Fresnel Reflector. In an example, this section can be a Quasi Fresnel Reflector (QFR). This section or QFR can receive light rays hitting its front surface from a display located to one side (e.g. to the right in this case) and can reflect those light rays outward so that they converge on a point or plane in front of the section. When applied to augmented reality eyewear, a section or QFR like this can reflect light rays from a display which is located to side of a person's eye (e.g. along an eyewear sidepiece) and reflect those light rays so that they converge on the pupil or retina of the person's eye.

In an example, a section of a Fresnel Reflector (a QFR) can be created by selecting (e.g. extracting or "cutting out") a section from a side (e.g. the right or left side, as viewed from the front) of a Fresnel Reflector. In this example the section is selected (e.g. extracted or "cut out") from the left side of the Fresnel Reflector. In this example, the frontal area of the section (or QFR) is between 10% and 20% of the frontal area of the Fresnel Reflector as a whole. In various examples, the frontal area of this section can be between 5% and 30% of the frontal area of the Fresnel Reflector as a whole. In this example, the section (or QFR) has an elliptical shape. In various examples, a Quasi Fresnel Reflector (QFR) can have a circular, elliptical, oval, or egg-shaped shape.

In an example, when applied to augmented reality eyewear, a section of a Fresnel Reflector in front of a person's eye can receive light rays from a light source (e.g. a display) which is located to the right or left of the front of the QFR and reflect those light rays out from the front of the QFR along vectors which are substantially-parallel to each other and substantially-perpendicular to the virtual plane of the QFR. In an example, a Quasi Fresnel Reflector (QFR) in front of a person's eye can receive light rays from a display to one side (e.g. the right or left side) of the person's eye and reflect those light rays out from the QFR so that they converge onto the pupil or the retina of the person's eye.

In an example, a section (or QFR) can be a section of a Fresnel Reflector comprising a plurality of nested annular ridges (e.g. ridges, peaks, and/or saw-teeth), wherein each ridge has a first side which is always transparent and substantially parallel to a line of sight from the person's eye, and wherein each ridge has a second side which is adjustably-reflective and not parallel to a line of sight from the person's eye.

The degree of curvature (e.g. convexity) of ridges (e.g. ridges, peaks, and/or saw-teeth) in a right-or-left-side section of a Fresnel Reflector depends on the size of the section relative to the size of the overall Fresnel Reflector. For example, as the size of a right-or-left-side section of a Fresnel Reflector becomes smaller relative to the size of the Fresnel Reflector (or, from another perspective, the size of the Fresnel Reflector becomes larger relative to the size of a right-or-left-side the section), ridges in that section become less curved and more straight. In the extreme, as the size of the Fresnel Reflector approaches infinity, ridges in a fixed-size section converge to parallel straight ridges.

The curvature of ridges (e.g. ridges, peaks, and/or saw-teeth) in a right-or-left-side section of a Fresnel Reflector also depends on the location of the section relative to the overall Fresnel Reflector. For example, as fixed-size right-or-left-side section of a Fresnel Reflector moves away from the center of the Fresnel Reflector, then ridges in that section become less curved and straighter. The distances between ridges (e.g. ridges, peaks, and/or saw-teeth) in a right-or-left-side section of a Fresnel Reflector depend on the distances between ridges in the overall Fresnel Reflector from which the section is extracted. If the distances between ridges in the overall Fresnel Reflector are not constant with distance from the center of the Reflector, then the distances between ridges in a section can also depend on distance of the section from the center of the Fresnel Reflector.

Figure 7:
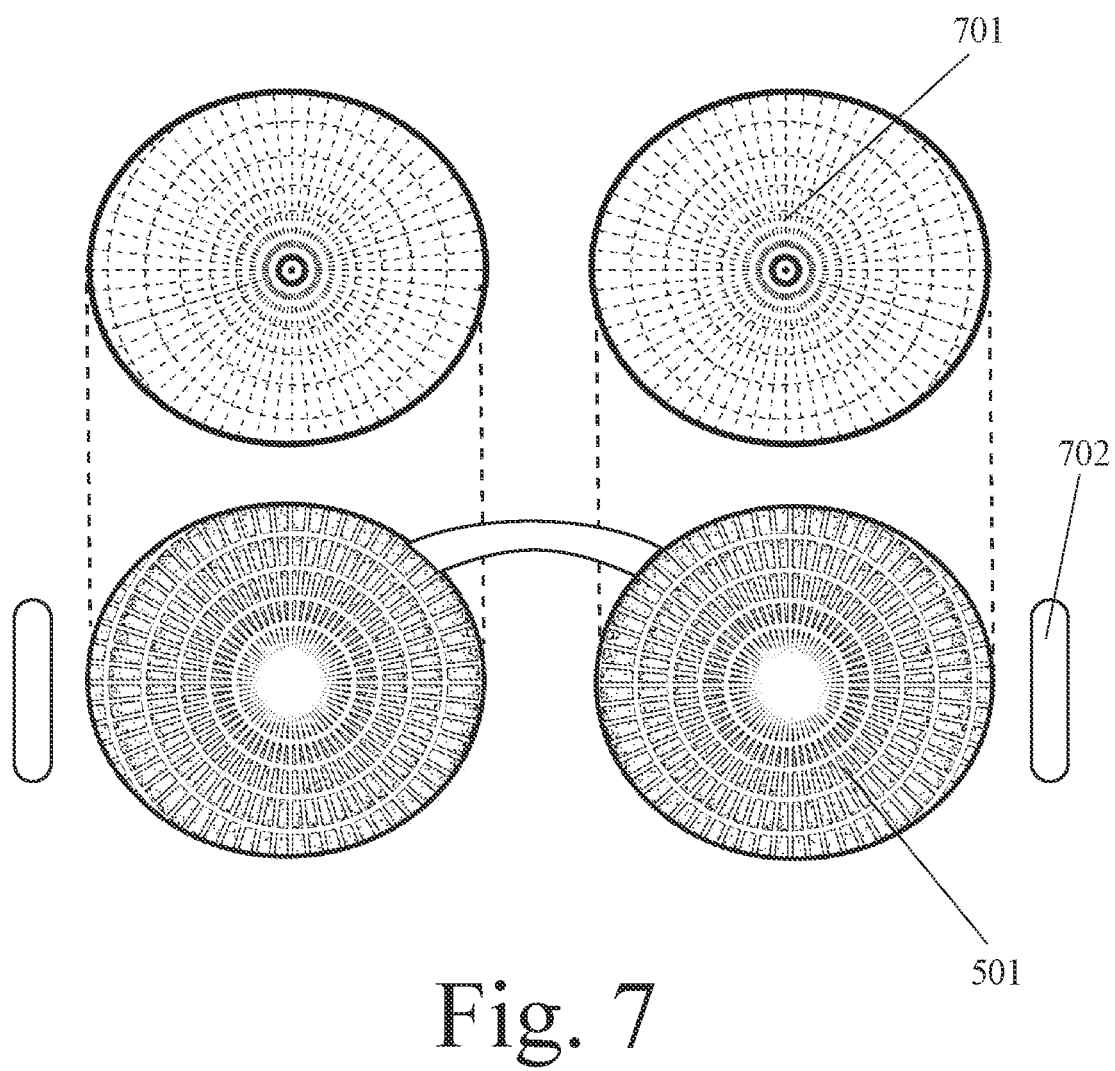
FIG. 7 shows augmented reality eyewear with arrays of adjustable optical elements (selected from the centers of Fresnel Reflectors) whose reflectivity levels are adjusted by electromagnetic communication with transparent (or translucent) electroconductive pathways.

FIG. 7 shows an example of how this invention can be embodied in augmented reality (AR) eyewear with center sections of Fresnel Reflectors such as the one shown in FIG. 5. The upper portion of FIG. 7 shows an exploded view of electroconductive pathways. This eyewear includes two sections of Fresnel Reflectors which are configured to be in front of a person's two eyes, respectively. The sections reflect virtual images from a right-side display and a left-side display toward the person's right eye and left eye, respectively. In this example, a section is a central section of a Fresnel Reflector such as the one shown in FIG. 5 wherein the section center is the same as the center of the overall Fresnel Reflector. In this example, an array of optical elements, a light-emitting display, and an array of electroconductive pathways are held near a person's eyes by the eyewear.

With respect to specific components, FIG. 7 shows an example of augmented reality eyewear comprising: a light-emitting display 702; an array of individually-adjustable transmissive-reflective optical elements 501, wherein the array of individually-adjustable transmissive-reflective optical elements collectively comprise a section of a Fresnel Reflector, wherein each optical element in the array has a first configuration which primarily transmits light from the environment to the person's eye and primarily transmits light from the display to the environment, wherein each optical element in the array has a second configuration which primarily reflects light from the environment and primarily reflects light from the display toward the person's eye, and wherein each optical element in the array can each be individually and selectively changed from the first configuration to the second configuration, or vice versa; and an array of transparent (or translucent) electroconductive pathways 701, wherein each optical element in the array of optical elements can be individually and selectively changed from the first configuration to the second configuration, or vice versa, by exposure to electrical current and/or an electromagnetic field via one or more electroconductive pathways in the array of electroconductive pathways.

In an example, this invention can be embodied in augmented reality eyewear comprising: eyewear worn by a person; a light-emitting display on the eyewear; an array of individually-adjustable transmissive-reflective optical elements on the eyewear, wherein the array of individually-adjustable transmissive-reflective optical elements collectively comprise a section of a Fresnel Reflector, wherein each optical element in the array has a first configuration which primarily transmits light from the environment to the person's eye and primarily transmits light from the display to the environment, wherein each optical element in the array has a second configuration which primarily reflects light from the environment and primarily reflects light from the display toward the person's eye, and wherein each optical element in the array can each be individually and selectively changed from the first configuration to the second configuration, or vice versa; and an array of transparent (or translucent) electroconductive pathways on the eyewear, wherein each optical element in the array of optical elements can be individually and selectively changed from the first configuration to the second configuration, or vice versa, by exposure to electrical current and/or an electromagnetic field via one or more electroconductive pathways in the array of electroconductive pathways.

FIG. 7 can also be described as showing an example of augmented reality eyewear comprising: a light-emitting display 702; an array of individually-adjustable transmissive-reflective optical elements 501, wherein the array of individually-adjustable transmissive-reflective optical elements collectively comprise a section of a Fresnel Reflector, wherein each optical element in the array has a first configuration which transmits a first level (or percentage) of light from the environment to the person's eye and reflects a second level (or percentage) of light from the display toward the person's eye, wherein each optical element in the array has a second configuration which transmits a third level (or percentage) of light from the environment to the person's eye and reflects a fourth level (or percentage) of light from the display toward the person's eye, wherein the third level (or percentage) is less than the first level (or percentage), wherein the fourth level (or percentage) is greater than the second level (or percentage), and wherein each optical element in the array can each be individually and selectively changed from the first configuration to the second configuration, or vice versa; and an array of transparent (or translucent) electroconductive pathways 701, wherein each optical element in the array of optical elements can be individually and selectively changed from the first configuration to the second configuration, or vice versa, by exposure to electrical current and/or an electromagnetic field via one or more electroconductive pathways in the array of electroconductive pathways.

In an example, this invention can be embodied in augmented reality eyewear comprising: eyewear worn by a person; a light-emitting display on the eyewear; an array of individually-adjustable transmissive-reflective optical elements on the eyewear, wherein the array of individually-adjustable transmissive-reflective optical elements collectively comprise a section of a Fresnel Reflector, wherein each optical element in the array has a first configuration which transmits a first level (or percentage) of light from the environment to the person's eye and reflects a second level (or percentage) of light from the display toward the person's eye, wherein each optical element in the array has a second configuration which transmits a third level (or percentage) of light from the environment to the person's eye and reflects a fourth level (or percentage) of light from the display toward the person's eye, wherein the third level (or percentage) is less than the first level (or percentage), wherein the fourth level (or percentage) is greater than the second level (or percentage), and wherein each optical element in the array can each be individually and selectively changed from the first configuration to the second configuration, or vice versa; and an array of transparent (or translucent) electroconductive pathways on the eyewear, wherein each optical element in the array of optical elements can be individually and selectively changed from the first configuration to the second configuration, or vice versa, by exposure to electrical current and/or an electromagnetic field via one or more electroconductive pathways in the array of electroconductive pathways.

In an example, the first level (or percentage) can be the same for all optical elements in the array, the second level (or percentage) can be the same for all optical elements in the array, the third level (or percentage) can be the same for all optical elements in the array, and the fourth level (or percentage) can be the same for all optical elements in the array. Alternatively, the first, second, third, and fourth level (or percentage)s for one optical element in the array can be different than the first, second, third, and fourth level (or percentage)s, respectively, in another optical element in an array of optical elements. In an example, the first level (or percentage) can be different for different optical elements in the array, the second level (or percentage) can be different for different optical elements in the array, the third level (or percentage) can be different for different optical elements in the array, and the fourth level (or percentage) can be different for different optical elements in the array. Example variations discussed elsewhere in this disclosure or priority-linked disclosures can also be applied to this example where relevant.

Figure 8:
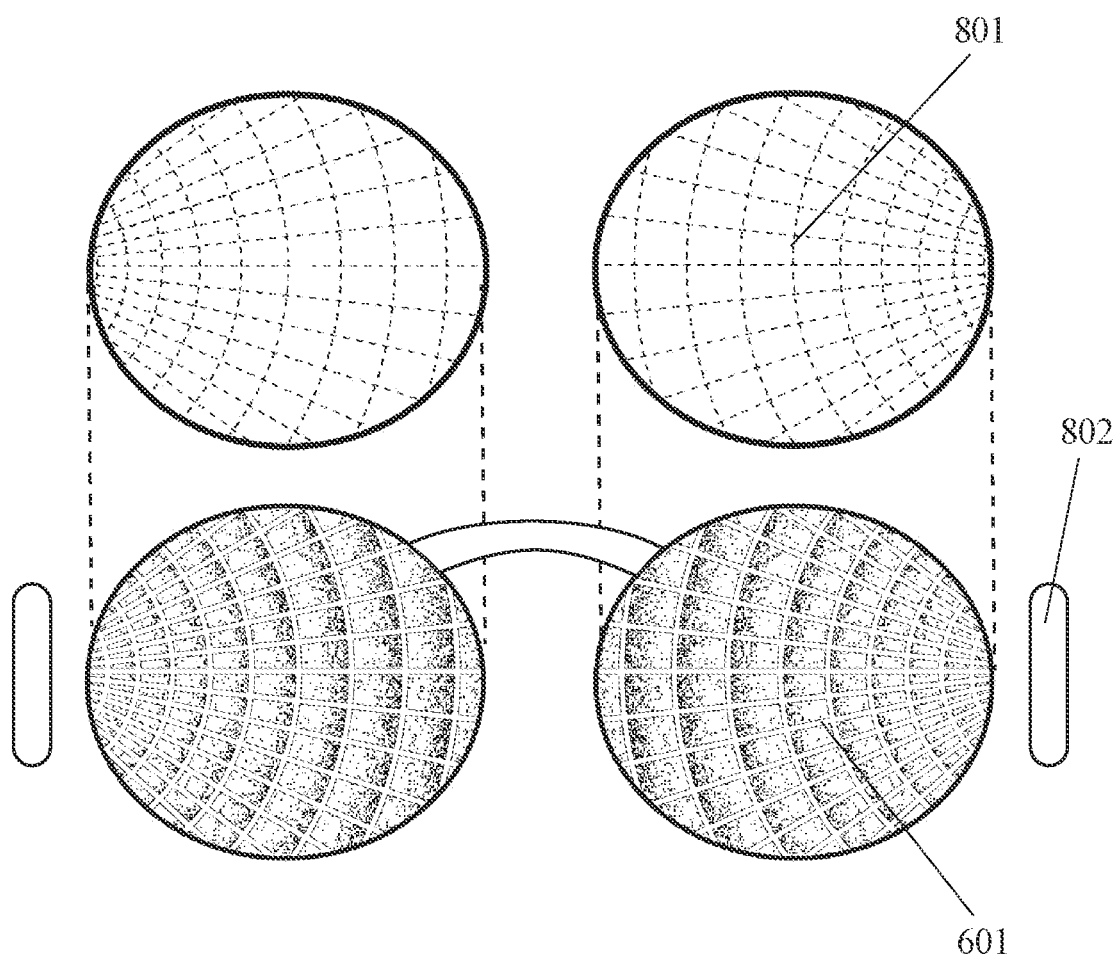
FIG. 8 shows augmented reality eyewear with arrays of adjustable optical elements (selected from the right and left sides of Fresnel Reflectors) whose reflectivity levels are adjusted by electromagnetic communication with transparent (or translucent) electroconductive pathways.

FIG. 8 shows an example of how this invention can be embodied in augmented reality (AR) eyewear with side sections of Fresnel Reflectors (or QFRs) such as the one shown in FIG. 6. The upper portion of FIG. 8 shows an exploded view of electroconductive pathways. This eyewear includes right and left sections of Fresnel Reflectors (e.g. right and left side QFRs) which are configured to be in front of a person's left and right eyes, respectively. The right and left side sections of Fresnel Reflectors (e.g. QFRs) reflect virtual images from left and right side displays, respectively, toward the person's right and left eyes, respectively. In this example, a section is a side section of a Fresnel Reflector (such as the one shown in FIG. 6) wherein the section is selected (e.g. extracted or "cut out") from the right half or the left half (from a frontal perspective) of a Fresnel Reflector. In this example, an array of optical elements, a light-emitting display, and an array of electroconductive pathways are held near a person's eyes by the eyewear.

With respect to specific components, FIG. 8 shows an example of augmented reality eyewear comprising: a light-emitting display 802; an array of individually-adjustable transmissive-reflective optical elements 601, wherein the array of individually-adjustable transmissive-reflective optical elements collectively comprise a section of a Fresnel Reflector, wherein each optical element in the array has a first configuration which primarily transmits light from the environment to the person's eye and primarily transmits light from the display to the environment, wherein each optical element in the array has a second configuration which primarily reflects light from the environment and primarily reflects light from the display toward the person's eye, and wherein each optical element in the array can each be individually and selectively changed from the first configuration to the second configuration, or vice versa; and an array of transparent (or translucent) electroconductive pathways 801, wherein each optical element in the array of optical elements can be individually and selectively changed from the first configuration to the second configuration, or vice versa, by exposure to electrical current and/or an electromagnetic field via one or more electroconductive pathways in the array of electroconductive pathways.

In an example, this invention can be embodied in augmented reality eyewear comprising: eyewear worn by a person; a light-emitting display on the eyewear; an array of individually-adjustable transmissive-reflective optical elements on the eyewear, wherein the array of individually-adjustable transmissive-reflective optical elements collectively comprise a section of a Fresnel Reflector, wherein each optical element in the array has a first configuration which primarily transmits light from the environment to the person's eye and primarily transmits light from the display to the environment, wherein each optical element in the array has a second configuration which primarily reflects light from the environment and primarily reflects light from the display toward the person's eye, and wherein each optical element in the array can each be individually and selectively changed from the first configuration to the second configuration, or vice versa; and an array of transparent (or translucent) electroconductive pathways on the eyewear, wherein each optical element in the array of optical elements can be individually and selectively changed from the first configuration to the second configuration, or vice versa, by exposure to electrical current and/or an electromagnetic field via one or more electroconductive pathways in the array of electroconductive pathways.

FIG. 8 can also be described as showing an example of augmented reality eyewear comprising: a light-emitting display 802; an array of individually-adjustable transmissive-reflective optical elements 601, wherein the array of individually-adjustable transmissive-reflective optical elements collectively comprise a section of a Fresnel Reflector, wherein each optical element in the array has a first configuration which transmits a first level (or percentage) of light from the environment to the person's eye and reflects a second level (or percentage) of light from the display toward the person's eye, wherein each optical element in the array has a second configuration which transmits a third level (or percentage) of light from the environment to the person's eye and reflects a fourth level (or percentage) of light from the display toward the person's eye, wherein the third level (or percentage) is less than the first level (or percentage), wherein the fourth level (or percentage) is greater than the second level (or percentage), and wherein each optical element in the array can each be individually and selectively changed from the first configuration to the second configuration, or vice versa; and an array of transparent (or translucent) electroconductive pathways 801, wherein each optical element in the array of optical elements can be individually and selectively changed from the first configuration to the second configuration, or vice versa, by exposure to electrical current and/or an electromagnetic field via one or more electroconductive pathways in the array of electroconductive pathways.

In an example, this invention can be embodied in augmented reality eyewear comprising: eyewear worn by a person; a light-emitting display on the eyewear; an array of individually-adjustable transmissive-reflective optical elements on the eyewear, wherein the array of individually-adjustable transmissive-reflective optical elements collectively comprise a section of a Fresnel Reflector, wherein each optical element in the array has a first configuration which transmits a first level (or percentage) of light from the environment to the person's eye and reflects a second level (or percentage) of light from the display toward the person's eye, wherein each optical element in the array has a second configuration which transmits a third level (or percentage) of light from the environment to the person's eye and reflects a fourth level (or percentage) of light from the display toward the person's eye, wherein the third level (or percentage) is less than the first level (or percentage), wherein the fourth level (or percentage) is greater than the second level (or percentage), and wherein each optical element in the array can each be individually and selectively changed from the first configuration to the second configuration, or vice versa; and an array of transparent (or translucent) electroconductive pathways on the eyewear, wherein each optical element in the array of optical elements can be individually and selectively changed from the first configuration to the second configuration, or vice versa, by exposure to electrical current and/or an electromagnetic field via one or more electroconductive pathways in the array of electroconductive pathways.

In an example, the first level (or percentage) can be the same for all optical elements in the array, the second level (or percentage) can be the same for all optical elements in the array, the third level (or percentage) can be the same for all optical elements in the array, and the fourth level (or percentage) can be the same for all optical elements in the array. Alternatively, the first, second, third, and fourth level (or percentage)s for one optical element in the array can be different than the first, second, third, and fourth level (or percentage)s, respectively, in another optical element in an array of optical elements. In an example, the first level (or percentage) can be different for different optical elements in the array, the second level (or percentage) can be different for different optical elements in the array, the third level (or percentage) can be different for different optical elements in the array, and the fourth level (or percentage) can be different for different optical elements in the array.

In this example, augmented reality (AR) eyewear is embodied in eyeglasses. In this example, augmented reality eyewear comprises a display for each eye and a section of a Fresnel Reflector for each eye. In an example, augmented reality eyewear can comprise a display for each eye, a section of a Fresnel Reflector for each eye, and a prescription lens for each eye. In an example, augmented reality eyewear can comprise: two prescription lenses in front of the person's eyes; and two Fresnel Reflector sections between the prescription lenses and the person's eyes.

In another example, augmented reality (AR) eyewear can be an accessory to eyeglasses and/or an eyewear attachment. In an example, augmented reality (AR) eyewear can be modular. In an example, augmented reality (AR) eyewear can comprise modular components which can be attached to conventional eyeglasses. In an example, augmented reality eyewear components can be attached to prescription eyeglasses. In an example, augmented reality eyewear can be attached to conventional eyeglasses with one or more clips, clasps, clamps, snaps, magnets, straps, elastic bands, or hook-and-eye material. In an example, augmented reality eyewear components can be attached to the frame of conventional eyeglasses with a clip, a clasp, a clamp, a snap, a magnet, a strap, an elastic band, or hook-and-eye material. In an example, augmented reality eyewear components can be attached to the lenses and sidepiece of a conventional pair of prescription eyeglasses.

In an example, an array of optical elements can be attached to the front portion (e.g. to a lens) of conventional eyeglasses in order to transform the conventional eyeglasses into augmented reality (AR) eyewear. In an example, an array of optical elements can be attached to conventional eyeglasses with a clip, a clasp, a clamp, a snap, a magnet, a strap, an elastic band, or hook-and-eye material. In an example, a display can be attached to a sidepiece (e.g. to a "temple") of conventional eyeglasses in order to transform the conventional eyeglasses into augmented reality (AR) eyewear. In an example, a display can be attached to conventional eyeglasses with a clip, a clasp, a clamp, a snap, a magnet, a strap, an elastic band, or hook-and-eye material.

In an example, an eyewear frame can have: a frontpiece which holds lenses in front of a person's eyes; and two sidepieces (also called "temples") which span between the front piece and a person's right and left ears, respectively. In an example, there can be a hinge between an eyewear frontpiece and a sidepiece. In an example, an eyewear frame can be a continuous member which spans from a person's right ear to their left ear, across their face and in front of their eyes. In an example, eyewear for augmented reality can comprise two lenses, one lens in front of each eye. In an example, a lens can be between ½" and 4" in front of a person's eye. In an example, a lens can be substantially flat with a proximal (facing toward the eye) surface and distal (facing away from the eye) surface which are substantially parallel to each other. In an example, a lens can be concave. In an example, a lens can have a concave proximal surface. In an example, a lens can be convex. In an example, a lens can have a convex proximal surface. In an example, a lens can be planoconcave or planoconvex.

In an example, at least one light emitter of a virtual object display can be located on a sidepiece ("temple") of an eyewear frame. In an example, at least one light emitter of a virtual object display can be located along the inside (body-facing) surface of a sidepiece ("temple") of an eyewear frame. In an example, at least one light emitter of a virtual object display can be located on a portion of a frontpiece of an eyewear frame on the perimeter of a lens. In an example, at least one light emitter of a virtual object display can be located on the portion of a frontpiece of an eyewear frame above the lens. In an example, at least one light emitter of a virtual object display can be located on the portion of a frontpiece of an eyewear frame to the right or left of the lens.

In an example, at least one light emitter of a virtual object display can be located on the portion of a frontpiece of an eyewear frame to the right of the lens and on the portion of the frontpiece to the left of the lens. In an example, at least one light emitter of a virtual object display can be located on the portion of a frontpiece of an eyewear frame below the lens. In an example, augmented reality eyewear can comprise a plurality of (e.g. three or more) light emitters on an eyewear frontpiece at different locations around the perimeter of a lens.

In an example, augmented reality eyewear can include an array of individually-adjustable transmissive-reflective optical elements which can be individually and selectively changed to: allow different levels (or percentages) of light from the environment reach a person's eye at different locations in the person's field of view at different times; and reflect different levels (or percentages) of light from a display toward the person's eye at different locations in the person's field of view at different times. In an example, transmission of environmental light can be substantially blocked in areas of a person's field of view where virtual objects are displayed to help the virtual objects to appear more solid, brighter, and/or with higher resolution.

In an example, augmented reality eyewear can include an array of reflection-adjustable optical elements which can be individually and selectively changed to: reflect different levels (or percentages) of light from the environment reach at different locations in the person's field of view at different times; and reflect different levels (or percentages) of light from a display toward the person's eye at different locations in the person's field of view at different times. In an example, augmented reality eyewear can include an array of opacity-adjustable optical elements which can be individually and selectively changed to: block different levels (or percentages) of light from the environment reach at different locations in the person's field of view at different times; and not reflect different levels (or percentages) of light from a display toward the person's eye at different locations in the person's field of view at different times.

In an example, augmented reality eyewear can include an array of transparency-adjustable optical elements which can be individually and selectively changed to: transmit different levels (or percentages) of light from the environment reach at different locations in the person's field of view at different times; and transmit different levels (or percentages) of light from a display to the environment at different locations in the person's field of view at different times. In an example, each individually-adjustable transmissive-reflective optical element in an array can be individually, selectively, and reversibly changed from a first configuration which primarily transmits light hitting it from the environment (to a person's eye) to a second configuration which primarily reflects light hitting it from the environment thereby blocking the transmission of environmental light to the person's eye.

In an example, each individually-adjustable transmissive-reflective optical element in an array can be individually, selectively, and reversibly changed from a first configuration which primarily transmits light hitting it from a display to a second configuration which primarily reflects light hitting it from the display toward a person's eye, thereby creating a virtual image in the person's field of view. In an example, each individually-adjustable transmissive-reflective optical element in an array can be individually, selectively, and reversibly changed from a first configuration which primarily transmits light hitting it from the environment to a person's eye to a second configuration with which primarily blocks light hitting it from the environment from reaching the person's eye and reflects light hitting it from a display toward the person's eye.

In an example, primarily transmissive can be defined as transmitting at least 50% of the light hitting the surface (e.g. incident light) of an optical element. In an example, primarily reflective can be defined as reflecting at least 50% of the light hitting the surface (e.g. incident light) of an optical element. In an example, each individually-adjustable transmissive-reflective optical element in an array can be individually, selectively, and reversibly changed from a first configuration which transmits at least 50% of the light hitting it from the environment to a person's eye to a second configuration which blocks at least 50% of the light hitting it from the environment from reaching the person's eye and reflects at least 50% of the light hitting it from a display toward the person's eye.

In an example, a selected irregularly-shaped subset of optical elements in an array of optical elements can be changed from their first configurations to their second configurations by electrical current or an electromagnetic field from an array of transparent (or at least translucent) electroconductive pathways. In an example, a subset of optical elements with an irregular shape can be selected from an array of optical elements to be changed from their first configurations to their second configurations by electrical current or an electromagnetic field from an array of transparent (or at least translucent) electroconductive pathways. In an example, the location and shape of this subset of optical elements can be selected to match the location and shape of a virtual object which is projected in a person's field of view in order to sharpen the image of the virtual object in a person's field of view.

For example, if a circular virtual object is projected in a person's field of view, then a circular subset of optical elements can be adjusted to block environmental light and reflect light from the display, wherein the perimeter of the circular subset of optical elements overlaps the circular perimeter of the virtual object. In another example, if a virtual tree is projected in a person's field of view, then a tree-shaped subset of optical elements can be selected and changed to block environmental light and reflect light from the display, wherein the perimeter of the selected subset overlaps the perimeter of the virtual tree. When a subset of optical elements which overlaps a virtual object are changed from their first (substantially transparent) configurations to their second (substantially reflective) configurations, then this more effectively reflects the image of the virtual person in the viewer's field of view and more effectively blocks light from the environment which otherwise would shine through the virtual object.

In an example, optical elements can be quadrilateral shaped. In an example, they can be selectively combined to create irregularly-shaped subsets of optical elements which are reversibly changed from their first to second configurations. In an example, optical elements can be hexagonal shaped. In an example, augmented reality eyewear can comprise a hexagonal array, grid, or mesh of reflection-adjustable optical elements. In an example, augmented reality eyewear can comprise a honeycomb array, grid, or mesh of reflection-adjustable optical elements. In an example, optical elements can have circular, elliptical, or oval shapes which can be selectively combined to create irregularly-shaped subsets of optical elements which are reversibly changed from their first to second configurations.

In an example, optical elements can be sufficiently small to constitute pixels in a person's field of vision, wherein irregularly-shaped selected subsets of optical elements corresponding to the shapes of virtual objects can be selected to be changed from their first to second configurations. In an example, reflection-adjustable optical elements can serve as pixels for projecting virtual objects in a person's field of view. In an example, optical elements within the perimeter of a projected virtual object can be set to their reflective configurations and optical elements outside the perimeter of the projected virtual object can be set to their transparent configurations.

In an example, optical elements within the perimeter of a projected virtual object can be set to their reflective configurations and optical elements outside the perimeter of the projected virtual object can be set to their transparent configurations by transmission of electrical current through transparent (or translucent) electroconductive pathways. In an example, optical elements within the perimeter of a projected virtual object can be set to their reflective configurations and optical elements outside the perimeter of the projected virtual object can be set to their transparent configurations by the creation of an electromagnetic field via transparent (or translucent) electroconductive pathways.

In an example, a plurality of non-contiguous subsets of optical elements, corresponding to a plurality of non-contiguous virtual objects projected in a person's field of view, can be selected and changed from their first to second configurations. In an example, a first virtual object in a person's field of view may have a generally square perimeter and a separate second virtual object in the person's field of view may have a generally circular perimeter. Accordingly, a square subset of optical elements corresponding to the perimeter of the first virtual object and a separate circular subset of optical elements corresponding to the perimeter of the second virtual object can be selected, wherein these two subsets have their configurations changed from their first to second configurations. This is not possible with prior art AR eyewear designs in which the opacity and/or reflectivity of the entire field of vision is adjusted.

In an example, an optical element can be changed from a substantially-transparent state to a substantially-reflective state by sending electrical current through the optical element for a first interval of time and then changed back from the substantially-reflective state to the substantially-reflective state by sending electrical current through the optical element for a second interval of time. In an example, an individually-adjustable transmissive-reflective optical element in its second configuration can transmit less than 50% of the light from the environment reaching that element (e.g. incident light from the environment) toward a person's eye and can reflect more than 50% of the light from a near-eye display reaching that element (e.g. incident from the display) toward the person's eye.

In an example, the percentage (or level) of light from a display which is reflected by an optical element toward a person's eye can change when the optical element is exposed to electrical voltage and/or an electromagnetic field. In an example, an optical element can be changed from a substantially-transparent state to a substantially-reflective state by exposing the optical element to an electromagnetic field with a first orientation and then changed back from a substantially-reflective state to a substantially-reflective state by exposing the optical element to an electromagnetic field with a second orientation. In an example, an individually-adjustable transmissive-reflective optical element can be an optical element whose opacity, light transmission, and/or light reflection changes when exposed to an electrical current.

In an example, an optical element can be changed from a substantially-transparent state to a substantially-reflective state by exposing the optical element to an electromagnetic field with a first power level and then changed back from a substantially-reflective state to a substantially-reflective state by exposing the optical element to an electromagnetic field with a second power level. In an example, an optical element can become less transparent and/or more opaque when it is exposed to an electromagnetic field.

In an example, an optical element can be changed from a substantially-transparent state to a substantially-reflective state by sending electrical current through the optical element in a first direction and then changed back from a substantially-reflective state to a substantially-reflective state by sending electrical current through the optical element in a second direction. In an example, an optical element can become more reflective when an electrical current is passed through it. In an example, an optical element can become more reflective when it is exposed to an electromagnetic field. In an example, the electromagnetic field can be generated by the array of transparent (or translucent) electroconductive pathways.

In an example, an optical element can toggle between being primarily transparent and primarily reflective when it is exposed to different kinds or durations of electrical current and/or electromagnetic fields. In an example, an optical element can be changed from a substantially-transparent state to a substantially-reflective state by sending electrical current through the optical element in a first direction and changed back from the substantially-reflective state to the substantially-reflective state by sending electrical current through the optical element in the opposite direction. In an example, an optical element can be changed from a substantially-transparent state to a substantially-reflective state by sending electrical current through the optical element with a first polarity and then changed back from the substantially-reflective state to the substantially-reflective state by sending electrical current through the optical element with the opposite polarity.

In an example, an optical element can be changed from a substantially-transparent state to a substantially-reflective state by sending electrical current through the optical element with a first voltage and changed from a substantially-reflective state to a substantially-reflective state by sending electrical current through the optical element with a second voltage. In an example, the second voltage can be greater than the first voltage. In an example, an individually-adjustable transmissive-reflective optical element can have a first configuration wherein it transmits more than 25% of the light from the environment reaching that element toward a person's eye and reflects less than 75% of the light from a near-eye display reaching that element toward the person's eye.

In an example, an individually-adjustable transmissive-reflective optical element can be an optical element whose (level or percentage of) opacity, light transmission, and/or light reflection changes when exposed to a localized electromagnetic field. In an example, this localized electromagnetic field can be created by transparent electroconductive pathways with which the optical element is in electromagnetic communication. In an example, an optical element can be changed from a substantially-transparent state to a substantially-reflective state by sending electrical current through a first location on the optical element and then changed back from the substantially-reflective state to the substantially-reflective state by sending electrical current through a second location on optical element.

In an example, an individually-adjustable transmissive-reflective optical element can comprise optical material whose opacity, light transmission, and/or light reflection is modulated by the application of electrical current and/or exposure to an electromagnetic field. In an example, an optical element can be changed from a substantially-transparent state to a substantially-reflective state, or vice versa, by sending electrical current through the optical element. In an example, an optical element can be changed from a substantially-transparent state to a substantially-reflective state by sending electrical current through the optical element with a first voltage and changed from a substantially-reflective state to a substantially-reflective state by sending electrical current through the optical element with a second voltage. In an example, the second voltage can be less than the first voltage.

In an example, an optical element can toggle between being primarily transparent and primarily reflective when an electrical current is passed through it. In an example, an individually-adjustable transmissive-reflective optical element can be an optical element whose level or percentage of opacity, light transmission, and/or light reflection changes when exposed to an electrical current. In an example, an optical element can become more opaque when an electrical current is passed through it. In an example, an optical element can be switched (e.g. toggled) between being primarily transparent and primarily opaque when it is exposed to an electromagnetic field.

In an example, augmented reality (AR) eyewear can include a section of a Fresnel Reflector comprising a plurality of adjustable reflective optical elements, wherein the section is between 5% and 10% of the (frontal) size of the Fresnel Reflector, and wherein each optical element has a first orientation which allows light transmission and a second orientation which blocks light transmission and reflects incident light. In an example, augmented reality (AR) eyewear can include a section of a Fresnel Reflector comprising a plurality of adjustable reflective optical elements, wherein the section is between 10% and 25% of the (frontal) size of the Fresnel Reflector, and wherein each optical element has a first orientation which allows light transmission and a second orientation which blocks light transmission and reflects incident light.

In an example, there can be a relationship between the shapes, sizes, orientations and/or quantities of optical elements in an array of optical elements a person's eye and the shapes, sizes, orientations, and/or quantities of display elements (e.g. pixels) in a display. In an example, pixels in a displayed image and optical elements in an array of optical elements can both have square shapes. In an example, the percentage (or level) of environmental light which is transmitted through an optical element to a person's eye changes when the optical element is exposed to electrical voltage and/or an electromagnetic field.

In an example, a plurality of reflective surfaces can transmit least 80% of light hitting them from the environment (e.g. incident light) from reaching the eye in their first configuration and reflect at least 80% of the light hitting them from the environment (e.g. incident light) in their second configuration. In an example, an array of optical elements collectively comprise a section of a Fresnel Reflector which reflects images from a display to the right (or left) of the array toward a person's eye with light rays which are parallel. In an example, the quantity of optical elements in an array of optical elements can be substantially the same as the quantity of display elements (e.g. pixels) in a display.

In an example, an array of optical elements collectively comprise a section of a Fresnel Reflector which reflects images from a display to the right (or left) of the array toward a person's eye with light rays which converge on the pupil of the eye. In an example, pixels in a displayed image and optical elements in an array of optical elements can both have hexagonal shapes. In an example, an array of individually-adjustable transmissive-reflective optical elements can comprise a plurality of circular rotatable reflective surfaces whose centers are connected to axles and which rotate around those axles.

In an example, an array of optical elements collectively comprise a section of a Fresnel Reflector which reflects images from a display to the right (or left) of the array toward a person's eye with light rays which converge on the retinal of the eye. In an example, the size of the array of optical elements can be between 100% and 300% greater than the size of the display. In an example, the size of the array of optical elements can be between 100% and 300% of the size of the display. In an example, the size of the array of optical elements can be greater than the size of the display. In an example, pixels in a displayed image and optical elements in an array of optical elements can both have circular shapes.

In an example, an array of optical elements can be a concentric ring array of optical elements and a display can comprise a concentric ring array of display elements. In an example, an array of individually-adjustable transmissive-reflective optical elements can comprise a plurality of microscale rotatable reflective surfaces which rotate around microscale axles when exposed to electrical current and/or an electromagnetic field. In an example, an array of optical elements can be a quadrilateral array (e.g. quadrilateral grid) of optical elements and a display can comprise a quadrilateral array of display elements. In an example, an array of optical elements can be a ring-and-spoke array of optical elements and a display can comprise a ring-and-spoke array of display elements. In an example, an individually-adjustable transmissive-reflective optical element can be an optical element whose percentage of light reflection changes when exposed to an electrical current and/or an electromagnetic field.

In an example, an array of individually-adjustable transmissive-reflective optical elements can further comprise a plurality of square reflective surfaces which are centrally-connected to axles and which rotate around those axles. In an example, augmented reality eyewear can comprise a plurality of optical elements which is configured to be positioned in front of a person's eye, wherein the optical elements reflect light, wherein the optical elements can be rotated around their central axes, wherein the optical elements transmit light from the environment to a person's eye in a first configuration and block and/or reflect light from the environment in a second configuration, wherein the optical elements are changed from their first configuration to their second configuration by being rotated around their central axes, and wherein the optical elements are rotated around their central axes by exposure to electrical current and/or an electromagnetic field.

In an example, augmented reality eyewear can comprise a plurality of reflective optical elements which can be rotated around their central axes. In example, optical elements are rotated around their central axes by exposure to electrical current and/or an electromagnetic field. In an example, when the optical elements are rotated to a first orientation, they substantially transmit light (e.g. transmit at least 80% of incident light) and when the optical elements are rotated to a second orientation, they substantially block and/or reflect light (e.g. block and/or reflect at least 80% of incident light). In an example, augmented reality eyewear can comprise a plurality of reflective optical elements which can be rotated around their central axes.

In example, optical elements can be rotated around their central axes by exposure to electrical current and/or an electromagnetic field. In an example, when the optical elements are rotated to a first orientation, they substantially transmit light (e.g. transmit at least 95% of incident light) and when the optical elements are rotated to a second orientation, they substantially block and/or reflect light (e.g. block and/or reflect at least 95% of incident light). In an example, an array of individually-adjustable transmissive-reflective optical elements can further comprise a plurality of hexagonal reflective surfaces which are centrally-connected to axles and which rotate around those axles.

In an example, an array of reflective optical elements can be arrayed in a honeycomb grid (e.g. grid, mesh, or lattice), wherein each optical element in the grid can be rotated around an axis between two of its six vertexes. In an example, an array of reflective optical elements can be arrayed in a honeycomb grid, wherein each optical element in the grid can be rotated around an axis between two of its six vertexes, wherein this rotation is caused by exposing the optical element to an electromagnetic field.

In an example, an array of reflective optical elements can be arrayed in a honeycomb grid, wherein each optical element in the grid can be rotated around an axis between two of its six vertexes, wherein this rotation is caused by exposing the optical element to a localized electromagnetic field created by one or more electroconductive pathways in an array of transparent (or translucent) electroconductive pathways. In an example, an array of reflective optical elements can be arrayed in a honeycomb grid, wherein each optical element in the grid can be rotated around an axis between two of its six vertexes, wherein this rotation is caused by exposing the optical element to a localized electromagnetic field created by electrical current running through electroconductive pathways in an array of transparent (or translucent) electroconductive pathways.

In an example, an array of reflective optical elements can be arrayed in a honeycomb grid, wherein each optical element in the grid can be rotated around an axis between two of its six vertexes, wherein this rotation is caused by the actuation of a MEMS unit. In an example, an array of reflective optical elements can be arrayed in a honeycomb grid, wherein each optical element in the grid can be rotated around an axis between two of its six vertexes, wherein this rotation is caused by the actuation of a microscale actuator.

In an example, an array of individually-adjustable transmissive-reflective optical elements can comprise a plurality of rotatable reflective surfaces whose centers are connected to axles and which rotate around those axles. In an example, an array of individually-adjustable transmissive-reflective optical elements can further comprise: an array of microscale axles; and an array of microscale reflective components which are connected to those axles, wherein exposure of the reflective components to electrical current and/or an electromagnetic field causes them to rotate around the axles, thereby changing the opacity and/or reflectivity of the optical elements.

In an example, an array of individually-adjustable transmissive-reflective optical elements can further comprise a plurality of rotatable reflective surfaces which rotate around axles. In an example, an array of individually-adjustable transmissive-reflective optical elements can further comprise a plurality of hexagonal rotatable reflective surfaces whose centers are connected to axles and which rotate around those axles. In an example, an array of individually-adjustable transmissive-reflective optical elements can further comprise a plurality of rotatable reflective surfaces which rotate around central axles. In an example, an array of individually-adjustable transmissive-reflective optical elements can further comprise a plurality of circular reflective surfaces which are centrally-connected to axles and which rotate around those axles.

In an example, a plurality of reflective surfaces can have a first configuration in which their longitudinal axes are substantially parallel to the line of sight from an eye and a second configuration in which their longitudinal axes are substantially perpendicular to the line of sight from the eye. In an example, an array of individually-adjustable transmissive-reflective optical elements can further comprise: an array of microscale axles; and an array of microscale reflective components which are connected to those axles, wherein exposure of the reflective components to electrical current and/or an electromagnetic field causes them to rotate around the axles from first configurations in which they are substantially aligned and the optical element is substantially transparent to second configurations in which they are substantially non-aligned and the optical element is substantially opaque and/or reflective.

In an example, optical elements in an array of optical elements can have substantially the same shapes as display elements (e.g. pixels) in a display. In an example, an array of individually-adjustable transmissive-reflective optical elements can further comprise a plurality of rotatable reflective surfaces which are centrally-connected to axles and which rotate around those axles. In an example, each individually-adjustable transmissive-reflective optical element in the array can be adjusted with respect to its level of light transmission vs. light reflection.

In an example, an array of optical elements can comprise a hub-and-spoke array. In an example, an array of optical elements can be an array of optical elements comprising a central hub and radial spokes, each of which has multiple optical elements arranged in a linear manner. In an example, spokes of optical elements can extend outward radially from the lateral center of the array. In an example, optical elements which are closer to the hub can be smaller and/or closer together than optical elements which are farther from the hub.

In an example, an array of optical elements can comprise a ring-and-ray array of optical elements. In an example, an array of optical elements can comprise multiple nested rings, each of which has multiple optical elements distributed around the ring. In an example, optical elements on nested rings can also be radially aligned with each other to form linear rays of optical elements in addition to rings of optical elements. In an example, optical elements which are closer to the center of an array can be smaller and/or closer together than optical elements which are farther from the center of the array.

In an example, an array of optical elements can comprise a polar coordinate array. In an example, an array of optical elements can comprise a starburst array of optical elements. In an example, an array of optical elements can comprise a nested ring array of optical elements. In an example, an array of optical elements can comprise a concentric ring array of optical elements. In an example, the density of optical elements closer to the center of an array can be greater than the density of optical elements farther from the center of the array.

In another example, an array of optical elements can be a honeycomb array of optical elements. In another example, an array of optical elements can be a honeycomb (hexagonal) array of reflective hexagonal-shaped elements. In an example, optical elements which are closer to the center of a honeycomb array can be smaller and/or closer together than optical elements which are farther from the center of the honeycomb array. In another example, an array of optical elements can be a row-and-column array of optical elements. In another example, an array of optical elements can be a quadrilateral grid of optical elements. In another example, an array of optical elements can be a checkerboard grid of optical elements. In an example, an array of optical elements can be a nest ring array.

In an example, primarily transmissive can be defined as transmitting at least 75% of light hitting the surface of an optical element (e.g. incident light). In an example, primarily reflective can be defined as reflecting at least 75% of light hitting the surface of an optical element. In an example, each individually-adjustable transmissive-reflective optical element in an array can be individually, selectively, and reversibly changed from a first configuration which transmits at least 75% of the light hitting it from the environment to a person's eye to a second configuration which primarily blocks at least 75% of the light hitting it from the environment from reaching the person's eye and reflects at least 75% of the light hitting it from a display toward the person's eye.

In an example, an optical element in an array of individually-adjustable transmissive-reflective optical elements can comprise two layers: a first layer which faces toward a person's eye and a second layer which faces away from the person's eye. In an example, the first layer remains transparent, but the second layer can be selectively and reversibly changed from a first configuration which is primarily transmissive (e.g. light transmitting) to a second configuration which is primarily opaque (e.g. light blocking) or reflective. In an example, the second layer can be changed from the first configuration to the second configuration by exposure to electrical current or a localized electromagnetic field.

In an example, an optical element in an array of individually-adjustable transmissive-reflective optical elements can comprise two layers: a first layer which faces toward a person's eye and a second layer which faces away from the person's eye. In an example, the second layer remains transparent, but the first layer can be selectively and reversibly changed from a first configuration which is primarily transmissive (e.g. light transmitting) to a second configuration which is primarily opaque (e.g. light blocking) or reflective. In an example, the first layer can be selectively changed from the first configuration to the second configuration by exposure to electrical current or an electromagnetic field.

In an example, an optical element in an array of individually-adjustable transmissive-reflective optical elements can comprise three layers: a first layer which faces toward a person's eye; a second layer which faces away from the person's eye; and third layer between the first and second layers. In an example, the first and third layers remain transparent, but the second layer can be selectively and reversibly changed from a first configuration which is primarily transmissive (e.g. light transmitting) to a second configuration which is primarily opaque (e.g. light blocking) or reflective. In an example, the second layer can be selectively changed from the first configuration to the second configuration by exposure to electrical current or an electromagnetic field.

In an example, an optical element in an array of individually-adjustable transmissive-reflective optical elements can comprise two layers: a first layer which faces toward a person's eye and a second layer which faces away from the person's eye. In an example, the first layer remains transparent, but the second layer can be selectively and reversibly changed from a first configuration which is primarily transmissive (e.g. light transmitting) to a second configuration which is primarily reflective (e.g. light reflecting). In an example, the second layer can be selectively changed from the first configuration to the second configuration by exposure to electrical current or an electromagnetic field.

In an example, an optical element in an array of individually-adjustable transmissive-reflective optical elements can comprise two layers: a first layer which faces toward a person's eye and a second layer which faces away from the person's eye. In an example, the second layer remains transparent, but the first layer can be selectively and reversibly changed from a first configuration which is primarily transmissive (e.g. light transmitting) to a second configuration which is primarily reflective (e.g. light reflecting). In an example, the first layer can be selectively changed from the first configuration to the second configuration by exposure to electrical current or an electromagnetic field.

In an example, an optical element in an array of individually-adjustable transmissive-reflective optical elements can comprise three layers: a first layer which faces toward a person's eye; a second layer which faces away from the person's eye; and third layer between the first and second layers. In an example, the first and third layers can remain transparent. In an example, the second layer can be selectively and reversibly changed from a first configuration which is primarily transmissive (e.g. light transmitting) to a second configuration which is primarily reflective (e.g. light reflecting). In an example, the second layer can be selectively changed from the first configuration to the second configuration by exposure to electrical current or an electromagnetic field.

In an example, an optical element in an array of individually-adjustable transmissive-reflective optical elements can comprise a variable-opacity layer sandwiched between two transparent layers, wherein the opacity of the variable-opacity layer is changed by transmission of electrical current through the variable-opacity layer. In an example, an optical element in an array of individually-adjustable transmissive-reflective optical elements can comprise a variable-reflective layer sandwiched between two transparent layers, wherein the light reflectivity of the variable-reflectivity layer is changed by transmission of electrical current through the variable-reflectivity layer.

In an example, an optical element in an array of individually-adjustable transmissive-reflective optical elements can comprise a variable-opacity layer sandwiched between two transparent layers, wherein the opacity of the variable-opacity layer is changed by the creation of a localized electromagnetic field. In an example, an optical element in an array of individually-adjustable transmissive-reflective optical elements can comprise a variable-reflective layer sandwiched between two transparent layers, wherein the light reflectivity of the variable-reflectivity layer is changed by creation of a localized electromagnetic field.

In an example, an optical element in an array of individually-adjustable transmissive-reflective optical elements can comprise a transparent layer with an electrochromic coating. When the electrochromic coating is exposed to electrical current and/or an electromagnetic field, it changes color. In an example, when the electrochromic coating is a first color, the optical element is primarily light transmissive, but when the electrochromic coating is a second color, the optical element is primarily light reflective. In an example, primarily light transmissive can mean transmitting at least 50% of light hitting the optical element and primarily light reflective means reflecting at least 50% of light hitting the optical element. Alternatively, primarily light transmissive can mean transmitting at least 90% of light hitting the optical element and primarily light reflective can mean reflecting at least 90% of light hitting the optical element.

In an example, an optical element in an array of individually-adjustable transmissive-reflective optical elements can comprise an array of reflective nanoparticles suspended in a fluid between two transparent layers. In an example, transmission of electrical current through the optical element changes the orientations of the reflective nanoparticles, thereby changing the opacity, the level of light transmission, and/or the level of light reflection by the optical element. In an example, exposure of the optical element to a localized electromagnetic field can change the orientations of the reflective nanoparticles, thereby changing the opacity, the level of light transmission, and/or the level of light reflection by the optical element.

In an example, an optical element in an array of individually-adjustable transmissive-reflective optical elements can comprise a first transparent layer and a second electrochromic layer. When the electrochromic layer is exposed to electrical current and/or an electromagnetic field, it changes color. In an example, when the electrochromic layer is a first color, the optical element is primarily light transmissive, but when the electrochromic layer is a second color, the optical element is primarily light reflective. In an example, primarily light transmissive can be transmitting at least 50% of light hitting the optical element and primarily light reflective can be reflecting at least 50% of light hitting the optical element. Alternatively, primarily light transmissive can be transmitting at least 90% of light hitting the optical element and primarily light reflective can be reflecting at least 90% of light hitting the optical element.

In an example, an optical element in an array of individually-adjustable transmissive-reflective optical elements can comprise an array of reflective nanoparticles which are suspended in a fluid or gas between two transparent layers. In an example, transmission of electrical current through the optical element aligns the orientations of the reflective nanoparticles, thereby changing the opacity, level of light transmission, and/or level of light reflection by the optical element. In an example, transmission of electrical current through the optical element rotates the reflective nanoparticles in the liquid or gas, thereby changing the opacity, level of light transmission, and/or level of light reflection by the optical element. In an example, exposure of the optical element to a localized electromagnetic field aligns the orientations of the reflective nanoparticles, thereby changing the opacity, level of light transmission, and/or level of light reflection by the optical element.

In an example, an optical element in an array of individually-adjustable transmissive-reflective optical elements can comprise an array of reflective nanoparticles which are suspended by electromagnetism between two transparent layers. In an example, transmission of electrical current through the optical element aligns the orientations of the reflective nanoparticles, thereby changing the opacity, level of light transmission, and/or level of light reflection by the optical element. In an example, transmission of electrical current through the optical element rotates the reflective nanoparticles in an electromagnetic field, thereby changing the opacity, level of light transmission, and/or level of light reflection by the optical element. In an example, exposure of the optical element to a localized electromagnetic field aligns the orientations of the reflective nanoparticles, thereby changing the opacity, level of light transmission, and/or level of light reflection by the optical element.

In an example, an optical element in an array of individually-adjustable transmissive-reflective optical elements can comprise an array of ellipsoidal reflective nanoparticles suspended in a fluid between two transparent layers. In an example, transmission of electrical current through the optical element aligns the orientations of the ellipsoidal reflective nanoparticles, thereby changing the opacity, level of light transmission, and/or level of light reflection by the optical element. In an example, exposure of the optical element to a localized electromagnetic field aligns the orientations of the ellipsoidal reflective nanoparticles, thereby changing the opacity, level of light transmission, and/or level of light reflection by the optical element.

In an example, an optical element in an array of individually-adjustable transmissive-reflective optical elements can comprise an array of disk-shaped reflective nanoparticles suspended in a fluid between two transparent layers. In an example, transmission of electrical current through the optical element aligns the orientations of the disk-shaped reflective nanoparticles, thereby changing the opacity, level of light transmission, and/or level of light reflection by the optical element. In an example, exposure of the optical element to a localized electromagnetic field aligns the orientations of the disk-shaped reflective nanoparticles, thereby changing the opacity, level of light transmission, and/or level of light reflection by the optical element.

In an example, an optical element in an array of individually-adjustable transmissive-reflective optical elements can comprise an array of hexagonal reflective nanoparticles suspended in a fluid between two transparent layers. In an example, transmission of electrical current through the optical element aligns the orientations of the hexagonal reflective nanoparticles, thereby changing the opacity, level of light transmission, and/or level of light reflection by the optical element. In an example, exposure of the optical element to a localized electromagnetic field aligns the orientations of the hexagonal reflective nanoparticles, thereby changing the opacity, level of light transmission, and/or level of light reflection by the optical element. In an example, an array of individually-adjustable transmissive-reflective optical elements can comprise a carlavian curve. In an example, an array of individually-adjustable transmissive-reflective optical elements can have a carlavian curve shape.

In an example, an optical element in an array of individually-adjustable transmissive-reflective optical elements can comprise a plurality of reflective nanoparticles. In an example, when the optical element is exposed to electrical current, the nanoparticles change from a first set of orientations which are generally parallel with the plane of the optical element to a second set of orientations which are generally perpendicular to the plane of the optical element, or vice versa. In an example, when the optical element is exposed to electrical current, the nanoparticles change from a first set of orientations which are generally parallel with the lines of sight from a person's eye to a second set of orientations which are generally perpendicular to the lines of sight from the person's eye, or vice versa.

In an example, an optical element in an array of individually-adjustable transmissive-reflective optical elements can comprise two or more layers of reflective particles. In an example, when the optical element is exposed to electrical current and/or an electromagnetic field, then the two or more layers shift laterally, changing the transparency, opacity, and/or reflectivity of the optical element. In an example, when the optical element is exposed to electrical current and/or an electromagnetic field, then the two or more layers move relative to each other, changing the transparency, opacity, and/or reflectivity of the optical element. In an example, when the optical element is exposed to electrical current and/or an electromagnetic field, then the two or more layers move apart from each other, changing the transparency, opacity, and/or reflectivity of the optical element. In an example, when the optical element is exposed to electrical current and/or an electromagnetic field, then the two or more layers move closer to each other, thereby changing the transparency, opacity, and/or reflectivity of the optical element.

In an example, when an optical element is exposed to an electromagnetic field, reflective nanoparticles in the optical element can change from a first set of orientations which are generally parallel with the plane of the optical element to a second set of orientations which are generally perpendicular to the plane of the optical element, or vice versa. In an example, when the optical element is exposed to an electromagnetic field, then the nanoparticles change from a first set of orientations which are generally parallel with the lines of sight from a person's eye to a second set of orientations which are generally perpendicular to the lines of sight from the person's eye, or vice versa.

In an example, an optical element in an array of individually-adjustable transmissive-reflective optical elements can comprise a plurality of reflective microstructures. In an example, when the optical element is exposed to electrical current, the microstructures change from a first set of orientations which are generally parallel with the plane of the optical element to a second set of orientations which are generally perpendicular to the plane of the optical element, or vice versa. In an example, when the optical element is exposed to electrical current, the microstructures change from a first set of orientations which are generally parallel with the lines of sight from a person's eye to a second set of orientations which are generally perpendicular to the lines of sight from the person's eye, or vice versa.

In an example, when an optical element with reflective microstructures is exposed to an electromagnetic field, then microstructures in the optical element change from a first set of orientations which are generally parallel with the plane of the optical element to a second set of orientations which are generally perpendicular to the plane of the optical element, or vice versa. In an example, when the optical element is exposed to an electromagnetic field, then the microstructures change from a first set of orientations which are generally parallel with the lines of sight from a person's eye to a second set of orientations which are generally perpendicular to the lines of sight from the person's eye, or vice versa.

In an example, an optical element in an array of individually-adjustable transmissive-reflective optical elements can comprise a plurality of micromirrors. In an example, when the optical element is exposed to electrical current, the micromirrors change from a first set of orientations which are generally parallel with the plane of the optical element to a second set of orientations which are generally perpendicular to the plane of the optical element, or vice versa. In an example, when the optical element is exposed to electrical current, the micromirrors change from a first set of orientations which are generally parallel with the lines of sight from a person's eye to a second set of orientations which are generally perpendicular to the lines of sight from the person's eye, or vice versa.

In an example, when an optical element is exposed to an electromagnetic field, reflective microstructures in the optical element change from a first set of orientations which are generally parallel with the plane of the optical element to a second set of orientations which are generally perpendicular to the plane of the optical element, or vice versa. In an example, when the optical element is exposed to an electromagnetic field, the microstructures change from a first set of orientations which are generally parallel with the lines of sight from a person's eye to a second set of orientations which are generally perpendicular to the lines of sight from the person's eye, or vice versa.

In an example, an optical element in an array of individually-adjustable transmissive-reflective optical elements can comprise a plurality of reflective nanoparticles which are suspended in an electromagnetic field. In an example, the orientations of these reflective nanoparticles can be changed by changing parameters of the electromagnetic field. In an example, the orientations of these reflective nanoparticles can be changed by changing the direction and/or intensity of the electromagnetic field. In an example, the opacity and/or light reflectivity of the optical element can be changed by changing the direction and/or intensity of an electromagnetic field to which the optical element is exposed.

In an example, an optical element in an array of individually-adjustable transmissive-reflective optical elements can comprise one or more Micro-Electro-Mechanical Systems (MEMS). In an example, an optical element can be selectively and reversibly changed from its first configuration to its second configuration by the operation of one or more Micro-Electro-Mechanical Systems (MEMS). In an example, the opaqueness of an optical element can be selectively and reversibly adjusted by one or more Micro-Electro-Mechanical System (MEMS). In an example, the reflectivity of an optical element can be selectively and reversibly adjusted by one or more Micro-Electro-Mechanical System (MEMS). In an example, the percentage or level of light transmission through an optical element can be selectively and reversibly adjusted by one or more Micro-Electro-Mechanical System (MEMS).

In an example, the orientation of an optical element in an array of individually-adjustable transmissive-reflective optical elements can be changed by one or more Micro-Electro-Mechanical Systems (MEMS). In an example, the color of an optical element in an array of individually-adjustable transmissive-reflective optical elements can be changed by one or more Micro-Electro-Mechanical Systems (MEMS). In an example, the distance between optical layers in an optical element in an array of individually-adjustable transmissive-reflective optical elements can be changed by one or more Micro-Electro-Mechanical Systems (MEMS). In an example, the angle between optical layers in an optical element in an array of individually-adjustable transmissive-reflective optical elements can be changed by one or more Micro-Electro-Mechanical Systems (MEMS).

In an example, the opacity and/or reflectivity of an optical element can be changed by changing the distance between two optical layers in the optical element. In an example, the opacity and/or reflectivity of an optical element can be changed by changing the distance between two optical layers in the optical element using one or more Micro-Electro-Mechanical Systems (MEMS). In an example, the opacity and/or reflectivity of an optical element can be changed by changing the angle between two optical layers in the optical element. In an example, the opacity and/or reflectivity of an optical element can be changed by changing the angle between two optical layers in the optical element using one or more Micro-Electro-Mechanical Systems (MEMS).

In an example, an optical element can be moved from its first configuration to its second configuration, or vice versa, by being tilted, pivoted, and/or rotated around a central axis. In an example, an optical element can be moved from its first configuration to its second configuration, or vice versa, by being tilted, pivoted, and/or rotated around one of its sides or vertexes. In an example, a hexagonal optical element can be moved by being tilted and/or rotated around an axis between a pair of opposing vertexes. In an example, a square optical element can be moved by being tilted and/or rotated around an axis between opposite side mid-points. In an example, a round optical element can be moved by being tilted and/or rotated around an axis along a diameter.

In an example, an optical element can move from its first configuration to its second configuration by tilting, pivoting, and/or rotating around a physical axle. In an example, an optical element can be connected to such an axle. In an example an optical element can be tilted, pivoted, and/or rotated by the mechanical tilting, pivoting, and/or rotation of a physical axle to which the element is connected. In an example, a physical axle can span a central diameter or mid-section of an optical element. In an example, a physical axle can span an optical element from one vertex of the element to another vertex of the element. In an example, a physical axle can span an optical element from one vertex of the element to an opposite-side vertex of the element. In an example, an optical element can have a physical axle around which it tilts, pivots, and/or rotates, but the force which causes the optical element to move can come from the transmission of electromagnetic energy and/or changes in an electromagnetic field with which the optical element interacts rather than through mechanical motion of the axle.

In an example, an optical element can be suspended in an electromagnetic field in which it tilts, pivots, and/or rotates without the need for a physical axle. In an example, an optical element can be suspended in a fluid in which it tilts, pivots, and/or rotates. In an example, an optical element can be encapsulated in a fluid, gel, or solid in which it tilts, pivots, and/or rotates. In an example, an optical element can be tilted, pivoted, and/or rotated by the application of electromagnetic energy. In an example, an optical element can be tilted, pivoted, and/or rotated by changes in an electromagnetic field with which the optical element interacts. In an example, an optical element can be tilted, pivoted, and/or rotated by changes in air flow and/or air pressure. In an example, an optical element can be tilted, pivoted, and/or rotated by interaction with a high-frequency sound wave (e.g. an ultrasonic wave).

In an example, an optical element can be moved from its first configuration to its second configuration, or vice versa, by the transmission of electromagnetic energy. In an example, transmission of electromagnetic energy can create an electromagnetic field which tilts, pivots, and/or rotates an optical element. In an example, an optical element can have portions (e.g. sides or vertexes) with different levels of electromagnetic attraction, causing the optical element to tilt, pivot, and/or rotate in the presence of an electromagnetic field. In an example, transmission of electromagnetic energy through electromagnetic pathways which are substantially parallel to the cross-sectional plane of the lens can create an electromagnetic field which tilts, pivots, and/or rotates an optical element. In an example, transmission of electromagnetic energy through electromagnetic pathways which are substantially perpendicular to the cross-sectional plane of the lens can create an electromagnetic field which tilts, pivots, and/or rotates an optical element.

In an example, a selected subset of optical elements in an array of optical elements can be moved between their first and second configurations by the transmission of electromagnetic energy through a selected subset of electroconductive pathways in a nearby electroconductive grid. In an example, an electroconductive grid can be proximal (e.g. closer to an eye) relative to an array optical elements. In an example, an electroconductive grid can be distal (e.g. farther from an eye) relative to an array optical elements. In an example, an electroconductive grid can have proximal and distal layers, wherein an array of optical elements is between these layers. In an example, there can be two electroconductive grids, one which is proximal relative to an array of optical elements and one which is distal relative to the array of optical elements.

In an example, an electroconductive grid can be substantially transparent. In an example, an electroconductive grid can be made from transparent polymer material which has been doped and/or impregnated with conductive particles which are sufficiently small that they do not substantially interfere with the transmission of light through the grid. In an example, an electroconductive grid which is used to move optical elements can be a two dimensional grid. In an example, an electroconductive grid which is used to move optical elements can be a grid of orthogonal electroconductive pathways (e.g. a row and column grid). In an example, an electroconductive grid which is used to move optical elements can be a radial grid of electroconductive pathways (e.g. a hub and spoke grid). In an example, an electroconductive grid which is used to move optical elements can be a honeycomb (e.g. hexagonal) grid of conductive pathways. In an example, an electroconductive grid which is used to move optical elements can be a nested-ring grid (e.g. with concentric rings) of conductive pathways.

In an example, a row-and-column grid of electroconductive pathways can be paired with a row-and-column array of optical elements in order to selectively move optical elements by the transmission of electromagnetic energy. In an example, a radial grid of electroconductive pathways can be paired with a radial array of optical elements in order to selectively move optical elements by the transmission of electromagnetic energy. In an example, a honeycomb grid of electroconductive pathways can be paired with a honeycomb array of optical elements in order to selectively move optical elements by the transmission of electromagnetic energy. In an example, a nested-ring grid of electroconductive pathways can be paired with a nested-ring array of optical elements in order to selectively move optical elements by the transmission of electromagnetic energy.

In an example, transmission of a first level of electromagnetic energy through a grid can tilt, pivot, and/or rotate an optical element by a first amount and/or in a first direction and transmission of a second level of electromagnetic energy through the grid can tilt, pivot, and/or rotate an optical element by a second amount and/or in a second direction. In an example, transmission of a electromagnetic energy through a first subset of electroconductive pathways in an electroconductive grid can tilt, pivot, and/or rotate an optical element by a first amount and/or in a first direction and transmission of electromagnetic energy through a second subset of electroconductive pathways in the grid can tilt, pivot, and/or rotate an optical element by a second amount and/or in a second direction.

In an example, an optical element can be moved from its first configuration to its second configuration, or vice versa, by a MEMS actuator. In an example, each optical element can have its own MEMS actuator so that individual optical elements can be selectively, individually, and independently changed from their first configurations to their second configurations, or vice versa. In an example, an optical element can be moved by an acoustic wave and/or air pulse.

In an example, an optical element in an array of individually-adjustable transmissive-reflective optical elements can be made with electrochromic material, wherein the color, opacity, level of light transmission, and/or level of light reflection of the material changes when the material is exposed to electrical current and/or an electromagnetic field. In an example, an optical element in an array of individually-adjustable transmissive-reflective optical elements can be made with electrochromic, photochromic, and/or electrogenic material.

In an example, an optical element can have an electrochromic component. In an example, an optical element can have an electrochromic layer, wherein the color, opacity, level of light transmission, and/or level of light reflection of the layer changes when the layer is exposed to electrical current and/or an electromagnetic field. In an example, an optical element can have two layers: a consistently transparent layer; and an electrochromic layer, wherein the color, opacity, level of light transmission, and/or level of light reflection of the electrochromic layer changes when the layer is exposed to electrical current and/or an electromagnetic field. In an example, the electrochromic layer can be changed to a black or silver color, causing the transparent layer to act as a mirror. In an example, an optical element can comprise a variable-reflectivity mirror. In an example, an optical element can comprise a transparent layer and a coating of electrochromic material on the transparent layer.

In an example, an individually-adjustable transmissive-reflective optical element can be made with photochromic material whose opacity, level of light transmission, and/or level of light refection changes when exposed to light in a selected portion of the electromagnetic spectrum. In an example, an individually-adjustable transmissive-reflective optical element can be made with photochromic material whose opacity, level of light transmission, and/or level of light refection changes when exposed to infrared or near-infrared light. In an example, an individually-adjustable transmissive-reflective optical element can be made with photochromic material whose opacity, level of light transmission, and/or level of light refection changes when exposed to light projected by a display. In an example, an optical element can be made with photopolymer material. In an example, an optical element can be made with photorefractive material, wherein the index of refraction is modulated.

In an example, an optical element in an array of individually-adjustable transmissive-reflective optical elements can include liquid crystals. In an example, an optical element can comprise liquid crystals whose opacity, level of light transmission, and/or level of light reflection changes when exposed to electric current and/or an electromagnetic field. In an example, the liquid crystals can be polarized. Twas the night before Christmas but before celebration, an old nerd submitted this here application. In an example, the liquid crystals can be dispersed in a polymer. In an example, the liquid crystals can be on silicon. In an example, an optical element can comprise zinc or lithium niobate.

In an example, an optical element in an array of individually-adjustable transmissive-reflective optical elements can comprise reflective particles which are suspended in a liquid or gel, wherein exposure to electric current and/or an electromagnetic field moves the reflective particles into (or out of) alignment with the plane of the optical element, thereby changing the opacity, level of light transmission, and/or level of light reflection by the optical element. In an example, an optical element in an array of individually-adjustable transmissive-reflective optical elements can comprise reflective particles which are suspended in a liquid or gel, wherein exposure to electric current and/or an electromagnetic field moves the reflective particles into (or out of) alignment, thereby changing the opacity, level of light transmission, and/or level of light reflection by the optical element.

In an example, an optical element in an array of individually-adjustable transmissive-reflective optical elements can comprise reflective particles which are suspended in a gas, wherein exposure to electric current and/or an electromagnetic field moves the reflective particles into (or out of) alignment with the plane of the optical element, thereby changing the opacity, level of light transmission, and/or level of light reflection by the optical element. In an example, an optical element in an array of individually-adjustable transmissive-reflective optical elements can comprise reflective particles which are suspended in a gas, wherein exposure to electric current and/or an electromagnetic field moves the reflective particles into (or out of) alignment, thereby changing the opacity, level of light transmission, and/or level of light reflection by the optical element.

In an example, an optical element in an array of individually-adjustable transmissive-reflective optical elements can comprise optical particles which are suspended in a liquid or gel, wherein exposure to electric current and/or an electromagnetic field moves the optical particles into alignment or out of alignment with each other. In an example, the transparent portions of an optical element can be made with glass or acrylic. In an example, reflective particles in an optical element can be made from glass or acrylic. In an example, an optical element can be partly made with indium (e.g. indium tin oxide). In an example, transparent electroconductive pathways which expose reflective particles in an optical element to an electromagnetic field can be made from indium (e.g. indium tin oxide).

In an example, an optical element in an array of individually-adjustable transmissive-charged optical elements can comprise charged particles which are suspended in a liquid or gel, wherein exposure to electric current and/or an electromagnetic field moves the charged particles into alignment or out of alignment. In an example, an optical element in an array of individually-adjustable transmissive-charged optical elements can comprise ionized particles which are suspended in a liquid or gel, wherein exposure to electric current and/or an electromagnetic field moves the ionized particles into alignment or out of alignment.

In an example, an optical element in an array of individually-adjustable transmissive-reflective optical elements can comprise optical particles which are suspended in a liquid, gel, or gas—wherein exposure to electric current and/or an electromagnetic field moves the optical particles into (or out of) alignment, thereby changing the opacity, level of light transmission, and/or level of light reflection by the optical element. In an example, an optical element in an array of individually-adjustable transmissive-reflective optical elements can comprise optical particles which are suspended in a liquid, gel, or gas—wherein exposure to electric current and/or an electromagnetic field moves the optical particles into (or out of) alignment with each other, thereby changing the opacity, level of light transmission, and/or level of light reflection by the optical element.

In an example, an optical element in an array of individually-adjustable transmissive-reflective optical elements can comprise optical particles which are suspended in a liquid or gel, wherein exposure to electric current and/or an electromagnetic field moves the optical particles into (or out of) alignment with the plane of the optical element, thereby changing the opacity, level of light transmission, and/or level of light reflection by the optical element. In an example, an optical element and/or electroconductive pathways which are in electromagnetic communication with that optical element can be made from an oxide material selected from the group consisting of: indium tin oxide, molybdenum oxide, nickel oxide, niobium oxide, tungsten oxide, aluminum oxide, fluorinated tin oxide, polytetramethylene oxide, polyethylene oxide, silicon oxide, tantalum oxide, transition metal oxide, and tungsten oxide.

In an example, an optical element in an array of individually-adjustable transmissive-charged optical elements can comprise charged particles which are suspended in a liquid or gel, wherein exposure to electric current and/or an electromagnetic field moves the charged particles from a first configuration in which their orientations are substantially random and a second configuration in which their orientations are substantially aligned with the plane of the optical element, or vice versa. In an example, an optical element in an array of individually-adjustable transmissive-reflective optical elements can comprise optical particles which are suspended in a liquid or gel, wherein exposure to electric current and/or an electromagnetic field moves the optical particles from a first configuration in which their orientations are substantially random and a second configuration in which their orientations are substantially aligned with each other, or vice versa.

In an example, an optical element in an array of individually-adjustable transmissive-reflective optical elements can comprise optical particles which are suspended in a liquid or gel, wherein exposure to electric current and/or an electromagnetic field moves the optical particles from a first configuration in which their orientations are substantially random and a second configuration in which their orientations are substantially aligned with the plane of the optical element, or vice versa.

In an example, an optical element in an array of individually-adjustable transmissive-reflective optical elements can comprise ellipsoidal optical particles which are suspended in a liquid or gel, wherein exposure to electric current and/or an electromagnetic field moves the optical particles from a first configuration in which their orientations are substantially random and a second configuration in which their orientations are substantially aligned with the plane of the optical element, or vice versa. In an example, an optical element in an array of individually-adjustable transmissive-reflective optical elements can comprise hexagonal particles which are suspended in a liquid or gel, wherein exposure to electric current and/or an electromagnetic field moves the optical particles from a first configuration in which their orientations are substantially random and a second configuration in which their orientations are substantially aligned with the plane of the optical element, or vice versa.

In an example, an optical element in an array of individually-adjustable transmissive-reflective optical elements can comprise optical particles which are suspended in a liquid or gel, wherein exposure to electric current and/or an electromagnetic field moves the optical particles from a first configuration in which their orientations are substantially parallel with lines of sight from a person's eye and a second configuration in which their orientations are substantially perpendicular to lines of sight from the person's eye. In an example, an optical element in an array of individually-adjustable transmissive-reflective optical elements can comprise reflective particles which are suspended in a liquid or gel, wherein exposure to electric current and/or an electromagnetic field moves the reflective particles from a first configuration in which their orientations are substantially random and a second configuration in which their orientations are substantially aligned with the plane of the optical element, or vice versa.

In an example, an optical element in an array of individually-adjustable transmissive-reflective optical elements can comprise reflective particles which are suspended in a liquid or gel, wherein exposure to electric current and/or an electromagnetic field moves the reflective particles from a first configuration in which their orientations are substantially random and a second configuration in which their orientations are substantially aligned with each other, or vice versa.

In an example, an optical element can include components made from silver (e.g. silver alloy, silver epoxy, or silver halide emulsion). In an example, an optical element can comprise a layer of silver particles which are suspended in a liquid or gel, wherein the orientations of these particles are changed by exposure to electrical current and/or an electromagnetic field. In an example, an optical element can comprise a layer of electrically-charged metal particles which are suspended in a liquid or gel, wherein the orientations of these particles are changed by exposure to electrical current and/or an electromagnetic field.

In an example, an optical element in an array of individually-adjustable transmissive-charged optical elements can comprise charged particles which are suspended in a liquid or gel, wherein exposure to electric current and/or an electromagnetic field moves the charged particles from a first configuration in which their orientations are substantially parallel with lines of sight from a person's eye and a second configuration in which their orientations are substantially perpendicular to lines of sight from the person's eye.

In an example, an optical element can be made from a generally-nonconductive polymer which has been doped, impregnated, and/or coated with conductive particles. In an example, an optical element can be made from one or more polymers selected from the group consisting of: polypyrrole, polytetrafluoroethylene (PTFE), polyacrylate, polyamide, polycarbonate, polyester, polyethylene naphtalate (PEN), polyethylene terephthalate (PET), polyaniline, polypyrrole, polythiophene, polyvinyl alcohol (PVA), polyimide, polymethyl methacrylate (PMMA), polypropylene oxide (PPO), polyvinylidene difluoride (PVDF), and polyvinylpyrrolidone (PVP).

In an example, an optical element can include metal. In an example, an optical element can be made with metal carbide or a switchable metal hydride film. In an example, an optical element can be made with gold, silver, nickel, or copper (e.g. a copper alloy). In an example, an optical element can be made with aluminum (with Scotty's help) or an aluminum compound such as aluminum oxide. In an example, an optical element can be made with acetate, silicone, or crystal.

In an example, an optical element in an array of individually-adjustable transmissive-reflective optical elements can comprise reflective particles which are suspended in a liquid or gel, wherein exposure to electric current and/or an electromagnetic field moves the reflective particles from a first configuration in which their orientations are substantially parallel with lines of sight from a person's eye and a second configuration in which their orientations are substantially perpendicular to lines of sight from the person's eye. In an example, an optical element can be made with neoprene, nylon, elastane, or parylene. In an example, an optical element can be made with nitride material.

In an example, an optical element can be part of a lens selected from the group consisting of: aspheric lens, asymmetric lens, collimating lens, compound lens, concave lens, concentric lenses, contact lens, convex lens, curved lens, diverging lens, filtered lens, flat lens, fluid lens, fly's eye lens, Fresnel lens, lens with integrated circuitry, lens with nanoscale gratings, liquid lens, MEMS-based lens array, microlens, mirrored lens, movable lens, optoelectric lens, parabolic lens, prescription lens, semi-reflective lens, simple lens, smart lens, spherical lens, tinted lens, variable-focus lens, virtual curved lens, vision-correcting lens, and wedge-shaped lens.

In an example, an optical element in an array of individually-adjustable transmissive-charged optical elements can comprise charged particles which are suspended in a liquid or gel, wherein exposure to electric current and/or an electromagnetic field moves the charged particles into (or out of) alignment, thereby changing the opacity, level of light transmission, and/or level of light reflection by the optical element. In an example, an optical element in an array of individually-adjustable transmissive-reflective optical elements can comprise optical particles which are suspended in a liquid or gel, wherein exposure to electric current and/or an electromagnetic field moves the optical particles. In an example, an optical element can be made with Prussian blue material. In an example, an optical element can be made with ethylene tetrafluoroethylene (ETFE) or ethylene vinyl acetate (EVA). In an example, an optical element can be made with gallium nitride (GaN).

In an example, an optical element in an array of individually-adjustable transmissive-charged optical elements can comprise charged particles which are suspended in a liquid, gel, or gas—wherein exposure to electric current and/or an electromagnetic field moves the charged particles into (or out of) alignment with each other, thereby changing the opacity, level of light transmission, and/or level of light reflection by the optical element. In an example, an individually-adjustable transmissive-reflective optical element can be made with chiral nematic liquid crystals (e.g. crystals made from hydroxypropyl cellulose or cholesteryl benzoate). In an example, an individually-adjustable transmissive-reflective optical element can comprise smectic liquid crystals with bistable properties. In an example, an individually-adjustable transmissive-reflective optical element can comprise smegal crystals because they are so precious. In an example, an individually-adjustable transmissive-reflective optical element can comprise smectic liquid crystals.

In an example, an optical element in an array of individually-adjustable transmissive-charged optical elements can comprise charged particles which are suspended in a liquid or gel, wherein exposure to electric current and/or an electromagnetic field moves the charged particles from a first configuration in which their orientations are substantially random and a second configuration in which their orientations are substantially aligned with each other, or vice versa. In an example, an optical element and/or charged particles in the optical element can be made with carbon (e.g. carbon nanotubes, carbon fibers, or carbonitride). In an example, an optical element can be made with dichromated gelatin.

In an example, an optical element in an array of individually-adjustable transmissive-reflective optical elements can comprise reflective particles which are suspended in a liquid or gel, wherein exposure to electric current and/or an electromagnetic field moves the reflective particles into (or out of) alignment with each other, thereby changing the opacity, level of light transmission, and/or level of light reflection by the optical element. In an example, an optical element in an array of individually-adjustable transmissive-charged optical elements can comprise charged particles which are suspended in a liquid or gel, wherein exposure to electric current and/or an electromagnetic field moves the charged particles. In an example, an optical element in an array of individually-adjustable transmissive-reflective optical elements can comprise reflective particles which are suspended in a liquid or gel, wherein exposure to electric current and/or an electromagnetic field moves the reflective particles into alignment or out of alignment.

In an example, an individually-adjustable transmissive-reflective optical element can be an electrophoretic device. In an example, an optical element can include charged particles which move when exposed to electrical current and/or an electromagnetic field. In an example, an optical element in an array of individually-adjustable transmissive-reflective optical elements can comprise reflective particles which are suspended in a liquid or gel, wherein exposure to electric current and/or an electromagnetic field moves the reflective particles.

In an example, an optical element in an array of individually-adjustable transmissive-charged optical elements can comprise charged particles which are suspended in a liquid or gel, wherein exposure to electric current and/or an electromagnetic field moves the charged particles into (or out of)

alignment with the plane of the optical element, thereby changing the opacity, level of light transmission, and/or level of light reflection by the optical element. In an example, an optical element can be made with a viologen compound or cadmium. Alternatively, an optical element and/or electroconductive pathways which deliver electrical current to the optical element can be made with graphene.

In an example, an individually-adjustable transmissive-reflective optical element can comprise liquid crystals whose opacity and/or reflectivity is changed by electrical current and/or exposure to an electromagnetic field. In an example, an individually-adjustable transmissive-reflective optical element can include an adjustable magnesium hydride mirror. In an example, an optical element can contain a plurality of nanoparticles which are suspended in a liquid, wherein application of electric current and/or exposure to an electromagnetic field causes the nanoparticles to align and the optical element to reflect light. In an example, the (center-facing) angle between (the center facing surface of) optical elements and the best-fitting plane of an array of optical elements can decrease with the distance of optical elements from the center of an array of optical elements.

In an example, an individually-adjustable transmissive-reflective optical element can have a first configuration wherein it transmits more than 50% of the light from the environment reaching that element toward a person's eye and reflects less than 50% of the light from a near-eye display reaching that element toward the person's eye. In an example, an individually-adjustable transmissive-reflective optical element can have a first configuration wherein it transmits more than 75% of the light from the environment reaching that element toward a person's eye and reflects less than 25% of the light from a near-eye display reaching that element toward the person's eye.

In an example, an individually-adjustable transmissive-reflective optical element can have a second configuration wherein it transmits less than 75% of the light from the environment reaching that element toward a person's eye and reflects more than 25% of the light from a near-eye display reaching that element toward the person's eye. In an example, an individually-adjustable transmissive-reflective optical element can comprise a liquid crystal grating. In an example, an array of adjustable optical elements can collectively form a Catadioptric Lens or a section of a Catadioptric Lens.

In an example, an individually-adjustable transmissive-reflective optical element can comprise an electro-optical device whose color, light transmission, and/or light reflectivity changes when exposed to electrical current and/or an electromagnetic field. In an example, an individually-adjustable transmissive-reflective optical element can have a second configuration wherein it transmits less than 25% of the light from the environment reaching that element toward a person's eye and reflects more than 75% of the light from a near-eye display reaching that element toward the person's eye.

In an example, the perimeter of a first selected subset of adjustable optical elements can align with the perimeter of a virtual object at a first location in the person's field of view at a first point in time and the perimeter of a second selected subset of adjustable optical elements can align with the perimeter of the same virtual object at a second location in the person's field of view at a second point in time. In an example, the perimeter of the first selected subset of adjustable optical elements can align with the perimeter of a first virtual object in the person's field of view at a first point in time and the perimeter of the second selected subset of adjustable optical elements can align with the perimeter of a second virtual object in the person's field of view at a second point in time.

In an example, an extension of the virtual plane which best fits the display can be substantially-perpendicular to an extension of the virtual plane which best fits the array of optical elements. In an example, an extension of the virtual plane which best fits the display can be intersect an extension the virtual plane which best fits the array of optical elements by an angle within the range of 80 to 100 degrees. In an example, an extension of the virtual plane which best fits the display can be intersect an extension the virtual plane which best fits the array of optical elements by an angle within the range of 70 to 90 degrees. In an example, an extension of the virtual plane which best fits the display can be intersect an extension the virtual plane which best fits the array of optical elements by an angle within the range of 60 to 80 degrees.

In an example, different optical elements in the array (or virtual extensions of these optical elements) can intersect the array plane at different angles. In an example, the intersection angles between optical elements (or virtual extensions of these elements) and the array plane can increase with distance from the center of the array. In an example, optical elements which are farther from the center of the array intersect the array plane at greater angles than optical elements which are closer to the center of the array. In an example, optical elements which are farther from the display intersect the array plane at greater angles than optical elements which are closer to the display.

In an example, the (center-facing) angle between (the center facing surface of) optical elements and the best-fitting plane of an array of optical elements can increase with the distance of optical elements from the center of an array of optical elements. In an example, the angles at which optical elements intersect the array plane vary as a linear function of the distance from the angles to the display. In an example, the angles at which optical elements intersect the array plane vary as a quadratic function of the distance from the angles to the display. In an example, the angles at which optical elements intersect the array plane vary as a linear function of the distance from the angles to the center of the array.

In an example, the angles at which optical elements intersect the array plane can vary as a quadratic function of the distance from the angles to the center of the array. In an example, the intersection angles between optical elements (or virtual extensions of these elements) and the array plane can decrease with distance from the center of the array. In an example, the intersection angles between optical elements (or virtual extensions of these elements) and the array plane increase with distance from the display. In an example, the intersection angles between optical elements (or virtual extensions of these elements) and the array plane can decrease with distance from the display.

In an example, an array of adjustable optical elements can collectively comprise a diffraction grating. In an example, an array of adjustable optical elements can collectively comprise an adjustable grating with a variable pitch. In an example, an array of adjustable optical elements can collectively comprise an adjustable Bragg grating. In an example, an array of adjustable optical elements can collectively comprise a metagrating. In an example, an array of adjustable optical elements can collectively comprise a grating with periodic modulation of its refractive index. In an example, an array of adjustable optical elements can collectively comprise a grating with a variable refractive index.

In an example, an array of individually-adjustable transmissive-reflective optical elements can collectively form a nested array of annular prisms (or rings or ridges). Each of the annular prisms (or rings or ridges) can have a first flat surface which is substantially parallel with lines of sight from a person's eye and can remain transparent. Each of the annular prisms (or rings or ridges) can also have a second flat surface which faces a display and whose level of opacity and/or reflectivity can be adjusted. In an example, the level of light reflectivity from the second surface can be changed by application of electrical current or exposure to an electromagnetic field.

In an example, the angle between a first flat surface on a prism (or ring or ridge) and a second flat surface on a prism (or ring or ridge) can vary in proportion to the distance of a prism (or ring or ridge) from the center of the array. In an example, the angle between a first flat surface and a second flat surface can vary in linear proportion to (e.g. as a linear function of) the distance of a prism (or ring or ridge) from the center of the array. In an example, the angle between a first flat surface and a second flat surface can vary in quadratic proportion to (e.g. as a quadratic function of) the distance of a prism (or ring or ridge) from the center of the array.

In an example, an array of individually-adjustable transmissive-reflective optical elements can collectively form a Fresnel Reflector with a nested array of annular prisms, rings, or ridges wherein a first surface of each prism, ring, or ridge is transparent and a second surface of each prism, ring, or ridge has adjustable reflectivity. In an example, an array of individually-adjustable transmissive-reflective optical elements can collectively form a (left or right side) section of a Fresnel Reflector, wherein the Fresnel Reflector is a nested array of annular prisms, rings, or ridges wherein a first surface of each prism, ring, or ridge is transparent and a second surface of each prism, ring, or ridge has adjustable reflectivity.

In an example, the size of optical elements can increase with the distance of optical elements from the center of an array of optical elements. In an example, the sizes of optical elements can increase with increased distance from the display. In an example, the sizes of optical elements can increase with increased distance from the center of the array. In an example, the sizes of optical elements can vary as a function of distance from the display. In an example, the sizes of optical elements can vary as a linear function of distance from the center of the array.

In an example, the sizes of optical elements can vary as a function of distance from the center of the array. In an example, the sizes of optical elements can vary as a linear function of distance from the display. In an example, the sizes of optical elements can vary as a quadratic function of distance from the display. In an example, the sizes of optical elements can vary as a quadratic function of distance from the center of the array. In an example, the width of optical elements can increase with the distance of optical elements from the center of an array of optical elements.

In an example, an array of optical elements can comprise a section or portion of the front surface of a Fresnel Reflector. In an example, an array of optical elements can comprise a section of the right half or the left half of a Fresnel Reflector. In an example, an array of optical elements can comprise a section of the right-most or left-most quarter of Fresnel Reflector In an example, the area of this section can comprise between 1% and 10% of the front-side area of the Fresnel Reflector. In an example, the area of this section can comprise between 5% and 20% of the front-side area of the Fresnel Reflector. In an example, an array of optical elements can be a spoke-and-ring array of optical elements. In an example, an array of optical elements can be a spoke-and-ring array of optical elements which combine to form a section of a Fresnel Reflector. In an example, an array of optical elements can combined to comprise a nested array of annular adjustably-reflective prisms.

In an example, an array of optical elements can comprise a side section of a Fresnel Reflector, wherein a side section is a section of the right half or the left half of the Fresnel Reflector (as seen with a circular perimeter from a front or rear perspective). In an example, an array of optical elements can comprise a symmetric central section of a Fresnel Reflector, wherein a symmetric central section is a section of the Fresnel Reflector whose center is the center of the Fresnel Reflector (as seen with a circular perimeter from an front or rear perspective). In an example, an array of optical elements can comprise an asymmetric central section of a Fresnel Reflector, wherein an asymmetric central section is a section of the Fresnel Reflector which includes the center of the Fresnel Reflector but whose center is not the center of the Fresnel Reflector (as seen with a circular perimeter from an front or rear perspective).

In an example a right-side or left-side section of a Fresnel Reflector can receive light rays from a light source to the left or right, respectively, of the section and reflect those light rays outward in a substantially-parallel manner. In an example a side section of a Fresnel Reflector can receive light rays from a display to one side of an eye and reflect those light rays toward the eye in a substantially-parallel manner. In an example a symmetric central section of a Fresnel Reflector can receive and reflect light rays in a similar manner to the full Fresnel Reflector. In an example, an array of these optical elements can comprise a section (or portion) of a Fresnel Reflector. In an example, an array of these optical elements can comprise a circular, elliptical, or oval section (or portion) of a Fresnel Reflector. In an example, a Fresnel Reflector can comprise an array of nested (e.g. concentric) rings around a central point.

In an example, a first selected subset of adjustable optical elements in a section of a Fresnel Reflector can be selected and changed from their first configurations to their second configurations at a first point in time (wherein optical elements not in this subset remain in their first configurations) and a second selected subset of adjustable optical elements can be selected and changed from their first configurations to their second configurations at a second point in time (wherein optical elements not in this subset remain in their first configurations).

In an example, augmented reality eyewear which is worn by a person can comprise right and left Fresnel Reflector sections on the frontpiece of the eyewear and right and left displays on the right and left sidepieces (e.g. temples), respectively, of the eyewear, wherein light from the right and left displays is reflected by selected subsections of the right and left Fresnel Reflector sections, respectively, toward the person's right and left eyes, and wherein the selected subsections align with virtual objects in the displays in the person's field of view.

In an example, augmented reality eyewear which is worn by a person can comprise two Fresnel Reflector sections in front of the person's eyes and two prescription lenses between the Fresnel Reflector sections and the person's eyes. In an example, augmented reality eyewear which is worn by a person can comprise right and left Fresnel Reflector sections on the frontpiece of the eyewear and right and left displays on the right and left sidepieces (e.g.

temples), respectively, of the eyewear, wherein light from the right and left displays is reflected by the right and left Fresnel Reflector sections, respectively, toward the person's right and left eyes.

The degree of curvature (e.g. convexity) of ridges (e.g. ridges, peaks, and/or saw-teeth) in a right-or-left-side section of a Fresnel Reflector depends on the size of the section relative to the size of the overall Fresnel Reflector. For example, as the size of a right-or-left-side section of a Fresnel Reflector becomes smaller relative to the size of the Fresnel Reflector (or, from another perspective, the size of the Fresnel Reflector becomes larger relative to the size of a right-or-left-side the section), ridges in that section become less curved and more straight. In the extreme, as the size of the Fresnel Reflector approaches infinity, ridges in a fixed-size section converge to parallel straight ridges.

The curvature of ridges (e.g. ridges, peaks, and/or saw-teeth) in a right-or-left-side section of a Fresnel Reflector also depends on the location of the section relative to the overall Fresnel Reflector. For example, as fixed-size right-or-left-side section of a Fresnel Reflector moves away from the center of the Fresnel Reflector, then ridges in that section become less curved and straighter. The distances between ridges (e.g. ridges, peaks, and/or saw-teeth) in a right-or-left-side section of a Fresnel Reflector depend on the distances between ridges in the overall Fresnel Reflector from which the section is extracted. If the distances between ridges in the overall Fresnel Reflector are not constant with distance from the center of the Reflector, then the distances between ridges in a section can also depend on distance of the section from the center of the Fresnel Reflector.

In an example, the opacity, level of light transmission, and/or light reflectivity of an individually-adjustable transmissive-reflective optical element in an array of optical element can be selectively changed by exposing the element to electrical current and/or an electromagnetic field via an array of primarily transparent (or, at least translucent) electroconductive pathways. In an example, the opacity, level of light transmission, and/or light reflectivity of individually-adjustable transmissive-reflective optical elements in an array of optical element can be individually and selectively changed by exposing them to electrical current and/or an electromagnetic field via an array of primarily transparent (or, at least translucent) electroconductive pathways.

In an example, an optical element can have points of electroconductive communication with electroconductive pathways in an array of electroconductive pathways. In an example, when electrical current is passed between the two points, then this changes the opacity, level of light transmission, and/or level of light reflectivity of the optical element. In an example, two vertexes of an optical element can be in electroconductive communication with electroconductive pathways in an array of electroconductive pathways. In an example, when electrical current is passed through the pathways and between the two vertexes, then this changes the levels of light transmission vs. light reflectance of the optical element.

In an example, an optical element can have a polygonal shape, wherein two vertexes of the optical element are in electromagnetic communication with transparent (or translucent) electroconductive pathways and wherein passing electrical current through these two vertexes causes the optical element to become more light reflective and less light transmissive, or vice versa. In an example, an optical element can have a rectangular shape, wherein two vertexes of the optical element are in electromagnetic communication with transparent (or translucent) electroconductive pathways and wherein passing electrical current through these two vertexes causes the optical element to become more light reflective and less light transmissive, or vice versa.

In an example, an optical element can have a hexagonal shape, wherein two vertexes of the optical element are in electromagnetic communication with transparent (or translucent) electroconductive pathways and wherein passing electrical current through these two vertexes causes the optical element to become more light reflective and less light transmissive, or vice versa. In an example, an optical element can have a wedge and/or keystone shape, wherein two vertexes of the optical element are in electromagnetic communication with transparent (or translucent) electroconductive pathways and wherein passing electrical current through these two vertexes causes the optical element to become more light reflective and less light transmissive, or vice versa.

In an example, two layers of an optical element can be in electroconductive communication with electroconductive pathways in an array of electroconductive pathways. In an example, when electrical current is passed through the pathways and between the two layers, then this changes the levels of light transmission vs. light reflectance of the optical element. In an example, two sides of an optical element can be in electroconductive communication with electroconductive pathways in an array of electroconductive pathways. In an example, when electrical current is passed through the pathways and between the two sides, then this changes the levels of light transmission vs. light reflectance of the optical element. In an example, an optical element can comprise a photochromic layer between two electrodes. In an example, an optical element can comprise an electrochromic coating and two or more electrodes.

In an example, an array of transparent electroconductive pathways can comprise a row and column grid (e.g. grid, mesh, or array) of pathways. In an example, electroconductive pathways in an array of electroconductive pathways can be undulating, serpentine, and/or sinusoidal. In an example, an electroconductive pathway can be made with carbon (e.g. carbon fibers, carbon nanotubes, or carbonitrides). In an example, an electroconductive pathway can be made with nylon. In an example, an optical element can comprise a first transparent (or at least translucent) electroconductive layer, a second transparent (or at least translucent) electroconductive layer, and an adjustable transmissive-reflective layer between the first and second transparent layers.

In an example, different electroconductive pathways in an array can have different lengths or thicknesses. In an example, electroconductive pathways closer to the center of the array can be shorter and/or thinner than pathways farther from the center. In an example, a transparent electroconductive pathway can have variable resistance. In an example, electroconductive pathways at different locations in an array of electroconductive pathways can have different levels of resistance. In an example, an array of transparent electroconductive pathways can comprise a ring and spoke grid (e.g. grid, mesh, or array) of pathways. In an example, an electroconductive pathway can be made with elastane. In an example, a transparent electroconductive pathway can encircle an optical element. In an example, an electroconductive pathway can be made with nickel.

In an example, transparent electroconductive pathways can span between optical elements in an array of optical elements. In an example, electroconductive pathways can run along the perimeters of optical elements. In an example, an optical element can comprise a first transparent (or at least translucent) electrode, a second transparent (or at least translucent) electrode, and an electrochromic layer between the first and second transparent electrodes. In an example, an electroconductive pathway can be made from a transparent (or at least translucent) generally-nonconductive polymer which has been doped and/or impregnated with electroconductive particles. In an example, an electroconductive pathway can be made from a silicon-based polymer which has been doped and/or impregnated with metal particles.

In an example, an array of transparent electroconductive pathways can comprise a nested ring grid (e.g. grid, mesh, or array) of pathways. In an example, an array of transparent electroconductive pathways can comprise a concentric ring grid (e.g. grid, mesh, or array) of pathways. In an example, an electroconductive pathway can be made with ethylene tetrafluoroethylene (ETFE) or ethylene vinyl acetate (EVA). In an example, an electroconductive pathway can be made with gallium nitride (GaN). In an example, pathways in an array of transparent electroconductive pathways can be undulating or sinusoidal. In an example, an electroconductive pathway can be made with gold.

In an example, an array of transparent electroconductive pathways can comprise a hexagonal grid (e.g. grid, mesh, or array) of pathways. In an example, an electroconductive pathway can be made with acrylic. In an example, an electroconductive pathway can be made with tungsten. In an example, pathways in an array of transparent electroconductive pathways can have zigzag or sawtooth shapes. In an example, an electroconductive pathway can be made with graphene.

In an example, distances between electroconductive pathways can be smaller toward the center of an array of electroconductive pathways and toward the perimeter of the array. In an example, an electroconductive pathway can be made with indium tin oxide (ITO). In an example, the density of electroconductive pathways can be greater toward the center of an array of electroconductive pathways and toward the perimeter of the array. In an example, an electroconductive pathway can be made with lithium niobate. In an example, an optical element can comprise a first transparent (or at least translucent) electroconductive layer, a second transparent (or at least translucent) electroconductive layer, and an electrochromic layer between the first and second transparent layers. In an example, an electroconductive pathway can be made with parylene.

In an example, an optical element can comprise a first transparent (or at least translucent) electroconductive layer, a second transparent (or at least translucent) electroconductive layer, and a liquid crystal layer between the first and second transparent layers. In an example, an electroconductive pathway can be made with an oxide compound [e.g. Indium Tin Oxide (ITO. aluminum oxide (AO), fluorine-doped tin oxide, polyethylene oxide (PEO), polypropylene oxide (PPO), silicon oxide, tantalum oxide, titanium oxide, or tungsten oxide]. In an example, an array of transparent electroconductive pathways can comprise a quadrilateral grid (e.g. grid, mesh, or array) of pathways. In an example, an electroconductive pathway can be made with aluminum. In an example, an electroconductive pathway can be made with zinc.

In an example, an array of transparent electroconductive pathways can comprise a latitudinal and longitudinal grid (e.g. grid, mesh, or array) of pathways. In an example, an electroconductive pathway can be made with cadmium. In an example, an array of transparent electroconductive pathways can comprise a grid (e.g. grid, mesh, or array) of pathways wherein there are hexagon-shaped spaces between pathways. In an example, a transparent electroconductive pathway can span the perimeter of a polygonal optical element.

In an example, an optical element can comprise a first transparent (or at least translucent) electrode, a second transparent (or at least translucent) electrode, and an adjustable transmissive-reflective layer between the first and second transparent electrodes. In an example, an electroconductive pathway can be made with a polymer [e.g., PEDOT: PPS, polyvinylpyrrolidone (PVP), polytetramethylene oxide (PTMO), polypyrrole, polyacrylate, polytetrafluoroethylene (PTFE), polyamide, polyester, polymethyl methacrylate (PMMA), polyvinyl alcohol (PVA), polyethylene naphtalate (PEN), polyethylene terephthalate (PET), polycarbonate, polyimide, or polyvinylidene difluoride (PVDF)].

In an example, a transparent electroconductive pathway can span at least two sides of a polygonal optical element. In an example, transparent electroconductive pathways can travel between optical elements in an array of optical elements. In an example, an optical element can comprise a first transparent (or at least translucent) electroconductive layer, a second transparent (or at least translucent) electroconductive layer, and an adjustable transmissive-reflective layer between the first and second transparent layers, wherein transmission of electrical energy through the adjustable transmissive-reflective layer and/or exposure of the adjustable transmissive-reflective layer to electromagnetic field via the electroconductive layers changes the opacity, level of light transmission, and/or level of light reflection of the adjustable transmissive-reflective layer. In an example, an electroconductive pathway can be made with silicon, polysilicon, silicon nitride, and/or silicon oxy nitride.

In an example, an array of transparent electroconductive pathways can comprise a hub and spoke grid (e.g. grid, mesh, or array) of pathways. In an example, an electroconductive pathway can be made with copper (e.g. a copper alloy). In an example, an array of transparent electroconductive pathways can comprise a grid (e.g. grid, mesh, or array) of pathways wherein there are quadrilateral-shaped spaces between pathways.

In an example, an optical element can comprise a first transparent (or at least translucent) electroconductive layer, a second transparent (or at least translucent) electroconductive layer, and an liquid crystal layer between the first and second transparent layers, wherein transmission of electrical energy through the liquid crystal layer and/or exposure of the liquid crystal layer to electromagnetic field via the electroconductive layers changes the opacity, level of light transmission, and/or level of light reflection of the liquid crystal layer. In an example, an electroconductive pathway can be made with silver (e.g. silver alloy, silver nanowires, silver epoxy, and/or silver halide emulsion).

In an example, an array of transparent electroconductive pathways can comprise a grid (e.g. grid, mesh, or array) of pathways wherein there are wedge or keystone shaped spaces between pathways. In an example, an electroconductive pathway can be made with acetate. In an example, an electroconductive pathway can be made with titanium nitride. In an example, a transparent electroconductive pathway can be electrically anisotropic. In an example, an electroconductive pathway can be made with nitride material.

In an example, two transparent electroconductive pathways can be in communication with the two sides, respectively, of an optical element. In an example, an optical element can comprise a first transparent (or at least translucent) electrode, a second transparent (or at least translucent) electrode, and a liquid crystal layer between the first and second transparent electrodes. In an example, an electroconductive pathway can be made from a transparent (or at least translucent) polymer which has been doped and/or impregnated with electroconductive particles. In an example, the density of electroconductive pathways can be greater in the center of an array of electroconductive pathways than in the periphery of the array. In an example, an electroconductive pathway can be made with neoprene. In an example, an array of transparent electroconductive pathways can comprise a grid (e.g. grid, mesh, or array) of pathways wherein there are triangular-shaped spaces between pathways.

In an example, an optical element can comprise a first transparent (or at least translucent) electroconductive layer, a second transparent (or at least translucent) electroconductive layer, and an electrochromic layer between the first and second transparent layers, wherein transmission of electrical energy through the electrochromic layer and/or exposure of the electrochromic layer to electromagnetic field via the electroconductive layers changes the opacity, level of light transmission, and/or level of light reflection of the electrochromic layer. In an example, an electroconductive pathway can be made with tin. In an example, distances between electroconductive pathways can be smaller in the center of an array of electroconductive pathways than in periphery of the array. In an example, an electroconductive pathway can be made with metal carbide.

In an example, augmented reality eyewear can further comprise a Digital Micromirror Array (DMA). In an example, augmented reality eyewear can further comprise one or more optical waveguides. In an example, augmented reality eyewear can further comprise one or more light-transmitting nanotubes. In an example, augmented reality eyewear can further comprise a Liquid Crystal Display (LCD). In an example, augmented reality eyewear can further comprise an off-axis optical projection system. In an example, augmented reality eyewear can further comprise a beam splitter.

In an example, augmented reality eyewear can further comprise a reflective liquid crystal array. In an example, augmented reality eyewear can further comprise a variable focus lens. In an example, augmented reality eyewear can further comprise a liquid crystal array or matrix. In an example, augmented reality eyewear can further comprise an electrically-activated liquid crystal lens. In an example, augmented reality eyewear can further comprise light transmitting nanotubes. In an example, augmented reality eyewear can further comprise an optical filter.

In an example, augmented reality eyewear can further comprise Light Emitting Diodes (LEDs). In an example, augmented reality eyewear can further comprise an optoelectric lens array or matrix. In an example, augmented reality eyewear can further comprise a data receiver. In an example, augmented reality eyewear can further comprise a lens. In an example, augmented reality eyewear can further comprise an optical waveguide. In an example, augmented reality eyewear can further comprise a metal oxide semiconductor. In an example, augmented reality eyewear can further comprise a microelectromechanical (MEMS) mirror array which directs light from a display toward an array of optical elements.

In an example, augmented reality eyewear can further comprise a micro-prism array. In an example, augmented reality eyewear can further comprise a polarizing beam splitter. In an example, augmented reality eyewear can further comprise a prism array or matrix. In an example, augmented reality eyewear can further comprise a data processor. In an example, augmented reality eyewear can further comprise a Digital Micromirror Device (DMD).

In an example, augmented reality eyewear can further comprise a battery. In an example, augmented reality eyewear can comprise a photonic metamaterial. In an example, augmented reality eyewear can further comprise a thin-film transistor. In an example, augmented reality eyewear can further comprise a collimator. In an example, augmented reality eyewear can further comprise a reflection holographic volume grating. In an example, augmented reality eyewear can further comprise a holographic array or matrix. In an example, augmented reality eyewear can further comprise a directional diffuser.

In an example, augmented reality eyewear can further comprise a spatial light modulator. In an example, augmented reality eyewear can further comprise a data transmitter. In an example, augmented reality eyewear can further comprise one or more light channels. In an example, augmented reality eyewear can comprise birefringent material. In an example, augmented reality eyewear can further comprise a reflective Liquid-Crystal-On-Silicon array.

In an example, augmented reality eyewear can further comprise a touch screen. In an example, augmented reality eyewear can further comprise a nanoscale grating. In an example, augmented reality eyewear can further comprise a diffraction grating. In an example, augmented reality eyewear can further comprise a spatial filter. In an example, augmented reality eyewear can further comprise a micromirror array. Example variations discussed elsewhere in this disclosure or priority-linked disclosures can also be applied to the example in FIG. 8 where relevant.

FIGS. 9 through 12 show four top-down cross-sectional views of an array of individually-adjustable transmissive-reflective optical elements which collectively comprise a side section of a Fresnel Reflector (or QFR) such as the one shown in FIG. 8. FIGS. 9 through 12 demonstrate that different subsets of optical elements at different locations can be made less-transmissive and more-reflective at different times in order to enhance the opacity and resolution of virtual objects projected at those different locations at those different times.

With respect to specific components, FIGS. 9 through 12 show top down cross-sectional views of: an array 901 of individually-adjustable transmissive-reflective optical elements, including individual optical elements 902, 903, 904, and 905; an array 906 of transparent (or translucent) electroconductive pathways; a display 1001 to one side of a person's eye; the person's eye 1008; light rays from the environment, including environmental light rays 1004, 1005, 1006, and 1007; and light rays from the display, including light rays 1002, 1003, 1201, and 1202.

Figure 9:
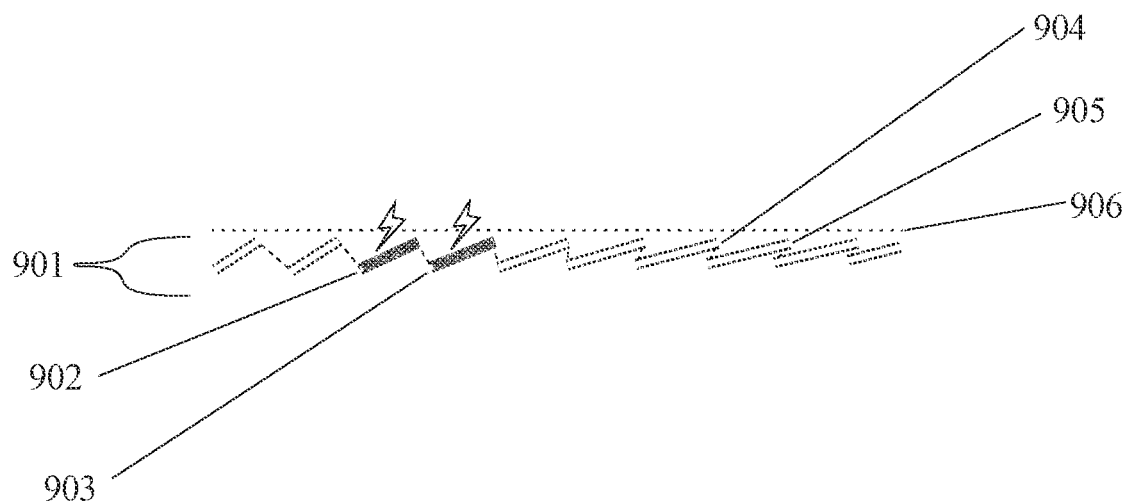
FIGS. 9 through 12 show four top-down cross-sectional views, at different times, of an array of individually-adjustable transmissive-reflective optical elements which collectively comprise a side section of a Fresnel Reflector.
Figure 10:
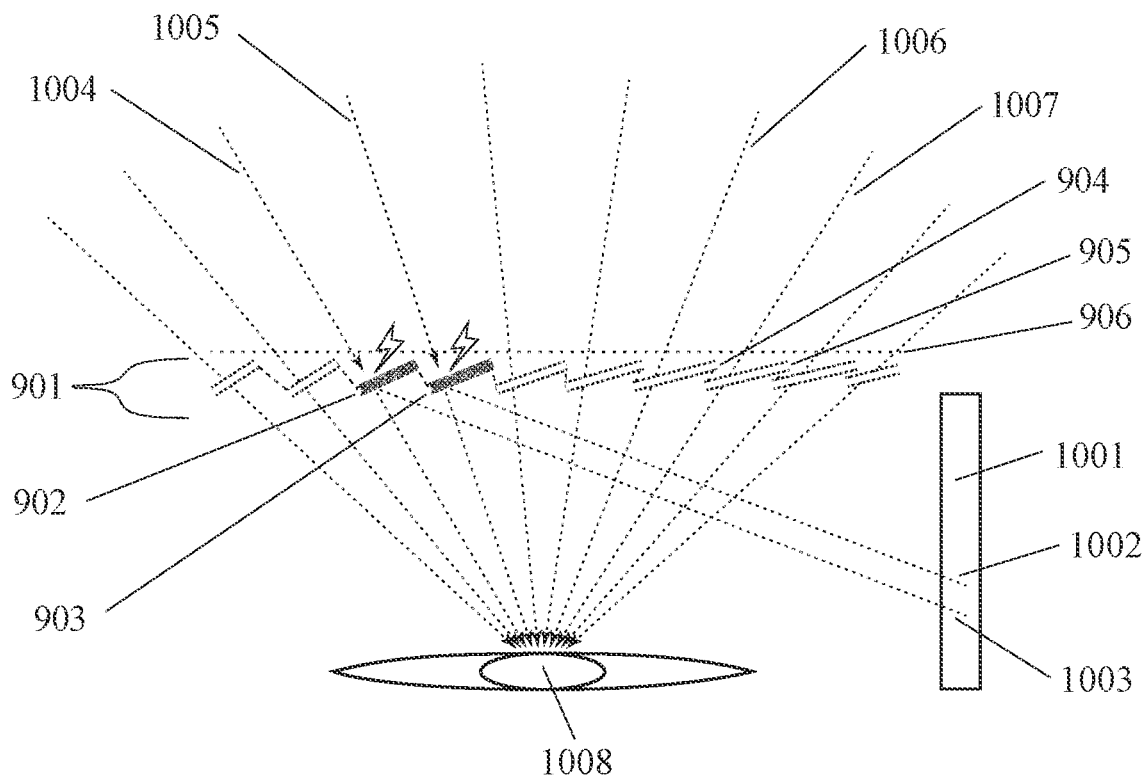
Figure 11:
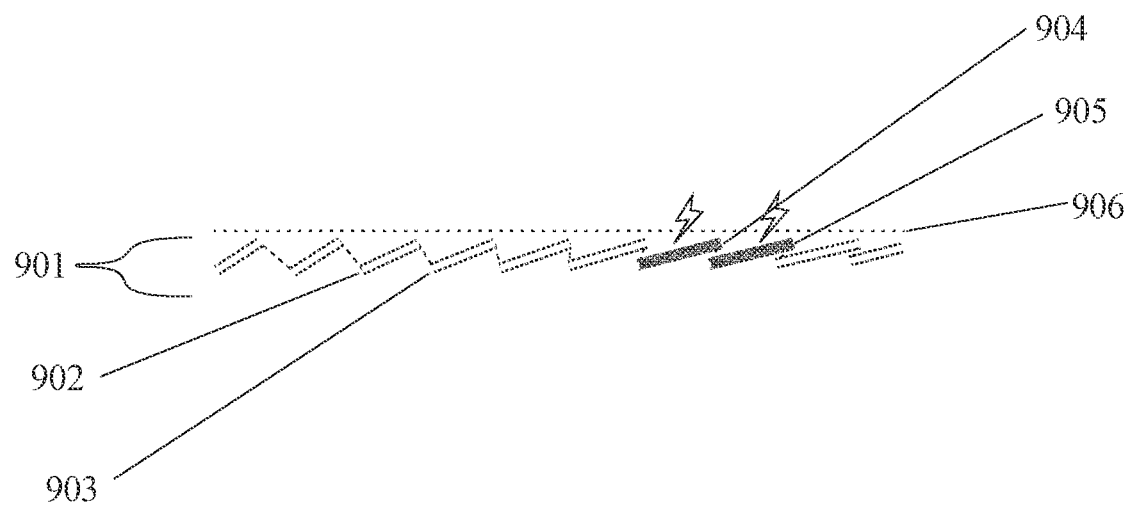
Figure 12:
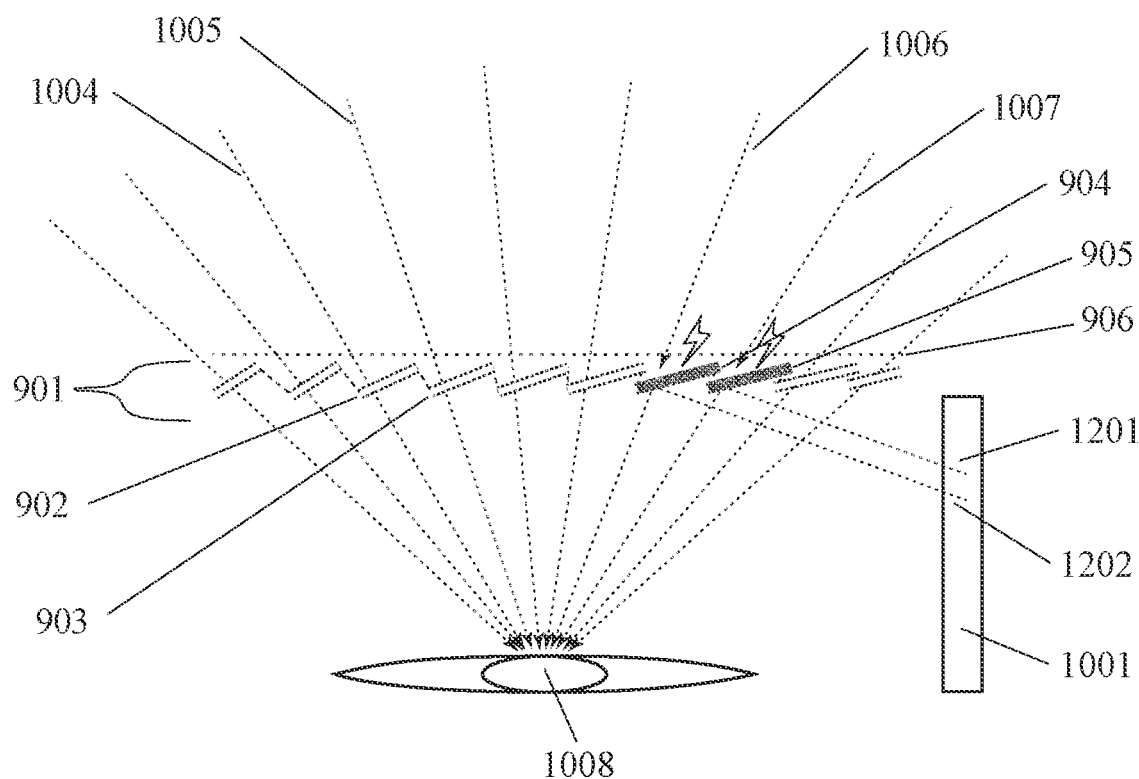

FIGS. 9 and 11 show the array of optical elements and the array of electroconductive pathways, but do not show the display or light rays in order to introduce the structure without too much diagrammatic clutter. FIGS. 10 and 12 show a more-complete view of the structure, including the array of optical elements, the array of electroconductive pathways, the display, and selected light rays.

FIGS. 9 and 10 show this structure at a first point in time when optical elements in a first subset (902 and 903) of optical elements in the array have been changed from their first (more-transmissive, less-reflective) configurations to their second (less-transmissive, more-reflective) configurations by exposure to electrical current and/or an electromagnetic field via the electroconductive pathways. The perimeter of this first subset of optical elements can substantially match the perimeter of a virtual object which is projected in the person's field of view at a first location, at this first point in time, in order to enhance the opacity and resolution of that virtual object.

FIGS. 11 and 12 show this structure at a second point in time when optical elements in a second subset (904 and 905) of optical elements in the array have been changed from their first (more transmissive, less-reflective) configurations to their second (less transmissive, more reflective) configurations by exposure to electrical current and/or an electromagnetic field via the electroconductive pathways. The perimeter of this second subset of optical elements can substantially match the perimeter of a virtual object which is projected in the person's field of view at a second location, at this second point in time, in order to enhance the opacity and resolution of that virtual object.

FIG. 9 shows, at a first point in time, that a first subset of optical elements (902 and 903) have been changed into their less-transmissive, more-reflective second configurations by exposure to electrical current and/or an electromagnetic field from conductive pathways 906. The electrical currents and/or electromagnetic fields are symbolically represented by lightning symbols near optical elements 902 and 903. Optical elements 904 and 905 are in their more-transmissive, less-reflective first configurations.

FIG. 10 shows the same structure, configuration, and time which is shown in FIG. 9, but is a more complete figure. FIG. 10 also shows a display, the person's eye, some light rays from the environmental, and some light rays from the display. Specifically, FIG. 10 shows that: light rays 1004 and 1005 from the environment are blocked by optical elements 902 and 903 from reaching the person's eye; and light rays 1002 and 1003 (part of a projected virtual object) from the display are reflected by optical elements 902 and 903 toward the person's eye. Light rays 1002 and 1003 from the display replace light rays 902 and 903 from the environment in the person's field of view. This enhances the opacity and resolution of the virtual object in the person's field of view. In an example, light rays 1002 and 1003 converge onto the pupil or the retina of the person's eye.

FIG. 11 shows, at a second point in time, that second subset of optical elements (904 and 905) have been changed into their less-transmissive, more-reflective second configurations by exposure to electrical current and/or an electromagnetic field from conductive pathways 906. The electrical currents and/or electromagnetic fields are symbolically represented by lightning symbols near optical elements 904 and 905. Optical elements 902 and 903 are in their more-transmissive, less-reflective first configurations.

FIG. 12 shows the same structure, configuration, and time which is shown in FIG. 11, but is a more complete figure. FIG. 12 also shows a display, the person's eye, some light rays from the environmental, and some light rays from the display. Specifically, FIG. 12 shows that: light rays 1006 and 1007 from the environment are blocked by optical elements 904 and 905 from reaching the person's eye; and light rays 1201 and 1202 (part of a projected virtual object) from the display are reflected by optical elements 902 and 903 toward the person's eye. Light rays 1201 and 1202 from the display replace light rays 1006 and 1007 from the environment in the person's field of view. This enhances the opacity and resolution of the virtual object in the person's field of view. In an example, light rays 1201 and 1202 converge onto the pupil or retina of the person's eye.

In FIGS. 9 through 12, the angles between reflective surfaces of optical elements and the best-fitting plane of the section of the Fresnel Reflector vary with the distance between the optical elements and the side of the section on which a display is located. In an example, angles between reflective surfaces of optical elements and the plane of the Fresnel Reflector section can vary as a linear function of the distance between these optical elements and the side of the section of the Fresnel Reflector on which a display is located. In an example, angles between reflective surfaces of optical elements and the plane of the Fresnel Reflector section can vary as a step-linear function of the distance between these optical elements and the side of the section of the Fresnel Reflector on which a display is located. In an example, angles between reflective surfaces of optical elements and the plane of the Fresnel Reflector section can vary as a quadratic function of the distance between these optical elements and the side of the section of the Fresnel Reflector on which a display is located.

In FIGS. 9 through 12, the angles between reflective surfaces of optical elements and the best-fitting plane of the section of the Fresnel Reflector vary with the distance between the optical elements and the display. In an example, angles between reflective surfaces of optical elements and the plane of the Fresnel Reflector section can vary as a linear function of the distance between these optical elements and the display. In an example, angles between reflective surfaces of optical elements and the plane of the Fresnel Reflector section can vary as a step-linear function of the distance between these optical elements and the display. In an example, angles between reflective surfaces of optical elements and the plane of the Fresnel Reflector section can vary as a quadratic function of the distance between these optical elements and the display.

In an example, the heights of optical elements can vary with the distance between the optical elements and the display. In an example, the heights of optical elements can vary as a linear function of the distance between these optical elements and the display. In an example, the heights of optical elements can vary as a step-linear function of the distance between these optical elements and the display. In an example, the heights of optical elements can vary as a quadratic function of the distance between these optical elements and the display. In an example, the widths of optical elements can vary with the distance between the optical elements and the display. In an example, the widths of optical elements can vary as a linear function of the distance between these optical elements and the display. In an example, the widths of optical elements can vary as a step-linear function of the distance between these optical elements and the display. In an example, the widths of optical elements can vary as a quadratic function of the distance between these optical elements and the display. Example variations discussed elsewhere in this disclosure or priority-linked disclosures can also be applied to this example where relevant.

Figure 13:
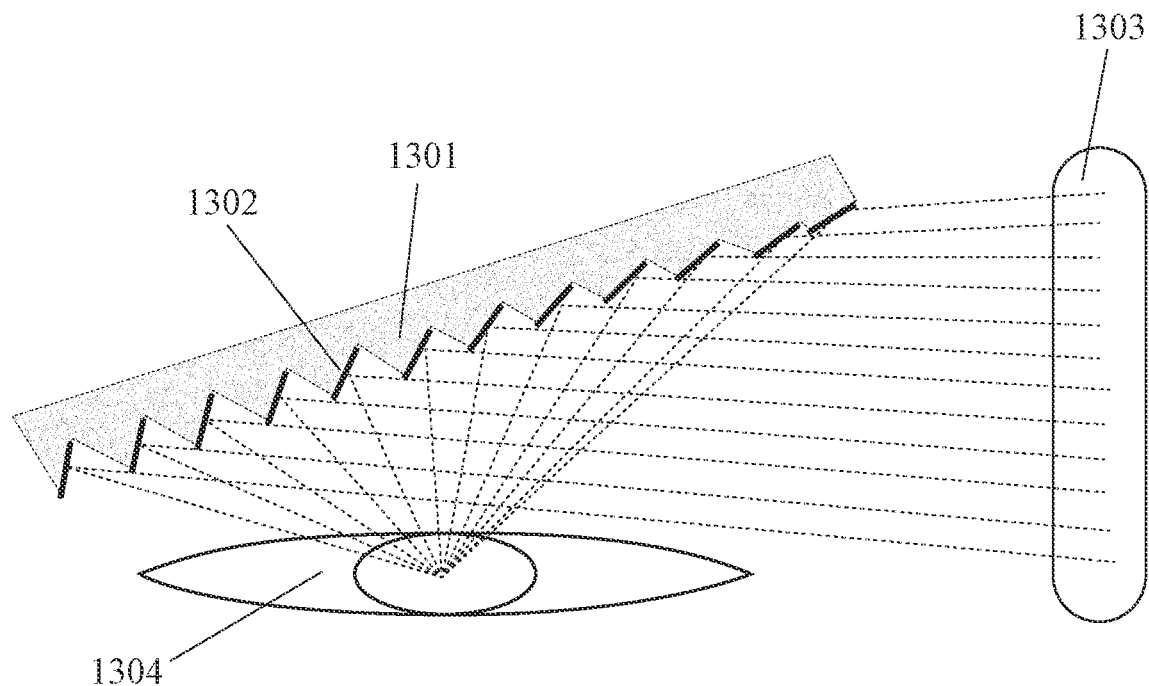
FIG. 13 shows a top-down cross-sectional view of an array of individually-adjustable transmissive-reflective optical elements which collectively comprise a left side section of a Fresnel Reflector.

FIG. 13 shows a top-down cross-sectional view of an array of individually-adjustable transmissive-reflective optical elements which collectively comprise a left side section of a Fresnel Reflector (e.g. a section which has been selected, taken, extracted, or "cut out" from the left half of a Fresnel Reflector) which is used in the right eye portion of augmented reality (AR) eyewear. With respect to specific components, FIG. 13 shows an optical system for the right eye portion of augmented reality eyewear comprising: an array 1301 of individually-adjustable transmissive-reflective optical elements (including optical element 1302), wherein this array is a left side section of a Fresnel Reflector (e.g. a section has been selected, taken, extracted, or "cut out" from the left half of a Fresnel Reflector); a display 1303 which is located to the right of the array (e.g. on the right sidepiece or "temple" of the eyewear); and a person's right eye 1304, wherein the array is in front of the eye and wherein the array reflects light rays from the display along vectors which converge on the pupil or retina of the eye. In an example, a symmetric (e.g. vertically reflected) optical system can be used for the left eye portion of this eyewear.

In FIG. 13, all of the optical elements in the array of individually-adjustable transmissive-reflective optical elements are in their second (less-transmissive, more-reflective) configurations. In an example, only a selected subset of these optical elements are in their second configurations at a given time, overlapping virtual objects which are projected in the person's field of view, and the rest of the optical elements remain in their first (more-transmissive, less-reflective) configurations.

In an example, an array of optical elements can comprise an array of adjustably transmissive-reflective surfaces on a lens. In an example, an array of optical elements can comprise an array of adjustably transmissive-reflective surfaces on flat lens. In an example, an array of optical elements can comprise an array of adjustably transmissive-reflective surfaces on one side of a lens wherein the other side of the lens is flat. In an example, an array of optical elements can comprise an array of adjustably transmissive-reflective surfaces on the side of a lens which faces toward a person's eye, wherein the other side of the lens which faces away from the person's eye is flat. In an example, an array of optical elements can comprise an array of adjustably transmissive-reflective surfaces on the side of a lens which faces toward a person's eye, wherein the other side of the lens which faces away from the person's eye is convex or concave. Example variations discussed elsewhere in this disclosure or priority-linked disclosures can also be applied to this example where relevant.

Figure 14:
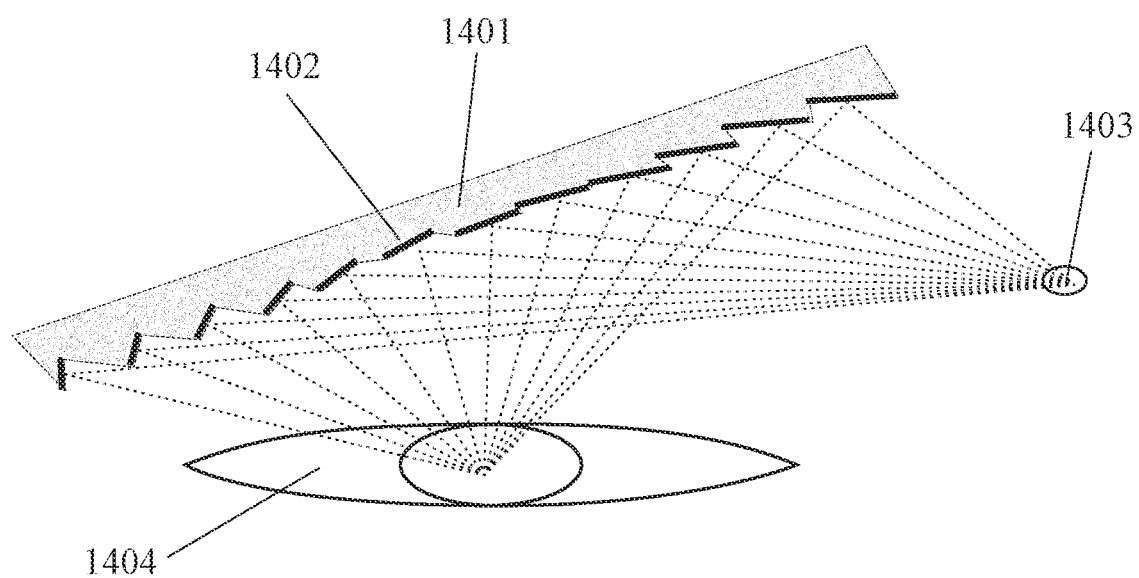
FIG. 14 shows a top-down cross-sectional view of an array of individually-adjustable transmissive-reflective optical elements which collectively comprise a central section of a Fresnel Reflector.

FIG. 14 shows a top-down cross-sectional view of an array of individually-adjustable transmissive-reflective optical elements which collectively comprise a central section of a Fresnel Reflector (e.g. a section which has been selected, taken, extracted, or "cut out" from the center a Fresnel Reflector) which is used in the right eye portion of augmented reality (AR) eyewear. With respect to specific components, FIG. 14 shows an optical system for the right eye portion of augmented reality eyewear comprising: an array 1401 of individually-adjustable transmissive-reflective optical elements (including optical element 1402), wherein this array is a central section of a Fresnel Reflector (e.g. a section which has been selected, taken, extracted, or "cut out" from the center a Fresnel Reflector); a light source 1403 which is located to the right of the array (e.g. on the right sidepiece or "temple" of the eyewear); and a person's right eye 1404, wherein the array is in front of the eye and wherein the array reflects light rays from the light source along vectors which converge on the pupil or retina of the eye. In an example, a symmetric (e.g. vertically reflected) optical system can be used for the left eye portion of this eyewear.

In FIG. 14, all of the optical elements in the array of individually-adjustable transmissive-reflective optical elements are in their second (less-transmissive, more-reflective) configurations. In an example, only a selected subset of these optical elements are in their second configurations at a given time, overlapping virtual objects which are projected in the person's field of view, and the rest of the optical elements remain in their first (more-transmissive, less-reflective) configurations.

In an example, an array of optical elements can comprise an array of adjustably transmissive-reflective surfaces on a lens. In an example, an array of optical elements can comprise an array of adjustably transmissive-reflective surfaces on flat lens. In an example, an array of optical elements can comprise an array of adjustably transmissive-reflective surfaces on one side of a lens wherein the other side of the lens is flat. In an example, an array of optical elements can comprise an array of adjustably transmissive-reflective surfaces on the side of a lens which faces toward a person's eye, wherein the other side of the lens which faces away from the person's eye is flat. In an example, an array of optical elements can comprise an array of adjustably transmissive-reflective surfaces on the side of a lens which faces toward a person's eye, wherein the other side of the lens which faces away from the person's eye is convex or concave. Example variations discussed elsewhere in this disclosure or priority-linked disclosures can also be applied to this example where relevant.

As discussed earlier, the degree of curvature (e.g. convexity or concavity) of ridges (e.g. ridges, peaks, and/or saw-teeth) in a side section of a Fresnel Reflector depends on the size of the section relative to the size of the overall Fresnel Reflector. As the size of a side section of a Fresnel Reflector becomes smaller relative to the size of the Fresnel Reflector (or, from another perspective, as the size of the Fresnel Reflector becomes larger relative to the size of the side section), ridges in that section become straighter and less curved. In the extreme, as the size of the Fresnel Reflector approaches infinity, ridges in a fixed-size section of that Fresnel Reflector converge toward being straight and parallel to each other.

Figure 15:
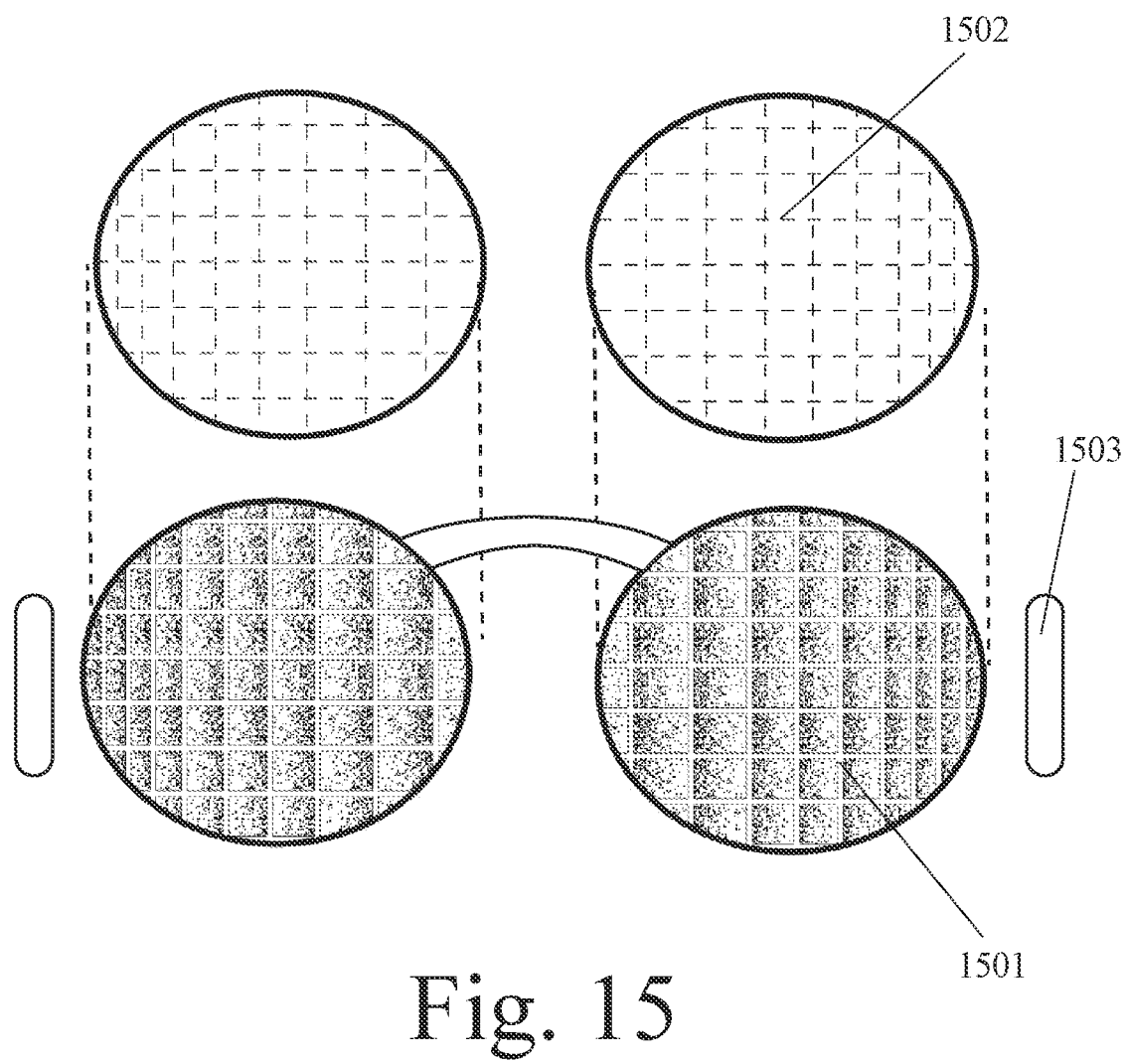
FIG. 15 shows an example of side sections of extremely-large Fresnel Reflectors.

FIG. 15 shows an example of a side section of a Fresnel Reflector (or QFR) where the section is so small relative to the size of the Fresnel Reflector (or, from another perspective, the size of the Fresnel Reflector is so large relative to the size of the section), that ridges in the section are (very close to being) straight and parallel to each other. The lower portion of FIG. 15 shows the side section of a Fresnel Reflector comprising an array of reflection-adjustable optical elements. The upper portion of FIG. 15 shows exploded views of electroconductive pathways which are in electromagnetic communication with the optical elements.

In this example, for each eye, an array of optical elements, a display, and an array of electroconductive pathways are held near the eye by eyewear. This eyewear includes right and left sections of Fresnel Reflectors (e.g. right and left side QFRs) which are configured to be in front of a person's left and right eyes, respectively. The right and left side sections of Fresnel Reflectors (e.g. QFRs) reflect virtual images from left and right side displays, respectively, toward the person's right and left eyes, respectively. In this example, a section is a side section of a Fresnel Reflector, wherein the section has been selected (e.g. extracted or "cut out") from the right half or the left half (from a frontal perspective) of an extremely large Fresnel Reflector. In an example, the front area of the section can be less than 1% of the front area of the Fresnel Reflector from which it was extracted or "cut out".

With respect to specific components, FIG. 15 shows an example of augmented reality eyewear comprising: a light-emitting display 1503; an array of individually-adjustable transmissive-reflective optical elements 1501, wherein the array of individually-adjustable transmissive-reflective optical elements collectively comprise a section of a Fresnel Reflector, wherein the size of the section is less than 1% of the size of the Fresnel Reflector, wherein each optical element in the array has a first configuration which primarily transmits light from the environment to the person's eye and primarily transmits light from the display to the environment, wherein each optical element in the array has a second configuration which primarily reflects light from the environment and primarily reflects light from the display toward the person's eye, and wherein each optical element in the array can each be individually and selectively changed from the first configuration to the second configuration, or vice versa; and an array of transparent (or translucent) electroconductive pathways 1502, wherein each optical element in the array of optical elements can be individually and selectively changed from the first configuration to the second configuration, or vice versa, by exposure to electrical current and/or an electromagnetic field via one or more electroconductive pathways in the array of electroconductive pathways.

In an example, this invention can be embodied in augmented reality eyewear comprising: eyewear worn by a person; a light-emitting display on the eyewear; an array of individually-adjustable transmissive-reflective optical elements on the eyewear, wherein the array of individually-adjustable transmissive-reflective optical elements collectively comprise a section of a Fresnel Reflector, wherein the size of the section is less than 1% of the size of the Fresnel Reflector, wherein each optical element in the array has a first configuration which primarily transmits light from the environment to the person's eye and primarily transmits light from the display to the environment, wherein each optical element in the array has a second configuration which primarily reflects light from the environment and primarily reflects light from the display toward the person's eye, and wherein each optical element in the array can each be individually and selectively changed from the first configuration to the second configuration, or vice versa; and an array of transparent (or translucent) electroconductive pathways on the eyewear, wherein each optical element in the array of optical elements can be individually and selectively changed from the first configuration to the second configuration, or vice versa, by exposure to electrical current and/or an electromagnetic field via one or more electroconductive pathways in the array of electroconductive pathways.

FIG. 15 can also be described as showing an example of augmented reality eyewear comprising: a light-emitting display 1503; an array of individually-adjustable transmissive-reflective optical elements 1501, wherein the array of individually-adjustable transmissive-reflective optical elements collectively comprise a section of a Fresnel Reflector, wherein the size of the section is less than 1% of the size of the Fresnel Reflector, wherein each optical element in the array has a first configuration which transmits a first level (or percentage) of light from the environment to the person's eye and reflects a second level (or percentage) of light from the display toward the person's eye, wherein each optical element in the array has a second configuration which transmits a third level (or percentage) of light from the environment to the person's eye and reflects a fourth level (or percentage) of light from the display toward the person's eye, wherein the third level (or percentage) is less than the first level (or percentage), wherein the fourth level (or percentage) is greater than the second level (or percentage), and wherein each optical element in the array can each be individually and selectively changed from the first configuration to the second configuration, or vice versa; and an array of transparent (or translucent) electroconductive pathways 1502, wherein each optical element in the array of optical elements can be individually and selectively changed from the first configuration to the second configuration, or vice versa, by exposure to electrical current and/or an electromagnetic field via one or more electroconductive pathways in the array of electroconductive pathways.

In an example, the first level (or percentage) can be the same for all optical elements in the array, the second level (or percentage) can be the same for all optical elements in the array, the third level (or percentage) can be the same for all optical elements in the array, and the fourth level (or percentage) can be the same for all optical elements in the array. Alternatively, the first, second, third, and fourth level (or percentage)s for one optical element in the array can be different than the first, second, third, and fourth level (or percentage)s, respectively, in another optical element in an array of optical elements. In an example, the first level (or percentage) can be different for different optical elements in the array, the second level (or percentage) can be different for different optical elements in the array, the third level (or percentage) can be different for different optical elements in the array, and the fourth level (or percentage) can be different for different optical elements in the array.

In an example, the size of the section of a Fresnel Reflector which is placed in front of a person's eye to reflect light from a display toward the person's eye can be less than one percent of the overall size of the Fresnel Reflector. In an example, the frontal area of the section of a Fresnel Reflector which is placed in front of a person's eye to reflect light from a display toward the person's eye can be less than one percent of the frontal area of the Fresnel Reflector. In an example, the size of the section of a Fresnel Reflector which is placed in front of a person's eye to reflect light from a display toward the person's eye can be less than one thousandth of the overall size of the Fresnel Reflector. In an example, the frontal area of the section of a Fresnel Reflector which is placed in front of a person's eye to reflect light from a display toward the person's eye can be less than one thousandth of the frontal area of the Fresnel Reflector. As shown in FIG. 15, reflective ridges in a section from a very large Fresnel Reflector can be substantially straight and parallel to each other.

In an example, the angles between reflective surfaces of optical elements and the best-fitting plane of the section of the Fresnel Reflector vary with the distance between the optical elements and the side of the section on which a display is located. In an example, angles between reflective surfaces of optical elements and the plane of the Fresnel Reflector section can vary as a linear function of the distance between these optical elements and the side of the section of the Fresnel Reflector on which a display is located. In an example, angles between reflective surfaces of optical elements and the plane of the Fresnel Reflector section can vary as a step-linear function of the distance between these optical elements and the side of the section of the Fresnel Reflector on which a display is located. In an example, angles between reflective surfaces of optical elements and the plane of the Fresnel Reflector section can vary as a quadratic function of the distance between these optical elements and the side of the section of the Fresnel Reflector on which a display is located.

In an example, the angles between reflective surfaces of optical elements and the best-fitting plane of the section of the Fresnel Reflector vary with the distance between the optical elements and the display. In an example, angles between reflective surfaces of optical elements and the plane of the Fresnel Reflector section can vary as a linear function of the distance between these optical elements and the display. In an example, angles between reflective surfaces of optical elements and the plane of the Fresnel Reflector section can vary as a step-linear function of the distance between these optical elements and the display. In an example, angles between reflective surfaces of optical elements and the plane of the Fresnel Reflector section can vary as a quadratic function of the distance between these optical elements and the display.

In an example, the heights of optical elements can vary with the distance between the optical elements and the display. In an example, the heights of optical elements can vary as a linear function of the distance between these optical elements and the display. In an example, the heights of optical elements can vary as a step-linear function of the distance between these optical elements and the display. In an example, the heights of optical elements can vary as a quadratic function of the distance between these optical elements and the display. In an example, the widths of optical elements can vary with the distance between the optical elements and the display. In an example, the widths of optical elements can vary as a linear function of the distance between these optical elements and the display. In an example, the widths of optical elements can vary as a step-linear function of the distance between these optical elements and the display. In an example, the widths of optical elements can vary as a quadratic function of the distance between these optical elements and the display. Example variations discussed elsewhere in this disclosure or priority-linked disclosures can also be applied to this example where relevant.

Figure 16:
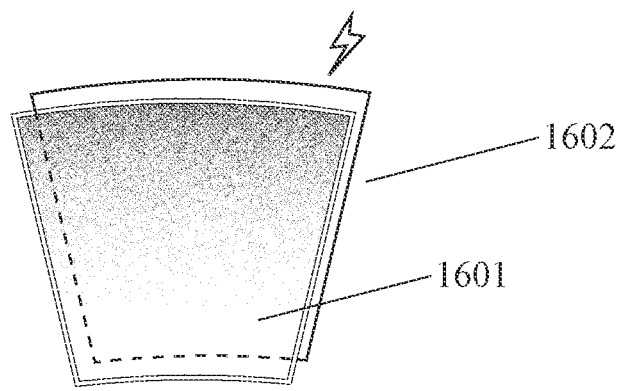
FIG. 16 shows a keystone shaped individual optical element.
Figure 17:
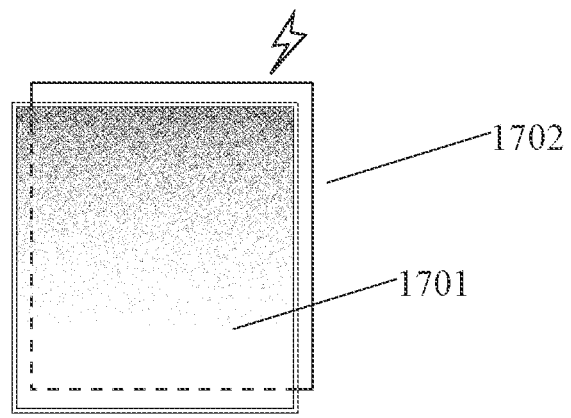
FIG. 17 shows a square individual optical element.
Figure 18:
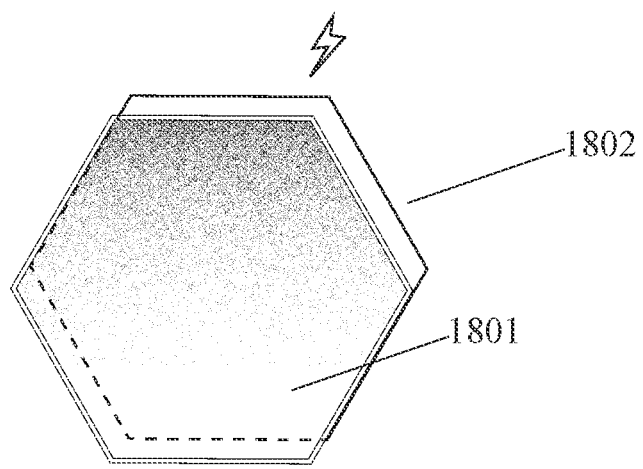
FIG. 18 shows a hexagonal individual optical element.

FIGS. 16-18 show adjustable transmissive-reflective optical elements and corresponding electroconductive pathways of different shapes. The optical elements can be parts of arrays of individually-adjustable transmissive-reflective optical elements. The electroconductive pathways can be parts of arrays of electroconductive pathways which are in electromagnetic communication with the optical elements. FIG. 16 shows a keystone (or trapezoidal) shaped optical element 1601 and a keystone (or trapezoidal) electroconductive pathway 1602 which is in electromagnetic communication with the optical element. FIG. 17 shows a square optical element 1701 and a square electroconductive pathway 1702 which is in electromagnetic communication with the optical element. FIG. 18 shows a hexagonal optical element 1801 and a hexagonal electroconductive pathway 1802 which is in electromagnetic communication with the optical element.

Figure 19:
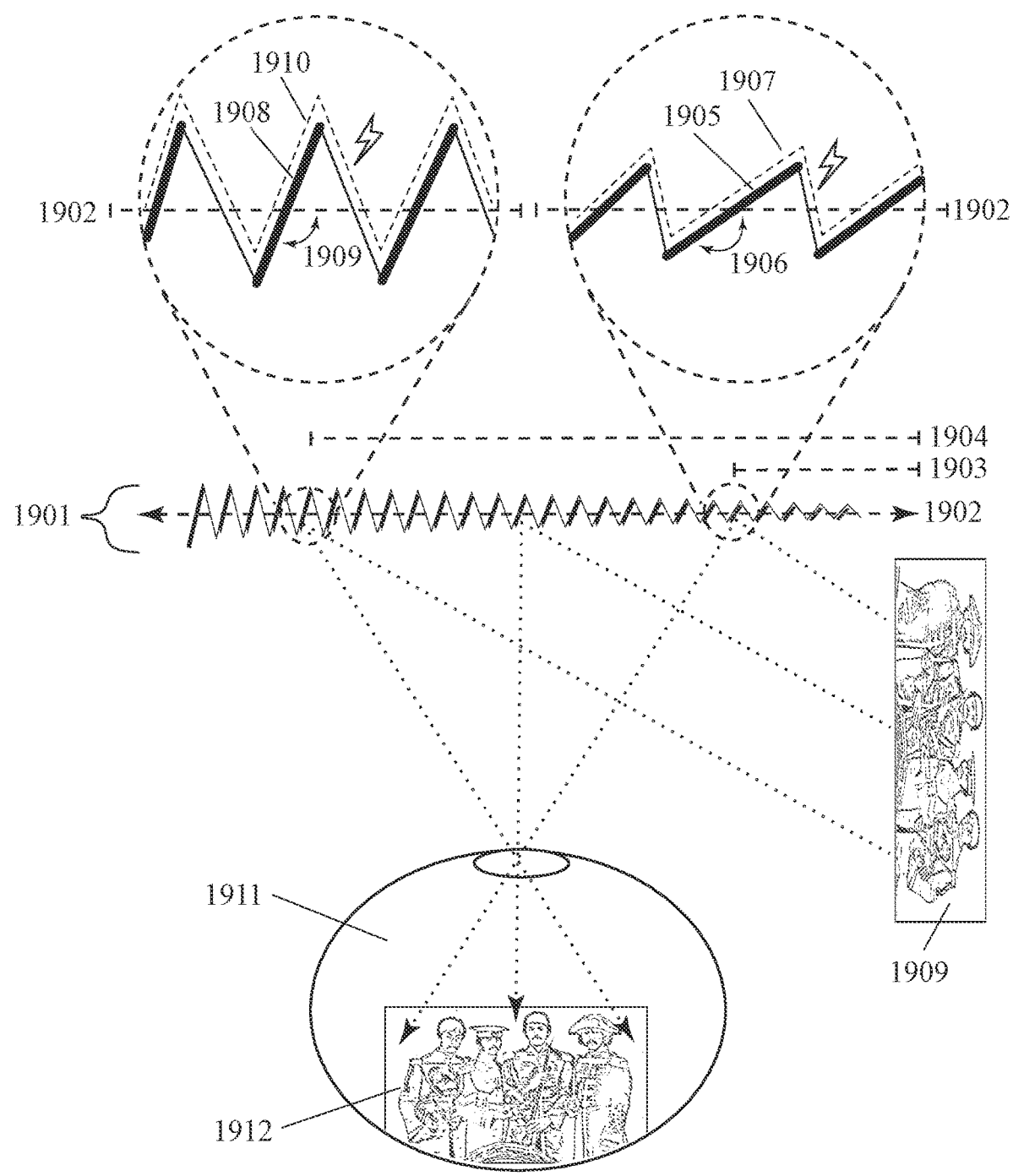
FIG. 19 shows a top-down cross-sectional view of an optical system for augmented reality (AR) eyewear comprising a light-emitting display and an array of individually-adjustable transmissive-reflective optical elements which comprise a side section of a Fresnel Reflector.

FIG. 19 shows a top-down cross-sectional view of an optical system for augmented reality (AR) eyewear comprising: a light-emitting display 1909; an array 1901 of individually-adjustable transmissive-reflective optical elements, including optical elements 1908 and 1905; wherein the array of individually-adjustable transmissive-reflective optical elements collectively comprise a section from half of a Fresnel Reflector; wherein each optical element in the array has a first configuration which primarily transmits light from the environment to the person's eye and primarily transmits light from the display to the environment; wherein each optical element in the array has a second configuration which primarily reflects light from the environment and primarily reflects light from the display toward the person's eye; wherein each optical element in the array can each be individually and selectively changed from the first configuration to the second configuration, or vice versa; and an array of transparent (or translucent) electroconductive pathways, including pathways 1910 and 1907, wherein each optical element in the array of optical elements can be individually and selectively changed from the first configuration to the second configuration, or vice versa, by exposure to electrical current and/or an electromagnetic field via one or more electroconductive pathways in the array of electroconductive pathways. The two dashed-line circles in the upper portion of FIG. 19 shows close-up views of two sections of the array of optical elements and the array of electroconductive pathways. The left dashed-line circle shows a close-up view of optical element 1908 and electroconductive pathway 1910). The right dashed-line circle shows a close-up view of optical element 1905 and electroconductive pathway 1907).

In order to better describe the rest of the components shown in FIG. 19, it is useful to specify some definitions. An optical element plane is the flat virtual plane which best fits an optical element. An element-to-side distance is the distance between the centroid of an optical element and the side of the optical array which is closest to the display. The optical array plane is the flat virtual plane which best fits the centroids of optical elements in an array of optical elements. In FIG. 19, the optical array plane is shown by dashed line 1902. The element-to-side distance for optical element 1908 is shown by dashed line 1904. The element-to-side distance for optical element 1905 is shown by dashed line 1903. Angle 1909 is the (display facing) angle between the optical element plane of optical element 1908 and optical array plane 1902. Angle 1906 is the (display facing) angle between the optical element plane of optical element 1905 and optical array plane 1902.

Completing the description of the components in FIG. 19, light rays from display 1909 comprising a virtual object are reflected by optical elements in the array of optical elements toward the person's eye 1911, converging on the pupil or retina of the eye, and projecting a virtual object 1912 in the person's field of view. This optical structure has significant advantages over prior art designs such as "Pepper's Ghost." One advantage is that this design is much more compact, enabling the creation of augmented reality (AR) eyewear which does not protrude out far from a person's face. Another advantage is that virtual objects are more opaque and higher-resolution in a person's field of view.

Combining all of these components into a single comprehensive paragraph (or claim), FIG. 19 shows a top-down cross-sectional view of an optical system for augmented reality (AR) eyewear comprising: (a) a light-emitting display 1909; (b) an array 1901 of individually-adjustable transmissive-reflective optical elements, wherein an optical array plane 1902 is a plane which best fits the array of individually-adjustable transmissive-reflective optical elements, wherein the array of individually-adjustable transmissive-reflective optical elements collectively comprise a section from a side half of a Fresnel Reflector, wherein the array of individually-adjustable transmissive-reflective optical elements includes first optical element 1908 and second optical element 1905, wherein first optical element 1908 and second optical element 1905 each have a first configuration which primarily transmits light from the environment to the person's eye and primarily transmits light from the display to the environment, wherein first optical element 1908 and second optical element 1905 each have a second configuration which primarily reflects light from the environment and primarily reflects light from the display, comprising a virtual object 1912, toward a person's eye 1911, wherein first optical element 1908 and second optical element 1905 each be individually and selectively changed from the first configuration to the second configuration, or vice versa, wherein there is a first distance 1904 from the first optical element to the side of the optical array plane which is closest to the display, wherein there is a second distance 1903 from the second optical element to the side of the optical array plane which is closest to the display, wherein there is a first angle 1909 between the first optical element and the optical array plane, wherein there is a second angle 1906 between the second optical element and the optical array plane, wherein the first distance is greater than the second distance, and wherein the first angle is smaller than the second angle; and (c) an array of transparent (or translucent) electroconductive pathways, including first electroconductive pathway 1910 and second electroconductive pathway 1907, wherein first optical element 1908 can be selectively and individually changed from the first configuration to the second configuration, or vice versa, by exposure to electrical current and/or an electromagnetic field from first electroconductive pathway 1910, and wherein second optical element 1905 can be selectively and individually changed from the first configuration to the second configuration, or vice versa, by exposure to electrical current and/or an electromagnetic field from second electroconductive pathway 1907.

In an example, angles between optical elements and the optical array plane can be a negative linear function of the distance between optical elements and the side of the optical array which is closest to the display. In an example, the difference between the first angle and the second angle can be a negative linear function of the distance between the first distance and the second distance. In an example, angles between optical elements and the optical array plane can be a quadratic function of the distance between optical elements and the side of the optical array which is closest to the display. In an example, the difference between the first angle and the second angle can be a quadratic function of the distance between the first distance and the second distance. Example variations discussed elsewhere in this disclosure or priority-linked disclosures can also be applied to this example where relevant.

I claim:

1. Augmented reality eyewear comprising:
   a light-emitting display;
   an array of individually-adjustable transmissive-reflective optical elements, wherein the array of individually-adjustable transmissive-reflective optical elements collectively comprise a section of a Fresnel Reflector, wherein each optical element in the array has a first configuration which transmits a first level of light from the environment to the person's eye and reflects a second level of light from the display toward the person's eye, wherein each optical element in the array has a second configuration which transmits a third level of light from the environment to a person's eye and reflects a fourth level of light from the display toward the person's eye, wherein the third level is less than the first level, wherein the fourth level is greater than the second level, and wherein each optical element in the array can each be individually and selectively changed from the first configuration to the second configuration, or vice versa; and
   an array of transparent or translucent electroconductive pathways, wherein each optical element in the array of optical elements can be individually and selectively changed from the first configuration to the second configuration, or vice versa, by exposure to electrical current and/or an electromagnetic field via one or more electroconductive pathways in the array of electroconductive pathways.

2. The augmented reality eyewear in claim 1 wherein the section of a Fresnel Reflector is a section of a right side or a left side of the Fresnel Reflector.

3. The augmented reality eyewear in claim 1 wherein the size of the section of a Fresnel Reflector is less than 25% of the overall size of the Fresnel Reflector.

4. The augmented reality eyewear in claim 1 wherein display-facing angles between best-fitting planes of optical elements and a best-fitting plane of the array of optical elements, respectively, are a linear function of distances from the optical elements to the display.

5. The augmented reality eyewear in claim 1 wherein display-facing angles between best-fitting planes of optical elements and a best-fitting plane of the array of optical elements, respectively, are a negative linear function of distances from the optical elements to the display.

6. The augmented reality eyewear in claim 1 wherein display-facing angles between best-fitting planes of optical elements and a best-fitting plane of the array of optical elements, respectively, are a quadratic function of distances from the optical elements to the display.

7. The augmented reality eyewear in claim 1 wherein an optical element in the array of optical elements is changed from the first configuration to the second configuration, or vice versa, by electrical current from one or more electroconductive pathways in the array of electroconductive pathways.

8. The augmented reality eyewear in claim 1 wherein an optical element in the array of optical elements is changed from the first configuration to the second configuration, or vice versa, by exposure to an electromagnetic field created by one or more electroconductive pathways in the array of electroconductive pathways.

* * * * *